US012739906B2

(12) United States Patent
Wu

(10) Patent No.: US 12,739,906 B2
(45) Date of Patent: Sep. 15, 2026

(54) COMMUNICATION BETWEEN NETWORK NODES VIA MULTIPLE CELLS

(71) Applicant: GOOGLE LLC, Mountain View, CA (US)

(72) Inventor: Chih-Hsiang Wu, Taoyuan City (TW)

(73) Assignee: GOOGLE LLC, Mountain View, CA (US)

( * ) Notice: Subject to any disclaimer, the term of this patent is extended or adjusted under 35 U.S.C. 154(b) by 462 days.

(21) Appl. No.: 17/925,604

(22) PCT Filed: May 14, 2021

(86) PCT No.: PCT/US2021/032467
§ 371 (c)(1),
(2) Date: Nov. 15, 2022

(87) PCT Pub. No.: WO2021/231876
PCT Pub. Date: Nov. 18, 2021

(65) Prior Publication Data

US 2023/0209627 A1 Jun. 29, 2023

Related U.S. Application Data

(60) Provisional application No. 63/025,989, filed on May 15, 2020.

(51) Int. Cl.
*H04W 76/15* (2018.01)
*H04L 1/1812* (2023.01)
*H04W 36/06* (2009.01)
*H04W 72/0453* (2023.01)

(52) U.S. Cl.
CPC ........... *H04W 76/15* (2018.02); *H04L 1/1812* (2013.01); *H04W 36/06* (2013.01); *H04W 72/0453* (2013.01)

(58) Field of Classification Search
CPC .......................... H04W 72/12; H04W 72/0453
USPC .......................................................... 370/329
See application file for complete search history.

(56) References Cited

U.S. PATENT DOCUMENTS

2012/0320853 A1 12/2012 Kwon et al.
2013/0003668 A1 1/2013 Xiao et al.
2016/0164622 A1 6/2016 Yi et al.
2019/0357238 A1 11/2019 Zhou et al.
2020/0092814 A1 3/2020 Zhou et al.
2020/0313833 A1 10/2020 Yi et al.

FOREIGN PATENT DOCUMENTS

CN 107566093 A 1/2018
CN 109863809 A 6/2019
(Continued)

OTHER PUBLICATIONS

Ericsson (Moderator), "Summary of Rel-17 Email Discussion on NR Dynamic Spectrum Sharing," 3GPP Draft (Feb. 12, 2019).
(Continued)

*Primary Examiner* — Angel T Brockman
(74) *Attorney, Agent, or Firm* — MARSHALL, GERSTEIN & BORUN LLP

(57) ABSTRACT

A base station transmits, the a secondary cell (SCell), a control indicator indicating resources for communicating an information unit between the UE and the base station. The base station then communicates the first information unit according to the first control indicator in a primary cell (PCell).

20 Claims, 23 Drawing Sheets

(56) References Cited

FOREIGN PATENT DOCUMENTS

| | | | |
|---|---|---|---|
| EP | 3681085 | A1 | 7/2020 |
| WO | WO-2021/151223 | A1 | 8/2021 |

OTHER PUBLICATIONS

First Examination Report for India Application No. 202247070591, dated Feb. 1, 2023.

International Search Report and Written Opinion for Application No. PCT/US2021/032467, dated Sep. 24, 2021.

Anite "Addition of LTE-A 2UL Carrier Aggregation RACH on SCell Test Case," 3GPP TSG-RAN WG5 Testing (2015).

First Chinese Office Action for Application No. 202180060692.7, dated Dec. 20, 2024.

"5G; NR; Radio Resource Control (RRC); Protocol specification", 3GPP TS 38.331 version 15.5.1 Release 15 (2019).

"3rd Generation Partnership Project; Technical Specification Group Radio Access Network; NR; NR and NG-RAN Overall Description; Stage 2 (Release 16)," 3GPP TS 38.300 V16.1.0 (2020).

Ericsson, "New WID on NR Dynamic spectrum sharing (DSS) ," 3GPP Tsg Ran Meeting #86 (2019).

COMMUNICATION BETWEEN NETWORK NODES VIA MULTIPLE CELLS

FIELD OF THE DISCLOSURE

This disclosure relates generally to wireless communications and, more particularly, to using PDCCHs of multiple cells to schedule HARQ transmissions of a transport block on the same cell, and using a PDCCH of a cell to schedule HARQ transmission of a transport block on multiple cells.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In telecommunication systems, a base station can support carriers in multiple cells, which can cover the same or different, typically overlapping, geographic areas. A base station in some cases can configure a user equipment (UE) to use carrier aggregation (CA) to communicate with the base station in multiple cells at the same time. More particularly, the base station can designate one cell to operate as a primary cell (PCell), and designate one or more other cells to operate as secondary cells (SCells), for the UE. When the base station operates as a master node (MN) supporting dual connectivity (DC) at the UE, and the MN configures CA for the UE, the MN similarly designates a PCell and one or more SCells. When the base station operates as a secondary node (SN) in DC, to support CA the SN designates a primary secondary cell (PSCell) and one or more SCells.

An SCell in different operational states can be deactivated, dormant or active. A PCell, however, cannot be de-activated or dormant. A downlink carrier frequency of a cell such as a PCell, PSCell, or SCell can be within a licensed carrier frequency band or an unlicensed carrier frequency band, and an uplink carrier frequency of a cell can be within a licensed carrier frequency band or an unlicensed carrier frequency band. The downlink carrier frequency and uplink carrier frequency can be the same carrier frequency or different carrier frequencies.

In some cases, a base station can utilize cross-carrier scheduling to provide, in a PCell via a channel that carries control information (e.g., PDCCH), transmit control indicators for another cell, an SCell. However, if the base station were to configure an SCell for cross-carrier scheduling on the PCell, the UE could stop monitoring PDCCH on the SCell when the SCell becomes dormant or deactivated, or when the relevant bandwidth part (BWP) on the SCell is deactivated or dormant. As a result, configuring an SCell for cross-carrier scheduling using the techniques for configuring a PCell for cross-carrier scheduling can result in a base station failing to transmit data units or signaling to the UE on a PCell.

Moreover, it is not clear whether a base station could schedule Physical Downlink Shared Channels (PDSCHs) on multiple cells using a same Downlink Control Information (DCI), especially when the base station implements a Hybrid Automatic Repeat Request (HARQ) scheme or uses multiple-input, multiple-output (MIMO) transmissions.

SUMMARY

One example embodiment of these techniques is a method in a base station for communicating with a user equipment (UE) via a first cell and a second cell. The method includes transmitting, by processing hardware to the UE in the first cell, a first control indicator indicating resources for communicating at least a first information unit between the UE and the base station; communicating, by the processing hardware, the first information unit according to the first control indicator; and performing, by the processing hardware, at least one of: (i) transmitting, to the UE in the second cell, a second control indicator related to the first information unit, or (ii) communicating, by the processing hardware, a second information unit according to the first control indicator, and in a different cell than the first information unit.

Another example embodiment of these techniques is a base station including processing hardware and configured to implement the method above.

Another example embodiment of these techniques is a method in a UE for communicating via a base station via a first cell and a second cell. The method includes receiving, by processing hardware from the base station in the first cell, a first control indicator for communicating at least a first information unit between the UE and the base station; communicating, by the processing hardware, the first information unit according to the first control indicator; and performing, by the processing hardware, at least one of: (i) receiving, from the base station in the second cell, a second control indicator related to the first information unit, or (ii) communicating, by the processing hardware, a second information unit according to the first control indicator, and in a different cell than the first information unit.

Another example embodiment of these techniques is a UE including processing hardware and configured to implement the method above.

Still another example embodiment of these techniques is a method in a first network device for communicating via a second network device via a first cell and a second cell comprises: transmitting, by processing hardware between the first network device and the second network device in the first cell, a first control indicator for communicating at least a first information unit between the first network device and the second network device; communicating, by the processing hardware, the first information unit according to the first control indicator; and performing, by the processing hardware, at least one of: (i) transmitting, between the first network device and the second network device in the second cell, a second control indicator related to the first information unit, or (ii) communicating, by the processing hardware, a second information unit according to the first control indicator, and in a different cell than the first information unit.

DETAILED DESCRIPTION OF THE DRAWINGS

Generally speaking, a base station of this disclosure can dynamically switch a cell via which the base station schedules transmissions of data units or signaling (collectively referred to as "information units"), in the uplink or downlink direction, or schedule transmissions and re-transmissions of the same information unit via different cells using the same control information such as DCI.

In some scenarios, the base station schedules, via an SCell, a downlink transmission of an information unit in a PCell. When the base station determines that the downlink transmission failed, e.g., by receiving a negative acknowledgement for the information unit according to the HARQ scheme, the base station schedules a downlink re-transmission of the information in the PCell, but in this instance via the PCell. In this manner, the base station ensures that the UE receives the relevant schedule even if the UE is no longer monitoring the SCell. In another example scenario, the base station uses the PCell to transmit a DCI for a downlink transmission of an information unit via the PCell, but after the (re)transmission fails, the base station transmits a new DCI in the SCell, for the transmission of the information unit via the PCell.

Further, in some scenarios, the base station transmits a DCI that schedules a transmission of one information unit in one cell (e.g., PCell) and a transmission of another information unit in another cell (e.g., SCell). If one of these transmissions fails, the base station can transmit a new DCI in another cell, similar to the discussion above. The UE of this disclosure can implement corresponding techniques for receiving and/or transmitting information units.

Figure 1A:
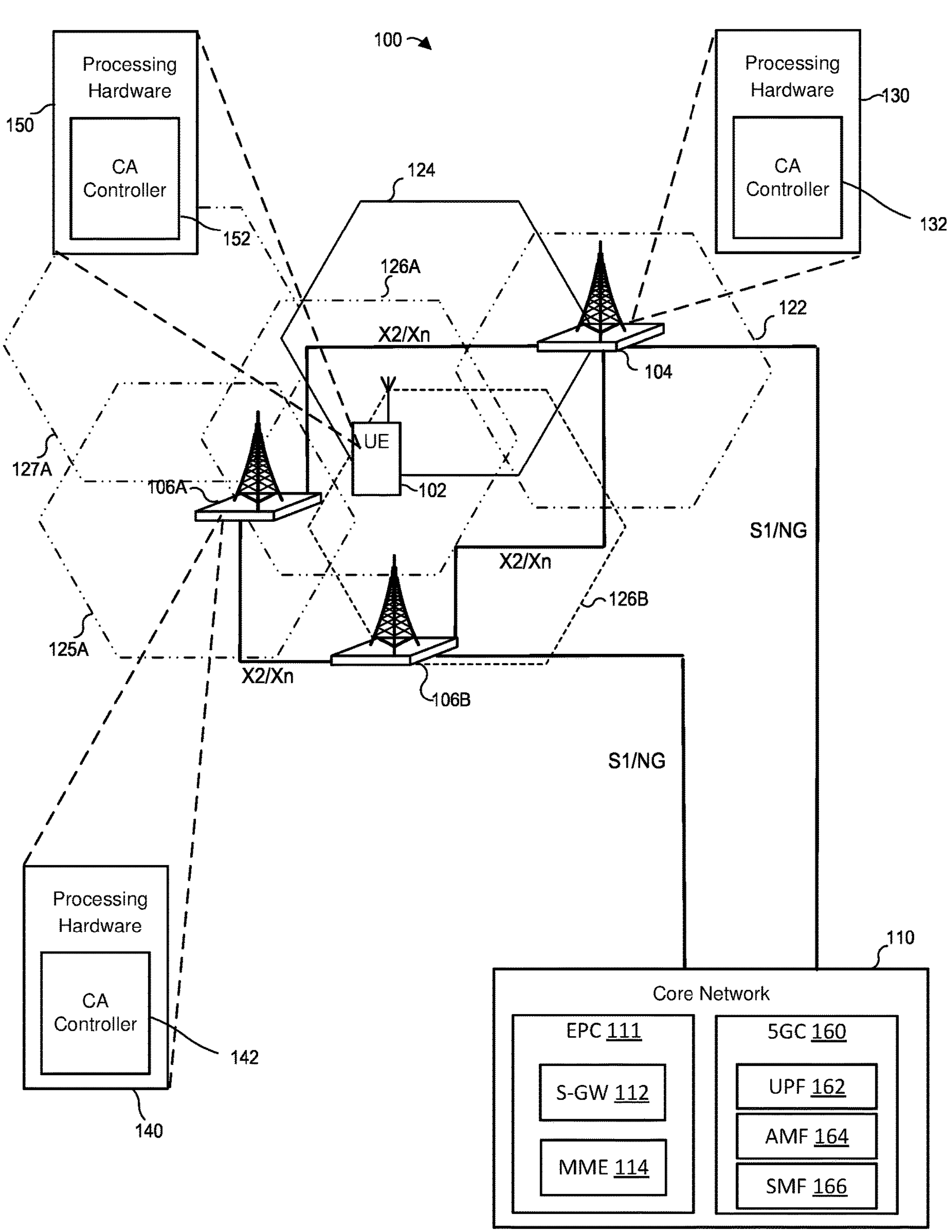
FIG. 1A is a block diagram of an example system in which a radio access network (RAN) and a user device can implement the techniques of this disclosure for scheduling communications across multiple cells.

FIG. 1A depicts an example wireless communication system 100 in which communication devices can implement the scheduling techniques of this disclosure. The wireless communication system 100 includes a UE 102, a base station 104, a base station 106A, a base station 106B and a core network (CN) 110. The UE 102 initially connects to the base station 104. In some scenarios, the base station 104 can perform an SN addition procedure to configure the UE 102 to operate in DC with the base station 104 and the base station 106A. The base stations 104 and 106A operate as an MN and an SN for the UE 102, respectively.

In various configurations of the wireless communication system 100, the base station 104 can be implemented as a master eNB (MeNB) or a master gNB (MgNB), and the base station 106A or 106B can be implemented as a secondary gNB (SgNB). The UE 102 can communicate with the base station 104 and the base station 106A or 106B (106A/B) via the same RAT such as EUTRA or NR, or different RATs.

When the base station 104 is an MeNB and the base station 106A is a SgNB, the UE 102 can be in EUTRA-NR DC (EN-DC) with the MeNB and the SgNB. In some cases, an MeNB or an SeNB is implemented as an ng-eNB rather than an eNB. When the base station 104 is a Master ng-eNB (Mng-eNB) and the base station 106A is a SgNB, the UE 102 can be in next generation (NG) EUTRA-NR DC (NGEN-DC) with the Mng-eNB and the SgNB.

When the base station 104 is an MgNB and the base station 106A/B is an SgNB, the UE 102 may be in NR-NR DC (NR-DC) with the MgNB and the SgNB. When the base station 104 is an MgNB and the base station 106A/B is a Secondary ng-eNB (Sng-eNB), the UE 102 may be in NR-EUTRA DC (NE-DC) with the MgNB and the Sng-eNB.

The base stations 104, 106A, and 106B can connect to the same core network (CN) 110 which can be an evolved packet core (EPC) 111 or a fifth-generation core (5GC) 160. The base station 104 can be implemented as an eNB supporting an Si interface for communicating with the EPC 111, an ng-eNB supporting an NG interface for communicating with the 5GC 160, or as a base station that supports the NR radio interface as well as an NG interface for communicating with the 5GC 160. The base station 106A can be implemented as an EN-DC gNB (en-gNB) with an Si interface to the EPC 111, an en-gNB that does not connect to the EPC 111, a gNB that supports the NR radio interface as well as an NG interface to the 5GC 160, or a ng-eNB that supports an EUTRA radio interface as well as an NG interface to the 5GC 160. To directly exchange messages during the scenarios discussed below, the base stations 104, 106A, and 106B can support an X2 or Xn interface.

Among other components, the EPC 111 can include a Serving Gateway (S-GW) 112 and a Mobility Management Entity (MME) 114. The S-GW 112 in general is configured to transfer user-plane packets related to audio calls, video calls, Internet traffic, etc., and the MME 114 is configured to manage authentication, registration, paging, and other related functions. The 5GC 160 includes a User Plane Function (UPF) 162 and an Access and Mobility Management (AMF) 164, and/or Session Management Function (SMF) 166. Generally speaking, the UPF 162 is configured to transfer user-plane packets related to audio calls, video calls, Internet traffic, etc., the AMF 164 is configured to manage authentication, registration, paging, and other related functions, and the SMF 166 is configured to manage PDU sessions.

As illustrated in FIG. 1A, the base station 104 supports a cell 124, the base station 106A supports a cell 126A, and the base station 106B supports a cell 126B. The cells 124 and 126A can partially overlap, as can the cells 124 and 126B, so that the UE 102 can communicate in DC with the base station 104 (operating as an MN) and the base station 106A (operating as an SN) and, upon completing an SN change, with the base station 104 (operating as MN) and the SN 106B. The base station 106A can also support additional cells 125A and 127A. More particularly, when the UE 102 is in DC with the base station 104 and the base station 106A, the base station 104 operates as an MeNB, an Mng-eNB or an MgNB, and the base station 106A operates as an SgNB or a Sng-eNB.

In general, the wireless communication network 100 can include any suitable number of base stations supporting NR cells and/or EUTRA cells. The EPC 111 or the 5GC 160 can be connected to any suitable number of base stations supporting NR cells and/or EUTRA cells. Although the examples below refer specifically to specific CN types (EPC, 5GC) and RAT types (5G NR and EUTRA), in general the techniques of this disclosure also can apply to other suitable radio access and/or core network technologies such as sixth generation (6G) radio access and/or 6G core network or 5G NR-6G DC.

With continued reference to FIG. 1A, the base station 104 includes processing hardware 130, which may include one or more general-purpose processors (e.g., central processing units (CPUs)) and a computer-readable memory storing machine-readable instructions executable on the general-purpose processor(s), and/or special-purpose processing units. The processing hardware 130 in the example implementation of FIG. 1 includes a carrier aggregation (CA) controller 132 that is configured to manage or control the CA techniques of this disclosure. For example, the CA controller 132 may be configured to manage or control RRC messaging and RRC configurations involving CA operations, cross-carrier scheduling, activation/deactivation of SCell(s), activation/deactivation of bandwidth part(s) (BWP(s)) and/or transmissions of DCIs to support the necessary CA operations when the UE 102 in single connectivity (SC) connects to the base station 104 or when the base station 104 operates as an MN relative to an SN.

The base station 106A includes processing hardware 140, which may include one or more general-purpose processors (e.g., CPUs) and a computer-readable memory storing machine-readable instructions executable on the general-purpose processor(s), and/or special-purpose processing units. The processing hardware 140 in the example implementation of FIG. 1 includes a CA controller 142 that is configured to manage or control the CA techniques of this disclosure. For example, the CA controller 142 may be configured to manage or control RRC messaging and RRC configurations involving CA operations, cross-carrier scheduling, activation/deactivation of SCell(s), activation/deactivation of BWP(s) and/or generation and transmissions of DCIs to support the necessary CA operations when the base station 106A operates as SN. The base station 106B may include processing hardware similar to the processing hardware 140 of the base station 106A.

Although FIG. 1A illustrates the CA controllers 132 and 142 as operating in an MN and an SN, respectively, a base station generally can operate as an MN, an SN, a candidate MN or a candidate SN in different scenarios. Thus, the MN 104, the SN 106A, and the SN 106B can implement similar sets of functions and support both MN and SN.

The UE 102 includes processing hardware 150, which may include one or more general-purpose processors (e.g., CPUs) and a computer-readable memory storing machine-readable instructions executable on the general-purpose processor(s), and/or special-purpose processing units. The processing hardware 150 in the example implementation of FIG. 1 includes a CA controller 152 that is configured to manage or control RRC messaging and RRC configurations involving CA operations, cross-carrier scheduling, activation/deactivation of SCell(s), activation/deactivation of BWP(s) and/or reception and processing of DCIs to support the necessary CA operations.

In operation, the UE 102 can use a radio bearer (e.g., a data radio bearer (DRB) or a signaling radio bearer (SRB)) that at different times terminates at the MN 104 or the SN 106A. The UE 102 can apply one or more security keys when communicating on the radio bearer, in the uplink (from the UE 102 to a base station) and/or downlink (from a base station to the UE 102) direction.

Figure 1B:
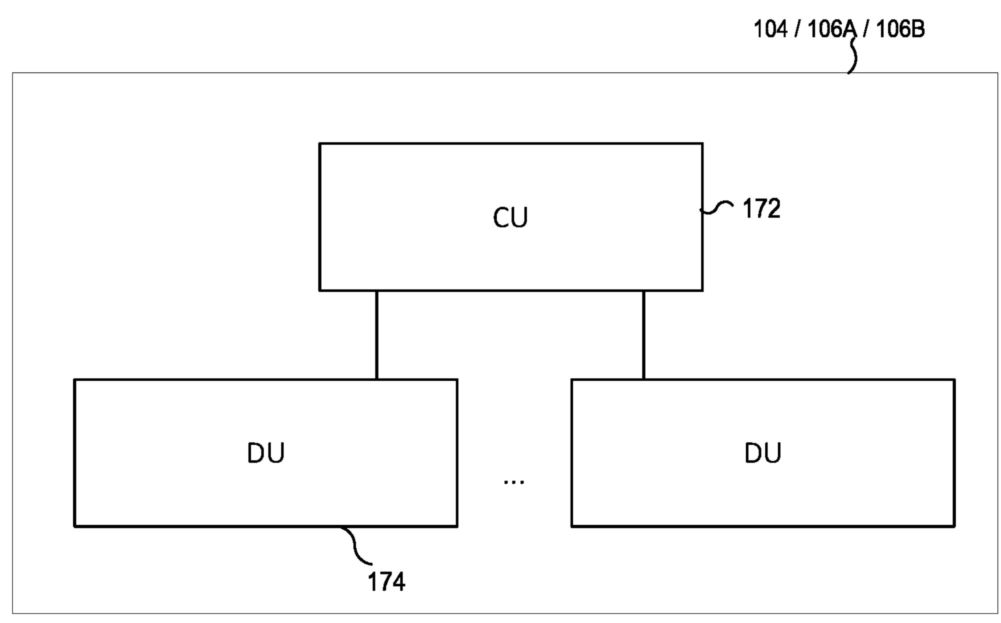
FIG. 1B is a block diagram of an example base station including a centralized unit (CU) and a distributed unit (DU) that can operate in the system of FIG. 1A.

FIG. 1B depicts an example distributed implementation of a base station such as the base station 104, 106A, or 106B.

The base station in this implementation can include a centralized unit (CU) 172 and one or more distributed units (DUs) 174. The CU 172 is equipped with processing hardware that can include one or more general-purpose processors such as CPUs and non-transitory computer-readable memory storing machine-readable instructions executable on the one or more general-purpose processors, and/or special-purpose processing units. In one example, the CU 172 is equipped with the processing hardware 130. In another example, the CU 172 is equipped with the processing hardware 140. The base station 106B can have hardware same as or similar to the base station 106A. The DU 174 is also equipped with processing hardware that can include one or more general-purpose processors such as CPUs and non-transitory computer-readable memory storing machine-readable instructions executable on the one or more general-purpose processors, and/or special-purpose processing units. In some examples, the processing hardware in an example implementation includes a medium access control (MAC) controller configured to manage or control one or more MAC operations or procedures (e.g., a random access procedure) and a radio link control (RLC) controller configured to manage or control one or more RLC operations or procedures when the base station 104, 106A, 106B operates as an MN, an SN. The process hardware may include further a physical layer controller configured to manage or control one or more physical layer operations or procedures.

Figure 2:
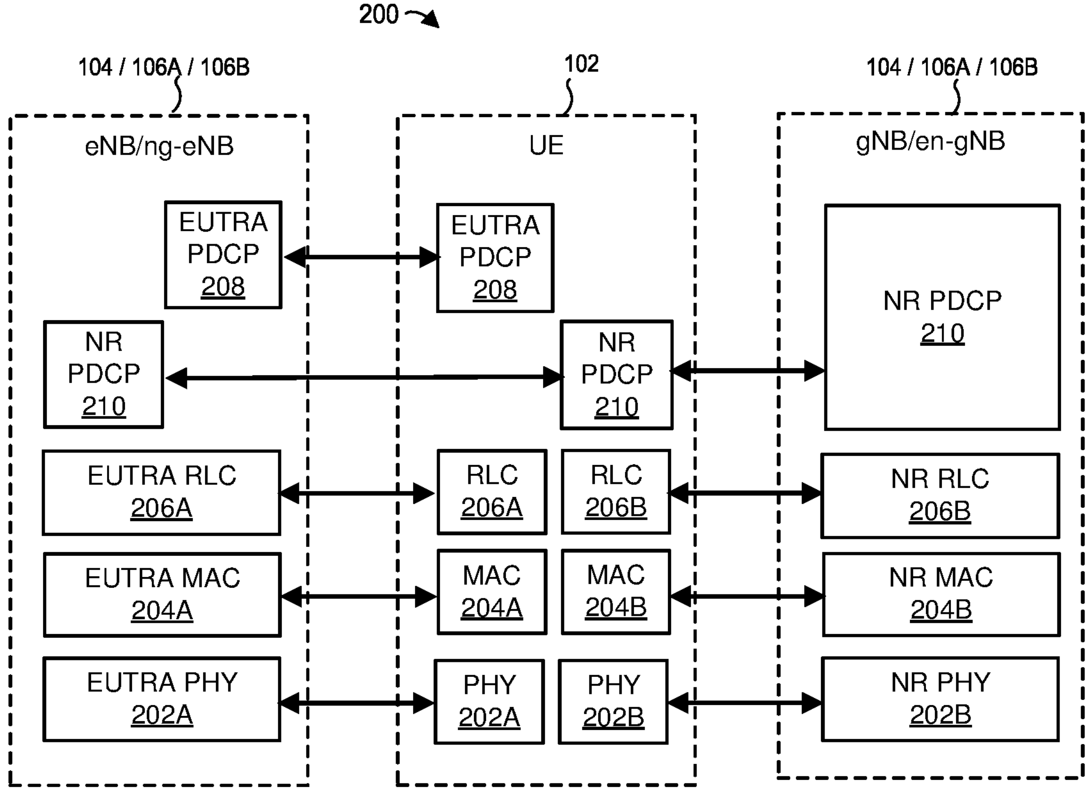
FIG. 2 is a block diagram of an example protocol stack according to which the UE of FIG. 1A communicates with base stations.

Next, FIG. 2 illustrates in a simplified manner a radio protocol stack according to which the UE 102 can communicate with an eNB/ng-eNB or a gNB. Each of the base stations 104, 106A, or 106B can be the eNB/ng-eNB or the gNB.

The physical layer (PHY) 202A of EUTRA provides transport channels to the EUTRA Medium Access Control (MAC) sublayer 204A, which in turn provides logical channels to the EUTRA Radio Link Control (RLC) sublayer 206A, and the EUTRA RLC sublayer in turn provides RLC channels to the EUTRA Packet Data Convergence Protocol (PDCP) sublayer 208 and, in some cases, NR PDCP sublayer 210. Similarly, the PHY 202B of NR provides transport channels to the NR MAC sublayer 204B, which in turn provides logical channels to the NR RLC sublayer 206B, and the NR RLC sublayer 206B in turn provides RLC channels to the NR PDCP sublayer 210. The UE 102 in some implementations supports both the EUTRA and the NR stack, to support handover between EUTRA and NR base stations and/or DC over EUTRA and NR interfaces. Further, as illustrated in FIG. 2A, the UE 102 can support layering of NR PDCP 210 over EUTRA RLC 206A.

Generally speaking, the PDCP sublayer of the radio protocol stack provides services such as transfer of user-plane data, ciphering, integrity protection, etc. For example, the PDCP layer defined for the EUTRA radio interface (see 3GPP specification TS 36.323) and NR (see 3GPP specification TS 38.323) provides sequencing of protocol data units (PDUs) in the uplink direction (from a user device, also known as a user equipment (UE), to a base station) as well as in the downlink direction (from the base station to the UE). Further, the PDCP sublayer provides SRBs and DRBs to the RRC sublayer. Generally speaking, the UE and a base station can use SRBs to exchange RRC messages as well as non-access stratum (NAS) messages, and can use DRBs to transport data on a user plane.

The EUTRA PDCP sublayer 208 and the NR PDCP sublayer 210 receive packets (e.g., from the Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 provide SRBs to exchange Radio Resource Control (RRC) messages, for example. On a user plane, the EUTRA PDCP sublayer 208 and the NR PDCP sublayer 210 provide DRBs to support data exchange.

When the UE 102 operates in EUTRA/NR DC (EN-DC), with the base station 104 operating as a MeNB and the base station 106A or 106B operating as a SgNB, the network can provide the UE 102 with an MN-terminated bearer that uses EUTRA PDCP 208 or MN-terminated bearer that uses NR PDCP 210. The network in various scenarios also can provide the UE 102 with an SN-terminated bearer, which use only NR PDCP 210. The MN-terminated bearer can be an MCG bearer or a split bearer. The SN-terminated bearer can be a SCG bearer or a split bearer. The MN-terminated bearer can be an SRB (e.g., SRB1 or SRB2) or a DRB. The SN-terminated bearer can an SRB (e.g., SRB) or a DRB.

More specifically, the UE 102 can use several types of SRBs and DRBs. When operating in DC, the cells associated with the base station operating the MN define a master cell group (MCG), and the cells associated with the base station operating as the SN define the secondary cell group (SCG). So-called SRB1 resources carry RRC messages, which in some cases include NAS messages over the dedicated control channel (DCCH), and SRB2 resources support RRC messages that include logged measurement information or NAS messages, also over the DCCH but with lower priority than SRB1 resources. More generally, SRB1 and SRB2 resources allow the UE and the MN to exchange RRC messages related to the MN and embed RRC messages related to the SN, and also can be referred to as MCG SRBs. SRB3 resources allow the UE and the SN to exchange RRC messages related to the SN, and can be referred to as SCG SRBs. Split SRBs allow the UE to exchange RRC messages directly with the MN via lower layer resources of the MN and the SN. Further, DRBs using the lower-layer resources of only the MN can be referred as MCG DRBs, DRBs using the lower-layer resources of only the SN can be referred as SCG DRBs, and DRBs using the lower-layer resources of both the MCG and the SCG can be referred to as split DRBs.

Figure 3A:
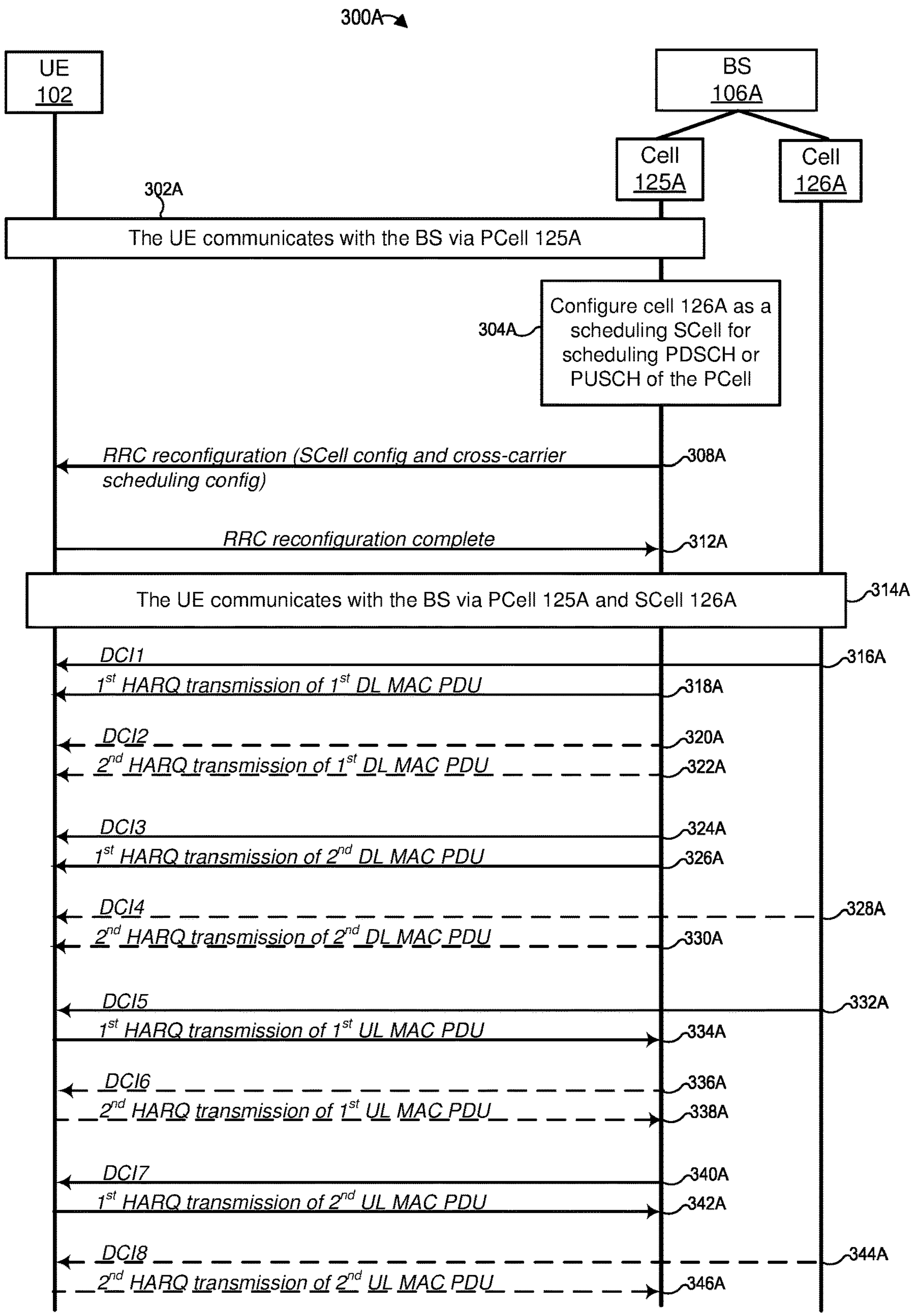
FIG. 3A is a messaging diagram of an example scenario in which a base station configures a secondary cell as a scheduling cell and, after failure of a HARQ transmission on the original cell, selects a different cell for a HARQ retransmission.
Figure 3B:
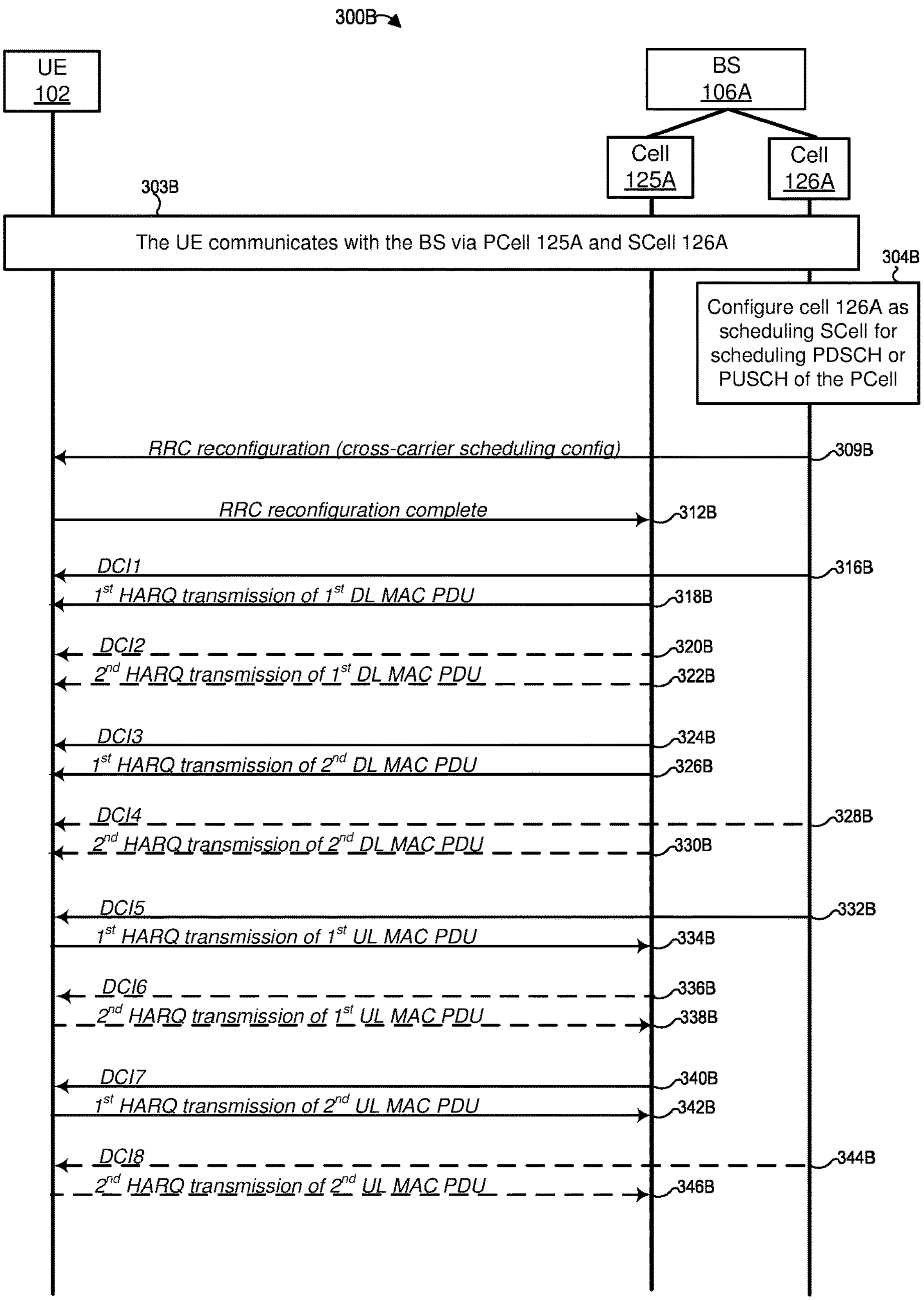
FIG. 3B is a messaging diagram of an example scenario similar to that of FIG. 3A, but with the UE communicating with the base station using carrier aggregation (CA) prior to the base station configuring the secondary cell as a scheduling cell.

Next, several example scenarios in which a base station initiates a CA operation procedure with a cross-carrier scheduling configuration are discussed with reference to FIGS. 3A-4D. FIGS. 3A and 3B depict scenarios in which a base station enables CA and cross-carrier scheduling for a UE for PUSCH or PDSCH of a PCell, and FIGS. 4A-D depict scenarios in which a SN enables CA and cross-carrier scheduling for a UE for PUSCH or PDSCH of a PSCell, when the UE operates in DC with an MN and the SN.

Although the examples of FIGS. 3A-4D refer primarily to transmitting and receiving data units such as MAC PDUs, these techniques also can apply to transmitting and receiving reference signals, channel state information, and other types of signaling, as discussed below with reference to FIG. 9.

Referring first to an example scenario 300A of FIG. 3A, the base station 106A operates at least cells 125A and 126A. Initially, the UE 102 communicates 302A data with the base station 106A via the PCell 125A. These communications can include uplink (UL) transmissions from the UE 102 to the base station 106A, and/or downlink (DL) transmissions from the base station 106A to the UE 102.

In some scenarios, the UE 102 communicates 302A data in SC with the base station 106A. In other scenarios, the UE 102 communicates 302A data in DC with the base station 106A operating as an MN and another base station (e.g., the base station 106B) operating as an SN (not shown in FIG. 3A to avoid clutter). For convenience, the base station 106A can be referred to as the MN both in SC and DC scenarios.

The base station 106A at some point determines 304A to configure cell 126A as a scheduling SCell for scheduling PDSCH or PUSCH of the PCell 125A. The base station 106A can make this determination based on one or more measurement results for cell 126A received from the UE 102, for example, or another suitable event. In response to this determination, the base station 106A transmits 308A an RRC reconfiguration message including an SCell configuration and a cross-carrier scheduling configuration for the cell 126A to the UE 102. In response to the RRC reconfiguration message, the UE 102 transmits 312A an RRC reconfiguration complete message to the base station 106A. In some implementations, the base station 106A can include the cross-carrier scheduling configuration in the SCell configuration. For example, the SCell configuration can be an SCellConfig information element (IE) and the cross-carrier scheduling configuration can be a CrossCarrierSchedulingConfig IE.

After receiving 308A the RRC reconfiguration message, the UE 102 in CA mode communicates 314A with the base station 106A via the PCell 125A and SCell 126A. According to the cross-carrier scheduling configuration, the base station 106A can transmit 316A to the UE 102, via the SCell 126A, a first DCI command (DCI1). This command can include multiple configuration parameters for a first hybrid automatic repeat request (HARQ) transmission of a first DL MAC PDU on the PCell 125A. The base station 106A then transmits 318A the first HARQ transmission of the first DL MAC PDU on the PCell 125A according to the multiple configuration parameters. In some implementations, the base station 106A transmits the DCI1 on the SCell 126A because PDCCH resources on the PCell 125A are not available for the UE 102, at the time when the base station 106A transmits the DCI1.

The multiple configuration parameters can include a carrier indicator, a HARQ process number, a frequency-domain resource assignment, a time-domain resource assignment, a redundancy version (RV), a new data indicator (NDI), a modulation and coding scheme (MCS), a Transmit Power Control (TPC) command for physical uplink control channel (PUCCH) and/or PUCCH resource indicator. The multiple configuration parameters can also include additional parameters such as an identifier of the DCI format, a bandwidth part (BWP) indicator, a virtual resource block (VRB) to physical resource block (PRB) mapping, a PRB bundling size indicator, a rate matting indicator, a channel state information reference signal (CSI-RS) trigger, downlink assignment index, a physical downlink shared channel (PDSCH) to HARQ feedback timing indicator, an antenna port(s) and number of layers, transmission configuration indication, a sounding reference signal (SRS) request and/or demodulation reference signal (DRMS) sequence initialization.

The UE 102 receives and processes the first HARQ transmission of the first DL MAC PDU on the PCell 125A according to the multiple configuration parameters in the DCI1. For example, the base station 106A can configure a value of the carrier indicator for the PCell 125A in the cross-carrier scheduling configuration. The base station 106A can set the carrier indicator in the DCI1 to the value of the carrier indicator for the PCell 125A. Thus, the UE 102 can determine to receive the first HARQ transmission of the first DL MAC PDU on the PCell 125A according to the value of the carrier indicator. The base station 106A can set the NDI in the DCI1 for the first HARQ transmission of the first DL MAC PDU to a value indicating the first HARQ transmission of the first DL MAC PDU is a new transmission. Thus, the UE 102 can determine the first HARQ transmission of the first DL MAC PDU is a new transmission according to the value of the NDI. For example, the UE 102 may store a value of a previously received NDI associated to a HARQ process identified by the HARQ process number included in the DCI1 If the value of the NDI compared to the stored value of the previously NDI is different (e.g., toggled), the UE 102 determines the first HARQ transmission of the first DL MAC PDU is a new HARQ transmission. Otherwise, the UE 102 determines that the first HARQ transmission of the first DL MAC PDU is a HARQ retransmission. The UE 102 can receive the first HARQ transmission on the PCell 125A within the time and/or frequency resources which the time-domain resource assignment and/or the frequency-domain resource assignment included in the DCI1 command specify.

In some scenarios and implementations, the UE 102 successfully obtains the first DL MAC PDU from the first HARQ transmission of the first DL MAC PDU according to the DCI1. In this case, the UE 102 transmits a HARQ acknowledgement (ACK) on the PCell 125A to the base station 106A to indicate successful reception of the first DL MAC PDU. For example, the UE 102 may decode the first HARQ transmission according to the DCI1 to obtain a transport block including the first DL MAC PDU and the transport block passes cyclic-redundancy check (CRC) check, so that the UE 102 succeeds to obtain the first DL MAC PDU from the transport block.

In another scenario, however, the UE 102 transmits a HARQ negative acknowledgement (NACK) to the base station 106A on the PCell 125A, after the UE 102 fails to obtain the first DL MAC PDU from the first HARQ transmission of the first DL MAC PDU according to the DCI1. For example, the UE 102 may decode the first HARQ transmission according to the DCI1 to obtain a transport block and detect a failure of the CRC check for the transport block, so that the UE 102 fails to obtain the first DL MAC PDU from the transport block. In response to the HARQ NACK, the base station 106A can transmit 320A a second DCI command (DCI2) on the PCell 125A for transmitting a second HARQ transmission of the first DL MAC PDU. The base station 106A can then transmit 322A the second HARQ transmission of the first DL MAC PDU on the PCell 125A to the UE 102.

The UE 102 can combine the first HARQ transmission and the second HARQ transmission, and decode the combination of the first HARQ transmission and the second HARQ transmission to obtain the first DL MAC PDU. In some implementations, the base station 106A always transmits a HARQ retransmission (e.g., the second HARQ transmission) of a MAC PDU on the same cell as a HARQ new transmission (e.g., the first HARQ transmission) of the MAC PDU. That is, the base station 106A refrains from performing a HARQ retransmission of a MAC PDU on a cell different from the cell on which the HARQ transmission of the MAC PDU occurred.

In one scenario, the base station 106A transmits 320A the DCI2 on the PCell 125A because PDCCH resources on the SCell 126A are not available for the UE 102 at the time when the base station 106A transmits the DCI2. In another scenario, the base station 106A transmits the DCI2 on the PCell 125A because the SCell 126A is deactivated for the UE 102. In yet another scenario, the base station 106A transmits the DCI2 on the PCell 125A because the SCell 126A is in the dormant state for the UE 102. In yet another scenario, the base station 106A transmits the DCI2 on the PCell 125A because a downlink BWP on the SCell 126A, on which the UE 102 receives PDCCH(s), is in the dormant state for the UE 102. The UE 102 may not monitor PDCCH(s) of the deactivated SCell 126A, dormant SCell 126A or dormant downlink BWP in the SCell 126A, at least in some of the implementations.

The DCI2 can include multiple configuration parameters similar to the DCI1. In one implementation, the DCI2 may not include a carrier indicator. In this implementation, the UE 102 can determine to receive the second HARQ transmission of the first DL MAC PDU on the PCell 125A according to a default configuration. The default configuration can indicate that if the UE 102 receives a DCI (e.g., the DCI2) on a cell, which does not include a carrier indicator and configures a HARQ transmission (e.g., the second HARQ transmission 322A), the UE 102 receives the HARQ transmission in the cell according to the DCI. In another implementation, the DCI2 includes a carrier indicator. In this implementation, the base station 106A can set a value of the carrier indicator to a value included in the cross-carrier scheduling configuration. Thus, the UE 102 can determine that it should receive the second HARQ transmission of the first DL MAC PDU on the PCell 125A according to the value of the carrier indicator. The carrier indicator in the DCI2 and the carrier indicator in the DCI1 can have the same values or different values.

In some implementations, the DCI2 and the DCI1 include the same HARQ process number (i.e., value) and the same NDI value for the first and second HARQ transmissions of the first DL MAC PDU, so that the UE 102 can determine that the second HARQ transmission of the first DL MAC PDU is a retransmission of the first DL MAC PDU from the HARQ process number and the NDI (value) in the DCI2. The base station 106A can set a RV in the DCI2 for the second HARQ transmission to a value which is the same as or different from the RV in the DCI1 for the first HARQ transmission. If the RV in the DCI2 and the RV in the DCI1 are different, the UE 102 can perform HARQ operation (e.g., HARQ combining with incremental redundancy) to combine the first and second HARQ transmissions of the first DL MAC PDU to obtain the first DL MAC PDU. If the RV in the DCI2 and the RV in the DCI1 are the same, the UE 102 can perform HARQ operation (e.g., HARQ chase combining) to combine the first and second HARQ transmissions of the first DL MAC PDU to obtain the first DL MAC PDU. If the UE 102 succeeds to obtain the first DL MAC PDU from the HARQ operation, i.e., decoding the combination to obtain a transport block including the first DL MAC PDU and passing CRC check, the UE 102 transmits a HARQ ACK on the PCell 125A to the base station 106A to indicate successful reception of the first DL MAC PDU. If the UE 102 fails to obtain the first DL MAC PDU from the HARQ operation, i.e., decoding the combination to obtain a transport block failing CRC check, the UE 102 transmits a HARQ NACK on the PCell 125A to the base station 106A to indicate failing reception of the first DL MAC PDU. In response to the HARQ NACK, the base station 106A can transmit an additional DCI to the UE 102 on the PCell 125A or the SCell 126A to indicate the UE 102 to receive a HARQ retransmission of the first DL MAC PDU on the PCell 125A. The additional DCI can include the same HARQ process number as the DCI2. The additional DCI can include the same NDI (value) for the second HARQ transmission as the DCI2 to indicate the HARQ retransmission. The additional DCI can include the same RV for the second HARQ transmission as the DCI2. Alternatively, the additional DCI can include a RV for the HARQ retransmission, which is different from the RV for the second HARQ transmission in the DCI2. Similarly, the UE 102 can perform HARQ operation to combine the HARQ retransmission with the first and second HARQ transmissions according the RV in the additional DCI to obtain the first DL MAC PDU in a similar manner as described above.

In some scenarios and implementations, the base station 106A can also configure the UE 102 to receive a first additional HARQ transmission of an additional DL MAC PDU on the PCell 125A in the DCI1. In such cases, the base station 106A can include additional configuration parameters for the first additional HARQ transmission in the DCI1. The additional configuration parameters can include particular configuration parameters to receive and/or process the first additional HARQ transmission. The particular configuration parameters are similar to configuration parameters in the multiple configuration parameters described above. The UE 102 can receive and/or process the first additional HARQ transmission on the PCell 125A according to the additional configuration parameters and some of the multiple configuration parameters. For example, the additional configuration parameters can include separate MCS, NDI and/or RV from the MCS, NDI and/or RV for the first HARQ transmission of the first DL MAC PDU, so that the base station 106A can set different MCS, NDI and/or RV for the first additional HARQ transmission from the first HARQ transmission. The base station 106A can transmit the first additional HARQ transmission on the PCell 125A in the same time and frequency resources as the first HARQ transmission of the first DL MAC PDU. The UE 102 receives the first additional HARQ transmission on the PCell 125A in the same time and frequency resources as the first HARQ transmission of the first DL MAC PDU. In some implementations, the additional configuration parameters can include separate time-domain resource assignment and/or frequency-domain resource assignment from the time-domain resource assignment and/or frequency-domain resource assignment for the first HARQ transmission of the first DL MAC PDU. In the separate time-domain resource assignment and/or frequency-domain resource assignment, the base station 106A can configure different time and/or frequency resources from the first HARQ transmission of the first DL MAC PDU. In this case, the base station 106A can transmit the first additional HARQ transmission on the PCell 125A in the different time and/or frequency resources. The UE 102 receives the first additional HARQ transmission on the PCell 125A in the time and/or frequency resources configured by the separate time-domain resource assignment and/or frequency-domain resource assignment.

In other implementations, the additional configuration parameters can include a separate BWP indicator from the BWP indicator for the first HARQ transmission of the first DL MAC PDU. In the separate BWP indicator, the base station 106A can configure a different BWP from a BWP for the first HARQ transmission of the first DL MAC PDU. In this case, the base station 106A can transmit the first additional HARQ transmission on the PCell 125A in the different BWP. The UE 102 receives the first additional HARQ transmission on the PCell 125A in the different BWP configured by the separate BWP indicator.

The UE 102 can receive the first additional HARQ transmission on the PCell 125A according to the additional configuration parameters and optionally some of the multiple configuration parameters (if some configuration parameters are shared/common for the first HARQ transmission and the first additional HARQ transmission). For example, the carrier indication is shared between the first HARQ transmission and the first additional HARQ transmission. The UE 102 can determine to receive the first additional HARQ transmission of the additional DL MAC PDU on the PCell 125A according to the value of the carrier indicator in the DCI1. In another example, the additional configuration parameters include an additional NDI. In one implementation, the base station 106A can set the additional NDI in the DCI1 for the first additional HARQ transmission of the first DL MAC PDU to a value indicating the first additional HARQ transmission of the additional DL MAC PDU is a new transmission. Thus, the UE 102 can determine the first additional HARQ transmission of the additional DL MAC PDU is a new transmission according to the value of the additional NDI. For example, the UE 102 may store a value of a previously received NDI associated to a HARQ process identified by the HARQ process number included in the DCI1. If the value of the additional NDI compared to the stored value of the previously NDI is different (e.g., toggled), the UE 102 determines the first additional HARQ transmission of the additional DL MAC PDU is a new HARQ transmission. Otherwise, the UE 102 determines the first additional HARQ transmission of the additional DL MAC PDU is a HARQ retransmission. In another implementation, the base station 106A can set the additional NDI in the DCI1 for the first additional HARQ transmission of the first DL MAC PDU to a value indicating the first additional HARQ transmission of the additional DL MAC PDU is a HARQ retransmission. Thus, the UE 102 can determine the first additional HARQ transmission of the additional DL MAC PDU is a retransmission according to the value of the additional NDI. For example, the UE 102 may store a value of a previously received NDI associated to a HARQ process identified by the HARQ process number included in the DCI1. If the value of the additional NDI compared to the stored value of the previously NDI is the same (e.g., not toggled), the UE 102 determines the first additional HARQ transmission of the additional DL MAC PDU is a HARQ retransmission.

In some scenarios and implementations, the UE 102 succeeds to obtain the additional DL MAC PDU from the first additional HARQ transmission of the additional DL MAC PDU according to the DCI1. In this case, the UE 102 transmits a HARQ ACK on the PCell 125A to the base station 106A to indicate successful reception of the additional DL MAC PDU. For example, the UE 102 may decode the first additional HARQ transmission according to the DCI1 to obtain a transport block including the additional DL MAC PDU and the transport block passes CRC check, so that the UE 102 succeeds to obtain the additional DL MAC PDU from the transport block. If the base station 106A receives the HARQ ACK for the first DL MAC PDU and the HARQ ACK for the additional DL MAC PDU, the base station 106A in one implementation can transmit an additional DCI to the UE 102 on the PCell 125A or the SCell 126A to indicate the UE 102 to receive an additional HARQ transmission of another DL MAC PDU on the PCell 125A. The UE 102 can receive this DL MAC PDU according to the additional DCI in a similar manner in which the UE 102 receives the first DL MAC PDU according to the DCI1. The additional DCI can include the same HARQ process number as the DCI1 and other configuration parameters similar to the DCI1. The base station 106A can set the other configuration parameters to the same as the DCI1 or different values from the DCI1.

In other scenarios and implementations, the UE 102 can transmit a HARQ NACK to the base station 106A on the PCell 125A if the UE 102 fails to obtain the additional DL MAC PDU from the first additional HARQ transmission of the additional DL MAC PDU according to the DCI1. For example, the UE 102 may decode the first additional HARQ transmission according to the DCI1 to obtain a transport block and fail CRC check or parity check on the transport block, so that the UE 102 fails to obtain the additional DL MAC PDU from the transport block. In response to the HARQ NACK, the base station 106A can configure a second additional HARQ transmission of the additional DL MAC PDU in the DCI2. The base station 106A can then transmit the second additional HARQ transmission of the additional DL MAC PDU on the PCell 125A to the UE 102. The UE 102 can receive the second additional HARQ transmission on the PCell 125A according to common configuration parameters and additional configuration parameters in the DCI2. The common configuration parameters are common for the UE 102 to receive the second HARQ transmission and the second additional HARQ transmission. The additional configuration parameters are specific for the UE 102 to receive and/or process the second additional HARQ transmission. The UE 102 can combine the first additional HARQ transmission and the second additional HARQ transmission, and decode the combination of the first additional HARQ transmission and the second additional HARQ transmission to obtain the additional DL MAC PDU.

For the second additional HARQ transmission, the DCI2 can include additional configuration parameters similar to the DCI1. For example, the base station 106A can transmit the second additional HARQ transmission on the PCell 125A in the same or different time and frequency resources as the second HARQ transmission of the first DL MAC PDU. In some implementations, the DCI2 and the DCI1 include the same HARQ process number (i.e., value) and the same additional NDI value for the first and second additional HARQ transmissions of the additional DL MAC PDU, so that the UE 102 can determine the second additional HARQ transmission of the additional DL MAC PDU is a retransmission of the additional DL MAC PDU from the HARQ process number and the additional NDI (value) in the DCI2. The base station 106A can set an additional RV in the DCI2 for the second additional HARQ transmission to a value which is the same as or different from the additional RV in the DCI1 for the first additional HARQ transmission. If the additional RV in the DCI2 and the additional RV in the DCI1 are different, the UE 102 can perform HARQ operation with incremental redundancy to combine the first and second additional HARQ transmissions of the additional DL MAC PDU to obtain the first DL MAC PDU. If the RV in the DCI2 and the RV in the DCI1 are the same, the UE 102 can HARQ operation with chase combining to combine the first and second additional HARQ transmissions of the additional DL MAC PDU to obtain the additional DL MAC PDU.

If the UE 102 succeeds to obtain the additional DL MAC PDU from the HARQ operation, i.e., decoding the combination to obtain a transport block including the additional DL MAC PDU and passing CRC check, the UE 102 transmits a HARQ ACK on the PCell 125A to the base station 106A to indicate successful reception of the additional DL MAC PDU. If the UE 102 fails to obtain the additional DL MAC PDU from the HARQ operation, i.e., decoding the combination to obtain a transport block failing CRC check, the UE 102 transmits a HARQ NACK on the PCell 125A to the base station 106A to indicate failing reception of the additional DL MAC PDU. In response to the HARQ NACK, the base station 106A can transmit an additional DCI to the UE 102 on the PCell 125A or the SCell 126A to indicate the UE 102 to receive a HARQ retransmission of the additional DL MAC PDU on the PCell 125A. The additional DCI can include the same HARQ process number as the DCI2. The additional DCI can include the same NDI (value) for the second additional HARQ transmission as the DCI2 to indicate that the HARQ retransmission. The additional DCI can include the same RV for the second additional HARQ transmission as the DCI2. Alternatively, the additional DCI can include a RV for the HARQ retransmission, which is different from the RV for the second additional HARQ transmission in DCI2.

In some implementations, the base station 106A uses the same DCI format or different DCI formats for the DCIs (e.g., the DCI1, DCI2, additional DCI, etc.). For example, the base station 106A can use an existing DCI format (e.g., DCI format 1_0, DCI format 1_1) or a new DCI format (e.g., DCI format 1_2, DCI format 1_3, etc.) for the DCI1. In another example, the base station 106A can use an existing DCI formation (e.g., DCI format 1_0, DCI format 1_1) or a new DCI format (e.g., DCI format 1_2, DCI format 1_3, etc.) for the DCI2.

After receiving the RRC reconfiguration message, the UE 102 in CA communicates 314A with the base station 106A via the PCell 125A and SCell 126A. According to the cross-carrier scheduling configuration, the base station 106A can transmit the UE 102, via the PCell 125A, 324A a third DCI command (DCI3) which includes multiple configuration parameters for a first HARQ transmission of a second DL MAC PDU on the PCell 125A. Then the base station 106A transmits 326A the first HARQ transmission of the second DL MAC PDU on the PCell 125A according to the multiple configuration parameters. In some implementations, the base station 106A transmits the DCI3 on the PCell 125A because PDCCH resources on the SCell 126A is not available for the UE 102 at a time instance where the base station 106A transmits the DCI3.

The DCI3 command can include multiple configuration parameters, similar to the DC1 command discussed above.

The UE 102 receives and processes the first HARQ transmission of the second DL MAC PDU on the PCell 125A according to the multiple configuration parameters in the DCI3. In one implementation, the DCI3 may not include a carrier indicator. In this implementation, the UE 102 can determine to receive the first HARQ transmission of the second DL MAC PDU on the PCell 125A according to a default configuration. The default configuration can be that if the UE 102 receives a DCI on a cell, which does not include a carrier indicator and configures a DL transmission, the UE 102 receives a HARQ transmission in the cell according to the DCI. In another implementation, the DCI3 includes a carrier indicator. In this implementation, the base station 106A can set a value of the carrier indicator to a value included in the cross-carrier scheduling configuration. Thus, the UE 102 can determine to receive the first HARQ transmission of the second DL MAC PDU on the PCell 125A according to the value of the carrier indicator.

In some implementations, the base station 106A can set the NDI in the DCI3 for the first HARQ transmission of the second DL MAC PDU to a value indicating the first HARQ transmission of the second DL MAC PDU is a new transmission. Thus, the UE 102 can determine the first HARQ transmission of the second DL MAC PDU is a new transmission according to the value of the new data indicator. For example, the UE 102 may store a value of a previously received NDI associated to a HARQ process identified by the HARQ process number included in the DCI3. The UE 102 determines the first HARQ transmission of the second DL MAC PDU is a new transmission if the value of the NDI compared to the stored value of the previously NDI is different (e.g., toggled). In some implementations, the UE 102 can receive the first HARQ transmission on the PCell 125A in time and/or frequency resources assigned by the time domain resource assignment and/or the frequency domain resource assignment in the DCI3.

In some scenarios and implementations, the UE 102 succeeds to obtain the second DL MAC PDU from the first HARQ transmission of the second DL MAC PDU according to the DCI3. In this case, the UE 102 transmits a HARQ ACK on the PCell 125A to the base station 106A to indicate successful reception of the second DL MAC PDU. For example, the UE 102 may decode the first additional HARQ transmission according to the DCI3 to obtain a transport block including the second DL MAC PDU and the transport block passes CRC check, so that the UE 102 succeeds to obtain the second DL MAC PDU from the transport block.

In other scenarios and implementations, the UE 102 can transmit a HARQ NACK to the base station 106A on the PCell 125A if the UE 102 fails to obtain the second DL MAC PDU from the first HARQ transmission of the second DL MAC PDU according to the DCI3. For example, the UE 102 may decode the first HARQ transmission according to the DCI3 to obtain a transport block and fail CRC check for the transport block, so that the UE 102 fails to obtain the second DL MAC PDU from the transport block. In response to the HARQ NACK, the base station 106A can transmit 328A a fourth DCI command (DCI4) on the SCell 126A for transmitting a second HARQ transmission of the second DL MAC PDU. The base station 106A can then transmit 330A the second HARQ transmission of the second DL MAC PDU on the PCell 125A to the UE 102. The UE 102 can combine the first HARQ transmission and the second HARQ transmission and decode the combination of the first HARQ transmission and the second HARQ transmission to obtain the second DL MAC PDU. In some implementations, the base station 106A always transmits a HARQ retransmission (e.g., the second HARQ transmission) of a MAC PDU on the same cell as a HARQ new transmission (e.g., the first HARQ transmission) of the MAC PDU. That is, the base station 106A refrains from transmitting a HARQ retransmission of a MAC PDU on a different cell from a HARQ new transmission of the MAC PDU.

In one scenario and implementation, the base station 106A transmits the DCI4 on the SCell 126A because PDCCH resources on the PCell 125A is not available for the UE 102 at a time instance where the base station 106A transmits the DCI4.

The DCI4 can include multiple configuration parameters similar to the DCI3. The DCI4 includes a carrier indicator, and the base station 106A can set a value of the carrier indicator to a value included in the cross-carrier scheduling configuration. Thus, the UE 102 can determine to receive the second HARQ transmission of the second DL MAC PDU on the PCell 125A according to the value of the carrier indicator. If the DCI 3 includes a carrier indicator, the carrier indicator in the DCI4 and the carrier indicator in the DCI3 can have the same values or different values.

In some implementations, the DCI4 and the DCI3 include the same HARQ process number (i.e., value) and the same NDI value for the first and second HARQ transmissions of the second DL MAC PDU, so that the UE 102 can determine the second HARQ transmission of the second DL MAC PDU is a retransmission of the second DL MAC PDU from the HARQ process number and the NDI (value) in the DCI4. The base station 106A can set a RV in the DCI4 for the second HARQ transmission to a value which is the same as or different from the RV in the DCI3 for the first HARQ transmission. If the RV in the DCI4 and the RV in the DCI3 are different, the UE 102 can perform HARQ operation (e.g., HARQ combining with incremental redundancy) to combine the first and second HARQ transmissions of the second DL MAC PDU to obtain the second DL MAC PDU. If the RV in the DCI4 and the RV in the DCI3 are the same, the UE 102 can HARQ operation (e.g., HARQ chase combining) to combine the first and second HARQ transmissions of the second DL MAC PDU to obtain the second DL MAC PDU. If the UE 102 succeeds to obtain the second DL MAC PDU from the HARQ operation, i.e., decoding the combination to obtain a transport block including the second DL MAC PDU and passing CRC check, the UE 102 transmits a HARQ ACK on the PCell 125A to the base station 106A to indicate successful reception of the second DL MAC PDU. If the UE 102 fails to obtain the second DL MAC PDU from the HARQ operation, i.e., decoding the combination to obtain a transport block failing CRC check, the UE 102 transmits a HARQ NACK on the PCell 125A to the base station 106A to indicate failing reception of the second DL MAC PDU. In response to the HARQ NACK, the base station 106A can transmit an additional DCI to the UE 102 on the PCell 125A or the SCell 126A to indicate the UE 102 to receive a HARQ retransmission of the second DL MAC PDU on the PCell 125A. The additional DCI can include the same HARQ process number as the DCI4. The additional DCI can include the same NDI (value) for the second HARQ transmission as the DCI4 to indicate the HARQ retransmission. The additional DCI can include the same RV for the second HARQ transmission as the DCI4. Alternatively, the additional DCI can include a RV for the HARQ retransmission, which is different from the RV for the second HARQ transmission in the DCI4. Similarly, the UE 102 can perform HARQ operation to combine the HARQ retransmission with the first and second HARQ transmissions according the RV in the additional DCI to obtain the second DL MAC PDU in a similar manner as described above.

In some scenarios and implementations, the base station 106A can also configure the UE 102 to receive a first additional HARQ transmission of an additional DL MAC PDU on the PCell 125A in the DCI3. In such cases, the base station 106A can include additional configuration parameters for the first additional HARQ transmission in the DCI3. The additional configuration parameters can include particular configuration parameters to receive and/or process the first additional HARQ transmission. The particular configuration parameters are similar to configuration parameters in the multiple configuration parameters described above. The UE 102 can receive and/or process the first additional HARQ transmission on the PCell 125A according to the additional configuration parameters and some of the multiple configuration parameters. For example, the additional configuration parameters can include separate MCS, NDI and/or RV from the MCS, NDI and/or RV for the first HARQ transmission of the second DL MAC PDU, so that the base station 106A can set different MCS, NDI and/or RV for the first additional HARQ transmission from the first HARQ transmission. The base station 106A can transmit the first additional HARQ transmission on the PCell 125A in the same time and frequency resources as the first HARQ transmission of the second DL MAC PDU. The UE 102 receives the first additional HARQ transmission on the PCell 125A in the same time and frequency resources as the first HARQ transmission of the second DL MAC PDU. In some implementations, the additional configuration parameters can include separate time domain resource assignment and/or frequency domain resource assignment from the time domain resource assignment and/or frequency domain resource assignment for the first HARQ transmission of the second DL MAC PDU. In the separate time domain resource assignment and/or frequency domain resource assignment, the base station 106A can configure different time and/or frequency resources from the first HARQ transmission of the second DL MAC PDU. In this case, the base station 106A can transmit the first additional HARQ transmission on the PCell 125A in the different time and/or frequency resources. The UE 102 receives the first additional HARQ transmission on the PCell 125A in the time and/or frequency resources configured by the separate time domain resource assignment and/or frequency domain resource assignment.

In other implementations, the additional configuration parameters can include a separate BWP indicator from the BWP indicator for the first HARQ transmission of the second DL MAC PDU. In the separate BWP indicator, the base station 106A can configure a different BWP from a BWP for the first HARQ transmission of the second DL MAC PDU. In this case, the base station 106A can transmit the first additional HARQ transmission on the PCell 125A in the different BWP. The UE 102 receives the first additional HARQ transmission on the PCell 125A in the different BWP configured by the separate BWP indicator.

The UE 102 can receive the first additional HARQ transmission on the PCell 125A according to the additional configuration parameters and optionally some of the multiple configuration parameters (if some configuration parameters are shared/common for the first HARQ transmission and the first additional HARQ transmission). For example, if the DCI5 includes the carrier indicator, the carrier indication is shared between the first HARQ transmission and the first additional HARQ transmission. The UE 102 can determine to receive the first additional HARQ transmission of the additional DL MAC PDU on the PCell 125A according to the value of the carrier indicator in the DCI3. In another example, the additional configuration parameters include an additional NDI. In one implementation, the base station 106A can set the additional NDI in the DCI3 for the first additional HARQ transmission of the second DL MAC PDU to a value indicating the first additional HARQ transmission of the additional DL MAC PDU is a new transmission. Thus, the UE 102 can determine the first additional HARQ transmission of the additional DL MAC PDU is a new transmission according to the value of the additional NDI. For example, the UE 102 may store a value of a previously received NDI associated to a HARQ process identified by the HARQ process number included in the DCI3. The UE 102 determines the first additional HARQ transmission of the additional DL MAC PDU is a new transmission if the value of the additional NDI compared to the stored value of the previously NDI is different (e.g., toggled). In another implementation, the base station 106A can set the additional NDI in the DCI3 for the first additional HARQ transmission of the second DL MAC PDU to a value indicating the first additional HARQ transmission of the additional DL MAC PDU is a retransmission. Thus, the UE 102 can determine the first additional HARQ transmission of the additional DL MAC PDU is a retransmission according to the value of the additional NDI. For example, the UE 102 may store a value of a previously received NDI associated to a HARQ process identified by the HARQ process number included in the DCI3. The UE 102 determines the first additional HARQ transmission of the additional DL MAC PDU is a retransmission if the value of the additional NDI compared to the stored value of the previously NDI is the same (e.g., not toggled).

In some scenarios and implementations, the UE 102 succeeds to obtain the additional DL MAC PDU from the first additional HARQ transmission of the additional DL MAC PDU according to the DCI3. In this case, the UE 102 transmits a HARQ ACK on the PCell 125A to the base station 106A to indicate successful reception of the additional DL MAC PDU. For example, the UE 102 may decode the first additional HARQ transmission according to the DCI3 to obtain a transport block including the additional DL MAC PDU and the transport block passes CRC check, so that the UE 102 succeeds to obtain the additional DL MAC PDU from the transport block. If the base station 106A receives from the UE 102 the HARQ ACK for the first DL MAC PDU and the HARQ ACK for the additional DL MAC PDU, the base station 106A in one implementation can transmit an additional DCI to the UE 102 on the PCell 125A or the SCell 126A to indicate the UE 102 to receive an additional HARQ transmission of another DL MAC PDU on the PCell 125A. The UE 102 can receive this DL MAC PDU according to the additional DCI in a similar manner in which the UE 102 receives the first DL MAC PDU according to the DCI3. The additional DCI can include the same HARQ process number as the DCI3 and other configuration parameters similar to the DCI3. The base station 106A can set the other configuration parameters to the same as the DCI3 or different values from the DCI3.

In other scenarios and implementations, the UE 102 can transmit a HARQ NACK to the base station 106A on the PCell 125A if the UE 102 fails to obtain the additional DL MAC PDU from the first additional HARQ transmission of the additional DL MAC PDU according to the DCI3. For example, the UE 102 may decode the first additional HARQ transmission according to the DCI3 to obtain a transport block and fail CRC check or parity check on the transport block, so that the UE 102 fails to obtain the additional DL MAC PDU from the transport block. In response to the HARQ NACK, the base station 106A can configure a second additional HARQ transmission of the additional DL MAC PDU in the DCI4. The base station 106A can then transmit the second additional HARQ transmission of the additional DL MAC PDU on the PCell 125A to the UE 102. The UE 102 can receive the second additional HARQ transmission on the PCell 125A according to common configuration parameters and additional configuration parameters in the DCI4. The common configuration parameters are common for the UE 102 to receive the second HARQ transmission and the second additional HARQ transmission. The additional configuration parameters are specific for the UE 102 to receive and/or process the second additional HARQ transmission. The UE 102 can combine the first additional HARQ transmission and the second additional HARQ transmission and decode the combination of the first additional HARQ transmission and the second additional HARQ transmission to obtain the additional DL MAC PDU.

For the second additional HARQ transmission, the DCI4 can include additional configuration parameters similar to the DCI3. For example, the base station 106A can transmit the second additional HARQ transmission on the PCell 125A in the same or different time and frequency resources as the second HARQ transmission of the second DL MAC PDU. In some implementations, the DCI4 and the DCI3 include the same HARQ process number (i.e., value) and the same additional NDI value for the first and second additional HARQ transmissions of the additional DL MAC PDU, so that the UE 102 can determine the second additional HARQ transmission of the additional DL MAC PDU is a retransmission of the additional DL MAC PDU from the HARQ process number and the additional NDI (value) in the DCI4. The base station 106A can set an additional RV in the DCI4 for the second additional HARQ transmission to a value which is the same as or different from the additional RV in the DCI3 for the first additional HARQ transmission. If the additional RV in the DCI4 and the additional RV in the DCI3 are different, the UE 102 can perform HARQ operation with incremental redundancy to combine the first and second additional HARQ transmissions of the additional DL MAC PDU to obtain the second DL MAC PDU. If the RV in the DCI4 and the RV in the DCI3 are the same, the UE 102 can HARQ operation with chase combining to combine the first and second additional HARQ transmissions of the additional DL MAC PDU to obtain the additional DL MAC PDU.

If the UE 102 succeeds to obtain the additional DL MAC PDU from the HARQ operation, i.e., decoding the combination to obtain a transport block including the additional DL MAC PDU and passing CRC check, the UE 102 transmits a HARQ ACK on the PCell 125A to the base station 106A to indicate successful reception of the additional DL MAC PDU. If the UE 102 fails to obtain the additional DL MAC PDU from the HARQ operation, i.e., decoding the combination to obtain a transport block failing CRC check, the UE 102 transmits a HARQ NACK on the PCell 125A to the base station 106A to indicate failing reception of the additional DL MAC PDU. In response to the HARQ NACK, the base station 106A can transmit an additional DCI to the UE 102 on the PCell 125A or the SCell 126A to indicate the UE 102 to receive a HARQ retransmission of the additional DL MAC PDU on the PCell 125A. The additional DCI can include the same HARQ process number as the DCI4. The additional DCI can include the same NDI (value) for the second additional HARQ transmission as the DCI4 to indicate that the HARQ retransmission is a retransmission. The additional DCI can include the same RV for the second additional HARQ transmission as the DCI4. Alternatively, the additional DCI can include a RV for the HARQ retransmission, which is different from the RV for the second additional HARQ transmission in DCI4.

In some implementations, the base station 106A uses the same DCI format or different DCI formats for the DCIs (e.g., the DCI3, DCI4, additional DCI, etc.). For example, the base station 106A can use an existing DCI formation (e.g., DCI format 1_0, DCI format 1_1) or a new DCI format (e.g., DCI format 1_2, DCI format 1_3, etc.) for the DCI3. In another example, the base station 106A can use an existing DCI formation (e.g., DCI format 1_0, DCI format 1_1) or a new DCI format (e.g., DCI format 1_2, DCI format 1_3, etc.) for the DCI4.

After receiving the RRC reconfiguration message, the UE 102 in CA communicates 314A with the base station 106A via the PCell 125A and SCell 126A. According to the cross-carrier scheduling configuration, the base station 106A can transmit the UE 102, via the SCell 126A, 332A a fifth DCI command (DCI5) which includes multiple configuration parameters for a first HARQ transmission of a first UL MAC PDU on the PCell 125A. Then the base station 106A generates and transmits 334A the first HARQ transmission of the first UL MAC PDU on the PCell 125A according to the multiple configuration parameters. In some implementations, the base station 106A transmits the DCI5 on the SCell 126A because PDCCH resources on the PCell 125A is not available for the UE 102 at a time instance where the base station 106A transmits the DCI5.

The multiple configuration parameters can include carrier indicator, HARQ process number, frequency domain resource assignment, time domain resource assignment, frequency hopping flag, RV, NDI, MCS, TPC command for physical uplink shared channel (PUSCH). The multiple configuration parameters can also include other parameters such as identifier of DCI format, BWP indicator, 1$^{st}$ DL assignment index, 2$^{nd}$ DL assignment index, SRS resource indicator, precoding information and number of layers, antenna ports, SRS request, CSI request, and/or DMRS sequence initialization.

The UE 102 generates and transmits the first HARQ transmission of the first UL MAC PDU on the PCell 125A according to the multiple configuration parameters in the DCI5. For example, the base station 106A can configure a value of the carrier indicator for the PCell 125A in the cross-carrier scheduling configuration. The base station 106A can set the carrier indicator in the DCI5 to the value of the carrier indicator for the PCell 125A. Thus, the UE 102 can determine to transmit the first HARQ transmission of the first UL MAC PDU on the PCell 125A according to the value of the carrier indicator.

In some implementations, the base station 106A can set the NDI in the DCI5 for the first HARQ transmission of the first UL MAC PDU to a value indicating the first HARQ transmission of the first UL MAC PDU is a new transmission. Thus, the UE 102 can determine to generate the first HARQ transmission of the first UL MAC PDU is a new transmission according to the value of the new data indicator. For example, the UE 102 may store a value of a previously received NDI associated to a HARQ process identified by the HARQ process number included in the DCI5. The UE 102 determines to generate the first HARQ transmission of the first UL MAC PDU is a new transmission if the value of the NDI compared to the stored value of the previously NDI is different (e.g., toggled). In some implementations, the UE 102 can transmit the first HARQ transmission on the PCell 125A in time and/or frequency resources assigned by the time domain resource assignment and/or the frequency domain resource assignment in the DCI5.

In some scenarios and implementations, the base station 106A succeeds to obtain the first UL MAC PDU from the first HARQ transmission of the first UL MAC PDU according to the DCI5. For example, the base station 106A may decode the first HARQ transmission according to the DCI5 to obtain a transport block including the first UL MAC PDU and the transport block passes CRC check, so that the base station 106A succeeds to obtain the first UL MAC PDU from the transport block.

In other scenarios and implementations, if the base station 106A fails to obtain the first UL MAC PDU from the first HARQ transmission of the first UL MAC PDU according to the DCI5, the base station 106A can transmit 336A a sixth DCI command (DCI6) on the PCell 125A to the UE 102 to command the UE 102 to transmit a second HARQ transmission of the first UL MAC PDU. For example, the base station 106A may decode the first HARQ transmission according to the DCI5 to obtain a transport block and fail CRC check for the transport block, so that the base station 106A fails to obtain the first UL MAC PDU from the transport block. In response to the DCI6, the UE 102 can then transmit 338A a second HARQ transmission of the first UL MAC PDU on the PCell 125A to the base station 106A. The base station 106A can combine the first HARQ transmission and the second HARQ transmission and decode the combination of the first HARQ transmission and the second HARQ transmission to obtain the first UL MAC PDU.

In one scenario, the base station 106A transmits the DCI6 on the PCell 125A because PDCCH resources on the SCell 126A is not available for the UE 102 at a time instance where the base station 106A transmits the DCI6. In another scenario, the base station 106A transmits the DCI6 on the PCell 125A because the SCell 126A is deactivated for the UE 102. In yet another scenario, the base station 106A transmits the DCI6 on the PCell 125A because the SCell 126A is in a dormant state for the UE 102. In yet another scenario, the base station 106A transmits the DCI6 on the PCell 125A because a downlink BWP on the SCell 126A, on which the UE 102 receives PDCCH(s), is in a dormant state for the UE 102. The UE 102 may not monitor PDCCH(s) on the deactivated SCell 126A, dormant SCell 126A or dormant downlink BWP in the SCell 126A.

The DCI6 can include multiple configuration parameters similar to the DCI5. In one implementation, the DCI6 may not include a carrier indicator. In this implementation, the UE 102 can determine to transmit the second HARQ transmission of the first UL MAC PDU on the PCell 125A according to a default configuration. The default configuration can be that if the UE 102 receives a DCI on a cell, which does not include a carrier indicator and configures a UL transmission, the UE 102 transmits a HARQ transmission in the cell according to the DCI. In another implementation, the DCI6 includes a carrier indicator. In this implementation, the base station 106A can set a value of the carrier indicator to a value included in the cross-carrier scheduling configuration. Thus, the UE 102 can determine to transmit the second HARQ transmission of the first UL MAC PDU on the PCell 125A according to the value of the carrier indicator. The carrier indicator in the DCI6 and the carrier indicator in the DCI5 can have the same values or different values.

In some implementations, the DCI6 and the DCI5 include the same HARQ process number (i.e., value) and the same NDI value for the first and second HARQ transmissions of the first UL MAC PDU, so that the UE 102 can determine to generate the second HARQ transmission of the first UL MAC PDU as a retransmission of the first UL MAC PDU from the HARQ process number and the NDI (value) in the DCI6. The base station 106A can set a RV in the DCI6 for the second HARQ transmission to a value which is the same as or different from the RV in the DCI5 for the first HARQ transmission. If the RV in the DCI6 and the RV in the DCI5 are different, the base station 106A can perform HARQ operation (e.g., HARQ combining with incremental redundancy) to combine the first and second HARQ transmissions of the first UL MAC PDU to obtain the first UL MAC PDU. If the RV in the DCI6 and the RV in the DCI5 are the same, the base station 106A can HARQ operation (e.g., HARQ chase combining) to combine the first and second HARQ transmissions of the first UL MAC PDU to obtain the first UL MAC PDU. In one scenario, the base station 106A succeeds to obtain the first UL MAC PDU from the HARQ operation, i.e., decoding the combination to obtain a transport block including the first UL MAC PDU and passing CRC check. After obtaining the first UL MAC PDU, the base station 106A can transmit an additional DCI to the UE 102 on the PCell 125A or the SCell 126A to indicate the UE 102 to transmit an additional HARQ transmission (e.g., a new HARQ transmission) of another UL MAC PDU on the PCell 125A. The additional DCI can include the same HARQ process number as the DCI5 and other configuration parameters similar to the DCI5. The base station 106A can set the other configuration parameters to the same as the DCI5 or different values from the DCI5. In another scenario, the base station 106A fails to obtain the first UL MAC PDU from the HARQ operation, i.e., decoding the combination to obtain a transport block failing CRC check. In response to the failure, the base station 106A can transmit an additional DCI to the UE 102 on the PCell 125A or the SCell 126A to indicate the UE 102 to transmit one more HARQ transmission of the first UL MAC PDU on the PCell 125A. The additional DCI can include the same HARQ process number as the DCI6. The additional DCI can include the same NDI (value) for the second HARQ transmission as the DCI6 to indicate that the one more HARQ transmission is a retransmission. The additional DCI can include the same RV for the second HARQ transmission as the DCI6. Alternatively, the additional DCI can include a RV for the one more HARQ transmission, which is different from the RV for the second HARQ transmission in the DCI6. Similarly, the base station 106A can perform HARQ operation to combine the HARQ retransmission with the first and second HARQ transmissions according the RV in the additional DCI to obtain the first UL MAC PDU in a similar manner as described above.

In some scenarios and implementations, the base station 106A can also configure the UE 102 to transmit a first additional HARQ transmission of an additional MAC PDU on the PCell 125A in the DCI5. In such cases, the base station 106A can include additional configuration parameters for the first additional HARQ transmission in the DCI5. The additional configuration parameters can include particular configuration parameters to generate and/or transmit the first additional HARQ transmission. The particular configuration parameters are similar to configuration parameters in the multiple configuration parameters described above. The UE 102 can generate and/or transmit the first additional HARQ transmission on the PCell 125A according to the additional configuration parameters and some of the multiple configuration parameters. For example, the additional configuration parameters can include separate MCS, NDI and/or RV from the MCS, NDI and/or RV for the first HARQ transmission of the first UL MAC PDU, so that the base station 106A can set different MCS, NDI and/or RV for the first additional HARQ transmission from the first HARQ transmission. The UE 102 can transmit the first additional HARQ transmission on the PCell 125A in the same time and frequency resources as the first HARQ transmission of the first UL MAC PDU. The base station 106A receives the first additional HARQ transmission on the PCell 125A in the same time and frequency resources as the first HARQ transmission of the first UL MAC PDU. In some implementations, the additional configuration parameters can include separate time domain resource assignment and/or frequency domain resource assignment from the time domain resource assignment and/or frequency domain resource assignment for the first HARQ transmission of the first UL MAC PDU. In the separate time domain resource assignment and/or frequency domain resource assignment, the base station 106A can configure different time and/or frequency resources from the first HARQ transmission of the first DL MAC PDU. In this case, the UE 102 can transmit the first additional HARQ transmission on the PCell 125A in the different time and/or frequency resources configured by the separate time domain resource assignment and/or frequency domain resource assignment. The base station 106A receives the first additional HARQ transmission on the PCell 125A in the time and/or frequency resources configured by the separate time domain resource assignment and/or frequency domain resource assignment.

In other implementations, the additional configuration parameters can include a separate BWP indicator from the BWP indicator for the first HARQ transmission of the first UL MAC PDU. In the separate BWP indicator, the base station 106A can configure a different BWP from a BWP for the first HARQ transmission of the first DL MAC PDU. In this case, the UE 102 can transmit the first additional HARQ transmission on the PCell 125A in the different BWP configured by the separate BWP indicator. The base station 106A receives the first additional HARQ transmission on the PCell 125A in the different BWP configured by the separate BWP indicator.

The base station 106A can receive the first additional HARQ transmission on the PCell 125A according to the additional configuration parameters and optionally some of the multiple configuration parameters (if some configuration parameters are shared/common for the first HARQ transmission and the first additional HARQ transmission). For example, the carrier indication is shared between the first HARQ transmission and the first additional HARQ transmission. The UE 102 can determine to transmit the first additional HARQ transmission of the additional UL MAC PDU on the PCell 125A according to the value of the carrier indicator in the DCI5. In another example, the additional configuration parameters include an additional NDI. In one implementation, the base station 106A can set the additional NDI in the DCI5 for the first additional HARQ transmission of the first UL MAC PDU to a value indicating the first additional HARQ transmission of the additional UL MAC PDU is a new transmission. Thus, the UE 102 can determine to generate the first additional HARQ transmission of the additional UL MAC PDU as a new transmission according to the value of the additional NDI. For example, the UE 102 may store a value of a previously received NDI associated to a HARQ process identified by the HARQ process number included in the DCI5. The UE 102 determines to generate the first additional HARQ transmission of the additional UL MAC PDU as a new transmission if the value of the additional NDI compared to the stored value of the previously NDI is different (e.g., toggled). In another implementation, the base station 106A can set the additional NDI in the DCI5 for the first additional HARQ transmission of the first UL MAC PDU to a value indicating the first additional HARQ transmission of the additional UL MAC PDU is a retransmission. Thus, the UE 102 can determine the first additional HARQ transmission of the additional UL MAC PDU is a retransmission according to the value of the additional NDI. For example, the UE 102 may store a value of a previously received NDI associated to a HARQ process identified by the HARQ process number included in the DCI5. The UE 102 determines to generate the first additional HARQ transmission of the additional UL MAC PDU as a retransmission if the value of the additional NDI compared to the stored value of the previously NDI is the same (e.g., not toggled).

In some scenarios and implementations, the base station 106A succeeds to obtain the additional UL MAC PDU from the first additional HARQ transmission of the additional UL MAC PDU according to the DCI5. For example, the base station 106A may decode the first additional HARQ transmission according to the DCI5 to obtain a transport block including the additional UL MAC PDU and the transport block passes CRC check, so that the base station 106A succeeds to obtain the additional UL MAC PDU from the transport block. After obtaining the first UL MAC PDU and the additional UL MAC PDU, the base station 106A in one implementation can transmit an additional DCI to the UE 102 on the PCell 125A or the SCell 126A to indicate the UE 102 to transmit an additional HARQ transmission of another UL MAC PDU on the PCell 125A. The UE 102 transmits the additional HARQ transmission in a similar manner in which the UE 102 transmits the first HARQ transmission according to the DCI5. The additional DCI can include the same HARQ process number as the DCI5 and other configuration parameters similar to the DCI5. The base station 106A can set the other configuration parameters to the same as the DCI5 or different values from the DCI5.

In other scenarios and implementations, the base station 106A fails to obtain the additional UL MAC PDU from the first additional HARQ transmission of the additional UL MAC PDU according to the DCI5. For example, the base station 106A may decode the first additional HARQ transmission according to the DCI5 to obtain a transport block and fail CRC check or parity check for the transport block, so that the base station 106A fails to obtain the additional UL MAC PDU from the transport block. In response to the failure, the base station 106A can configure the UE to transmit a second additional HARQ transmission of the additional UL MAC PDU in the DCI6, in one implementation. The UE 102 can then transmit the second additional HARQ transmission of the additional UL MAC PDU on the PCell 125A to the base station 106A according to the DCI 6. The base station 106A can receive the second additional HARQ transmission on the PCell 125A according to common configuration parameters and additional configuration parameters in the DCI6. The common configuration parameters are common for the UE 102 to receive the second HARQ transmission and the second additional HARQ transmission. The additional configuration parameters are specific for the UE 102 to generate and transmit the second additional HARQ transmission. The base station 106A can combine the first additional HARQ transmission and the second additional HARQ transmission and decode the combination of the first additional HARQ transmission and the second additional HARQ transmission to obtain the additional UL MAC PDU.

For the second additional HARQ transmission, the DCI6 can include the additional configuration parameters similar to the DCI5. For example, the UE 102 can transmit the second additional HARQ transmission on the PCell 125A in the same or different time and frequency resources as the second HARQ transmission of the first UL MAC PDU. In some implementations, the DCI6 and the DCI5 include the same HARQ process number (i.e., value) and the same additional NDI value for the first and second additional HARQ transmissions of the additional UL MAC PDU, so that the UE 102 can determine to generate the second additional HARQ transmission of the additional UL MAC PDU as retransmission of the additional UL MAC PDU from the HARQ process number and the additional NDI (value) in the DCI6. The base station 106A can set an additional RV in the DCI6 for the second additional HARQ transmission to a value which is the same as or different from the additional RV in the DCI5 for the first additional HARQ transmission. If the additional RV in the DCI6 and the additional RV in the DCI5 are different, the base station 106A can perform HARQ operation with incremental redundancy to combine the first and second additional HARQ transmissions of the additional UL MAC PDU to obtain the first UL MAC PDU. If the RV in the DCI6 and the RV in the DCI5 are the same, the base station 106A can HARQ operation with chase combining to combine the first and second additional HARQ transmissions of the additional UL MAC PDU to obtain the additional UL MAC PDU. If the base station 106A succeeds to obtain the additional UL MAC PDU from the HARQ operation, i.e., decoding the combination to obtain a transport block including the additional UL MAC PDU and passing CRC check, the base station 106A in one implementation can transmit an additional DCI to the UE 102 on the PCell 125A or the SCell 126A to indicate the UE 102 to transmit an additional HARQ transmission of another UL MAC PDU on the PCell 125A. The additional DCI can include the same HARQ process number as the DCI5 and other configuration parameters similar to the DCI5. The base station 106A can set the other configuration parameters to the same as the DCI5 or different values from the DCI5.

If the base station 106A fails to obtain the additional UL MAC PDU from the HARQ operation, i.e., decoding the combination to obtain a transport block failing CRC check, the base station 106A can transmit an additional DCI to the UE 102 on the PCell 125A or the SCell 126A to indicate the UE 102 to transmit a HARQ retransmission of the first UL MAC PDU on the PCell 125A. The additional DCI can include the same HARQ process number as the DCI6. The additional DCI can include the same NDI (value) for the second HARQ transmission as the DCI6 to indicate the HARQ retransmission. The additional DCI can include the same RV for the second additional HARQ transmission as the DCI6. Alternatively, the additional DCI can include a RV for the HARQ retransmission, which is different from the RV for the second additional HARQ transmission in the DCI6. Similarly, the base station 106A can perform HARQ operation to combine the HARQ retransmission with the first and second additional HARQ transmissions according the RV in the additional DCI in a similar manner as described above.

In some implementations, the base station 106A uses the same DCI format or different DCI formats for the DCIs (e.g., the DCI5, DCI6, additional DCI, etc.). For example, the base station 106A can use an existing DCI format (e.g., DCI format 0_0, DCI format 0_1) or a new DCI format (e.g., DCI format 0_2, DCI format 0_3, etc.) for the DCI5. In another example, the base station 106A can use an existing DCI formation (e.g., DCI format 0_0, DCI format 0_1) or a new DCI format (e.g., DCI format 0_2, DCI format 0_3, etc.) for the DCI6.

After receiving the RRC reconfiguration message, the UE 102 in CA communicates 314A with the base station 106A via the PCell 125A and SCell 126A. According to the cross-carrier scheduling configuration, the base station 106A can transmit the UE 102, via the PCell 125A, 340A a seventh DCI command (DCI7) which includes multiple configuration parameters for a first HARQ transmission of a second UL MAC PDU on the PCell 125A. Then the base station 106A generates and transmits 342A the first HARQ transmission of the second UL MAC PDU on the PCell 125A according to the multiple configuration parameters. In some implementations, the base station 106A transmits the DCI7 on the PCell 125A because PDCCH resources on the SCell 126A is not available for the UE 102 at a time instance where the base station 106A transmits the DCI7.

The multiple configuration parameters can include carrier indicator, HARQ process number, frequency domain resource assignment, time domain resource assignment, frequency hopping flag, RV, NDI, MCS, TPC command for physical uplink shared channel (PUSCH). The multiple configuration parameters can also include other parameters such as identifier of DCI format, BWP indicator, 1$^{st}$ DL assignment index, 2$^{nd}$ DL assignment index, SRS resource indicator, precoding information and number of layers, antenna ports, SRS request, CSI request, and/or DMRS sequence initialization.

The UE 102 generates and transmits the first HARQ transmission of the second UL MAC PDU on the PCell 125A according to the multiple configuration parameters in the DCI7. In one implementation, the DCI7 may not include a carrier indicator. In this implementation, the UE 102 can determine to receive the first HARQ transmission of the first DL MAC PDU on the PCell 125A according to a default configuration. The default configuration can be that if the UE 102 receives a DCI on a cell, which does not include a carrier indicator and configures a DL transmission, the UE 102 receives a HARQ transmission in the cell according to the DCI. In another implementation, the DCI7 includes a carrier indicator. In this implementation, the base station 106A can configure a value of the carrier indicator for the PCell 125A in the cross-carrier scheduling configuration. The base station 106A can set the carrier indicator in the DCI7 to the value of the carrier indicator for the PCell 125A. Thus, the UE 102 can determine to transmit the first HARQ transmission of the second UL MAC PDU on the PCell 125A according to the value of the carrier indicator.

In some implementations, the base station 106A can set the NDI in the DCI7 for the first HARQ transmission of the second UL MAC PDU to a value indicating the first HARQ transmission of the second UL MAC PDU is a new transmission. Thus, the UE 102 can determine to generate the first HARQ transmission of the second UL MAC PDU is a new transmission according to the value of the new data indicator. For example, the UE 102 may store a value of a previously received NDI associated to a HARQ process identified by the HARQ process number included in the DCI7. The UE 102 determines to generate the first HARQ transmission of the second UL MAC PDU is a new transmission if the value of the NDI compared to the stored value of the previously NDI is different (e.g., toggled). In some implementations, the UE 102 can transmit the first HARQ transmission on the PCell 125A in time and/or frequency resources assigned by the time domain resource assignment and/or the frequency domain resource assignment in the DCI7.

In some scenarios and implementations, the base station 106A succeeds to obtain the second UL MAC PDU from the first HARQ transmission of the second UL MAC PDU according to the DCI7. For example, the base station 106A may decode the first HARQ transmission according to the DCI7 to obtain a transport block including the second UL MAC PDU and the transport block passes CRC check, so that the base station 106A succeeds to obtain the second UL MAC PDU from the transport block.

In other scenarios and implementations, if the base station 106A fails to obtain the second UL MAC PDU from the first HARQ transmission of the second UL MAC PDU according to the DCI7, the base station 106A can transmit 344A an eighth DCI command (DCI8) on the SCell 126A to the UE 102 to command the UE 102 to transmit a second HARQ transmission of the second UL MAC PDU. For example, the base station 106A may decode the first HARQ transmission according to the DCI7 to obtain a transport block and fail CRC check for the transport block, so that the base station 106A fails to obtain the second UL MAC PDU from the transport block. In response to the DCI8, the UE 102 can then transmit 346A a second HARQ transmission of the second UL MAC PDU on the PCell 125A to the base station 106A. The base station 106A can combine the first HARQ transmission and the second HARQ transmission and decode the combination of the first HARQ transmission and the second HARQ transmission to obtain the second UL MAC PDU.

In one scenario, the base station 106A transmits the DCI8 on the SCell 126A because PDCCH resources on the PCell 125A is not available for the UE 102 at a time instance where the base station 106A transmits the DCI8.

The DCI8 can include multiple configuration parameters similar to the DCI7. In one implementation, the DCI8 includes a carrier indicator. In this implementation, the base station 106A can set a value of the carrier indicator to a value included in the cross-carrier scheduling configuration. Thus, the UE 102 can determine to transmit the second HARQ transmission of the second UL MAC PDU on the PCell 125A according to the value of the carrier indicator. If the DCI7 includes a carrier indicator, the carrier indicator in the DCI8 and the carrier indicator in the DCI7 can have the same values or different values.

In some implementations, the DCI8 and the DCI7 include the same HARQ process number (i.e., value) and the same NDI value for the first and second HARQ transmissions of the second UL MAC PDU, so that the UE 102 can determine to generate the second HARQ transmission of the second UL MAC PDU as a retransmission of the second UL MAC PDU from the HARQ process number and the NDI (value) in the DCI8. The base station 106A can set a RV in the DCI8 for the second HARQ transmission to a value which is the same as or different from the RV in the DCI7 for the first HARQ transmission. If the RV in the DCI8 and the RV in the DCI7 are different, the base station 106A can perform HARQ operation (e.g., HARQ combining with incremental redundancy) to combine the first and second HARQ transmissions of the second UL MAC PDU to obtain the second UL MAC PDU. If the RV in the DCI8 and the RV in the DCI7 are the same, the base station 106A can HARQ operation (e.g., HARQ chase combining) to combine the first and second HARQ transmissions of the second UL MAC PDU to obtain the second UL MAC PDU. In one scenario, the base station 106A succeeds to obtain the second UL MAC PDU from the HARQ operation, i.e., decoding the combination to obtain a transport block including the second UL MAC PDU and passing CRC check. After obtaining the second UL MAC PDU, the base station 106A can transmit an additional DCI to the UE 102 on the PCell 125A or the SCell 126A to indicate the UE 102 to transmit an additional HARQ transmission (e.g., a new HARQ transmission) of another UL MAC PDU on the PCell 125A. The additional DCI can include the same HARQ process number as the DCI7 and other configuration parameters similar to the DCI7. The base station 106A can set the other configuration parameters to the same as the DCI7 or different values from the DCI7. In another scenario, the base station 106A fails to obtain the second UL MAC PDU from the HARQ operation, i.e., decoding the combination to obtain a transport block failing CRC check. In response to the failure, the base station 106A can transmit an additional DCI to the UE 102 on the PCell 125A or the SCell 126A to indicate the UE 102 to transmit one more HARQ transmission of the second UL MAC PDU on the PCell 125A. The additional DCI can include the same HARQ process number as the DCI8. The additional DCI can include the same NDI (value) for the second HARQ transmission as the DCI8 to indicate that the one more HARQ transmission is a retransmission. The additional DCI can include the same RV for the second HARQ transmission as the DCI8. Alternatively, the additional DCI can include a RV for the one more HARQ transmission, which is different from the RV for the second HARQ transmission in the DCI8. Similarly, the base station 106A can perform HARQ operation to combine the HARQ retransmission with the first and second additional HARQ transmissions according the RV in the additional DCI to obtain the second UL MAC PDU in a similar manner as described above.

In some scenarios and implementations, the base station 106A can also configure the UE 102 to transmit a first additional HARQ transmission of an additional MAC PDU on the PCell 125A in the DCI7. In such cases, the base station 106A can include additional configuration parameters for the first additional HARQ transmission in the DCI7. The additional configuration parameters can include particular configuration parameters to generate and/or transmit the first additional HARQ transmission. The particular configuration parameters are similar to configuration parameters in the multiple configuration parameters described above. The UE 102 can generate and/or transmit the first additional HARQ transmission on the PCell 125A according to the additional configuration parameters and some of the multiple configuration parameters. For example, the additional configuration parameters can include separate MCS, NDI and/or RV from the MCS, NDI and/or RV for the first HARQ transmission of the second UL MAC PDU, so that the base station 106A can set different MCS, NDI and/or RV for the first additional HARQ transmission from the first HARQ transmission. The UE 102 can transmit the first additional HARQ transmission on the PCell 125A in the same time and frequency resources as the first HARQ transmission of the second UL MAC PDU. The base station 106A receives the first additional HARQ transmission on the PCell 125A in the same time and frequency resources as the first HARQ transmission of the second UL MAC PDU. In some implementations, the additional configuration parameters can include separate time domain resource assignment and/or frequency domain resource assignment from the time domain resource assignment and/or frequency domain resource assignment for the first HARQ transmission of the second UL MAC PDU. In the separate time domain resource assignment and/or frequency domain resource assignment, the base station 106A can configure different time and/or frequency resources from the first HARQ transmission of the first DL MAC PDU. In this case, the UE 102 can transmit the first additional HARQ transmission on the PCell 125A in the different time and/or frequency resources configured by the separate time domain resource assignment and/or frequency domain resource assignment. The base station 106A receives the first additional HARQ transmission on the PCell 125A in the time and/or frequency resources configured by the separate time domain resource assignment and/or frequency domain resource assignment.

In other implementations, the additional configuration parameters can include a separate BWP indicator from the BWP indicator for the first HARQ transmission of the second UL MAC PDU. In the separate BWP indicator, the base station 106A can configure a different BWP from a BWP for the first HARQ transmission of the first DL MAC PDU. In this case, the UE 102 can transmit the first additional HARQ transmission on the PCell 125A in the different BWP configured by the separate BWP indicator. The base station 106A receives the first additional HARQ transmission on the PCell 125A in the different BWP configured by the separate BWP indicator.

The base station 106A can receive the first additional HARQ transmission on the PCell 125A according to the additional configuration parameters and optionally some of the multiple configuration parameters (if some configuration parameters are shared/common for the first HARQ transmission and the first additional HARQ transmission). For example, the carrier indication is shared between the first HARQ transmission and the first additional HARQ transmission if the DCI 7 includes the carrier indication. The UE 102 can determine to transmit the first additional HARQ transmission of the additional UL MAC PDU on the PCell 125A according to the value of the carrier indicator in the DCI7. In another example, the additional configuration parameters include an additional NDI. In one implementation, the base station 106A can set the additional NDI in the DCI7 for the first additional HARQ transmission of the second UL MAC PDU to a value indicating the first additional HARQ transmission of the additional UL MAC PDU is a new transmission. Thus, the UE 102 can determine to generate the first additional HARQ transmission of the additional UL MAC PDU as a new transmission according to the value of the additional NDI. For example, the UE 102 may store a value of a previously received NDI associated to a HARQ process identified by the HARQ process number included in the DCI7. The UE 102 determines to generate the first additional HARQ transmission of the additional UL MAC PDU as a new transmission if the value of the additional NDI compared to the stored value of the previously NDI is different (e.g., toggled). In another implementation, the base station 106A can set the additional NDI in the DCI7 for the first additional HARQ transmission of the second UL MAC PDU to a value indicating the first additional HARQ transmission of the additional UL MAC PDU is a retransmission. Thus, the UE 102 can determine the first additional HARQ transmission of the additional UL MAC PDU is a retransmission according to the value of the additional NDI. For example, the UE 102 may store a value of a previously received NDI associated to a HARQ process identified by the HARQ process number included in the DCI7. The UE 102 determines to generate the first additional HARQ transmission of the additional UL MAC PDU as a retransmission if the value of the additional NDI compared to the stored value of the previously NDI is the same (e.g., not toggled).

In some scenarios and implementations, the base station 106A succeeds to obtain the additional UL MAC PDU from the first additional HARQ transmission of the additional UL MAC PDU according to the DCI7. For example, the base station 106A may decode the first additional HARQ transmission according to the DCI7 to obtain a transport block including the additional UL MAC PDU and the transport block passes CRC check, so that the base station 106A succeeds to obtain the additional UL MAC PDU from the transport block. After obtaining the second UL MAC PDU and the addition UL MAC PDU, the base station 106A in one implementation can transmit an additional DCI to the UE 102 on the PCell 125A or the SCell 126A to indicate the UE 102 to transmit an additional HARQ transmission (e.g., a new HARQ transmission) of another UL MAC PDU on the PCell 125A. The additional DCI can include the same HARQ process number as the DCI7 and other configuration parameters similar to the DCI7. The base station 106A can set the other configuration parameters to the same as the DCI7 or different values from the DCI7.

In other scenarios and implementations, the base station 106A fails to obtain the additional UL MAC PDU from the first additional HARQ transmission of the additional UL MAC PDU according to the DCI7. For example, the base station 106A may decode the first additional HARQ transmission according to the DCI7 to obtain a transport block and fail CRC check or parity check for the transport block, so that the base station 106A fails to obtain the additional UL MAC PDU from the transport block. In response to the failure, the base station 106A can configure the UE to transmit a second additional HARQ transmission of the additional UL MAC PDU in the DCI8, in one implementation. The UE 102 can then transmit the second additional HARQ transmission of the additional UL MAC PDU on the PCell 125A to the base station 106A according to the DCI 6. The base station 106A can receive the second additional HARQ transmission on the PCell 125A according to common configuration parameters and additional configuration parameters in the DCI8. The common configuration parameters are common for the UE 102 to receive the second HARQ transmission and the second additional HARQ transmission. The additional configuration parameters are specific for the UE 102 to generate and transmit the second additional HARQ transmission. The base station 106A can combine the first additional HARQ transmission and the second additional HARQ transmission and decode the combination of the first additional HARQ transmission and the second additional HARQ transmission to obtain the additional UL MAC PDU.

For the second additional HARQ transmission, the DCI8 can include the additional configuration parameters similar to the DCI7. For example, the UE 102 can transmit the second additional HARQ transmission on the PCell 125A in the same or different time and frequency resources as the second HARQ transmission of the second UL MAC PDU. In some implementations, the DCI8 and the DCI7 include the same HARQ process number (i.e., value) and the same additional NDI value for the first and second additional HARQ transmissions of the additional UL MAC PDU, so that the UE 102 can determine to generate the second additional HARQ transmission of the additional UL MAC PDU as retransmission of the additional UL MAC PDU from the HARQ process number and the additional NDI (value) in the DCI8. The base station 106A can set an additional RV in the DCI8 for the second additional HARQ transmission to a value which is the same as or different from the additional RV in the DCI7 for the first additional HARQ transmission. If the additional RV in the DCI8 and the additional RV in the DCI7 are different, the base station 106A can perform HARQ operation with incremental redundancy to combine the first and second additional HARQ transmissions of the additional UL MAC PDU to obtain the second UL MAC PDU. If the RV in the DCI8 and the RV in the DCI7 are the same, the base station 106A can HARQ operation with chase combining to combine the first and second additional HARQ transmissions of the additional UL MAC PDU to obtain the additional UL MAC PDU. If the base station 106A succeeds to obtain the additional UL MAC PDU from the HARQ operation, i.e., decoding the combination to obtain a transport block including the additional UL MAC PDU and passing CRC check, the base station 106A in one implementation can transmit an additional DCI to the UE 102 on the PCell 125A or the SCell 126A to indicate the UE 102 to transmit an additional HARQ transmission of another UL MAC PDU on the PCell 125A. The UE 102 transmits the additional HARQ transmission in a similar manner in which the UE 102 transmits the first HARQ transmission according to the DCI7. The additional DCI can include the same HARQ process number as the DCI7 and other configuration parameters similar to the DCI7. The base station 106A can set the other configuration parameters to the same as the DCI7 or different values from the DCI7.

If the base station 106A fails to obtain the additional UL MAC PDU from the HARQ operation, i.e., decoding the combination to obtain a transport block failing CRC check, the base station 106A can transmit an additional DCI to the UE 102 on the PCell 125A or the SCell 126A to indicate the UE 102 to transmit a HARQ retransmission of the second UL MAC PDU on the PCell 125A. The additional DCI can include the same HARQ process number as the DCI8. The additional DCI can include the same NDI (value) for the second additional HARQ transmission as the DCI8 to indicate that the HARQ retransmission. The additional DCI can include the same RV for the second additional HARQ transmission as the DCI8. Alternatively, the additional DCI can include a RV for the HARQ retransmission, which is different from the RV for the second additional HARQ transmission in the DCI8. Similarly, the base station 106A can perform HARQ operation to combine the HARQ retransmission with the first and second additional HARQ transmissions according the RV in the additional DCI to obtain the additional UL MAC PDU in a similar manner as described above.

In some implementations, the base station 106A uses the same DCI format or different DCI formats for the DCIs (e.g., the DCI7, DCI8, additional DCI, etc.). For example, the base station 106A can use an existing DCI format (e.g., DCI format 0_0, DCI format 0_1) or a new DCI format (e.g., DCI format 0_2, DCI format 0_3, etc.) for the DCI7. In another example, the base station 106A can use an existing DCI formation (e.g., DCI format 0_0, DCI format 0_1) or a new DCI format (e.g., DCI format 0_2, DCI format 0_3, etc.) for the DCI8.

In some implementations, the base station 106A can receive a UE capability IE (e.g., UE-NR-Capability IE or UE-MRDC-Capability IE) from the UE 102, another base station (e.g., base station 104) or a core network 110 (e.g., AMF 164). The UE capability IE includes UE capabilities of the UE 102, indicating support of different protocol functions or features for different protocol layers, mobility and measurement. In one implementation, the UE capability IE also include a cross-carrier scheduling capability indicating that the UE 102 supports cross-carrier scheduling on a SCell for a PCell. In another implementation, the UE capability IE also include a cross-carrier scheduling capability indicating that the UE 102 supports cross-carrier scheduling on a SCell for a PCell and on a SCell for a PSCell. In yet another implementation, the UE capability IE also include a cross-carrier scheduling capability indicating that the UE 102 supports cross-carrier scheduling on a SCell for a PCell, and a cross-carrier scheduling capability indicating that the UE 102 supports cross-carrier scheduling on a SCell for a PSCell.

In the implementations above, the UE capability IE may or may not include a cross-carrier scheduling capability indicating that the UE 102 supports cross-carrier scheduling on a SCell for another SCell. For example, the UE capability IE may or may not include a crossCarrierScheduling-SameSCS IE indicating that the UE 102 supports cross-carrier scheduling on a SCell for another SCell. In another example, the UE capability IE may or may not include a crossCarrierScheduling-OtherSCS IE indicating that the UE 102 supports cross-carrier scheduling on a SCell for another SCell.

In some implementations, the base station 106A can send a UECapabilityEnquiry message to the UE and receive the UE capability IE from the UE 102 in a UECapabilityInformation message responding to the UECapabilityEnquiry message. In other implementations, the base station 106A can receive an Initial Context Setup message including the UE capability IE from the core network 110 (e.g., AMF 164). In yet other implementations, the base station 106A can receive a Handover Request message or a Retrieve UE Context Response message including the UE capability IE from another base station (e.g., base station 104).

In some implementations, the base station 106A generates a PDCP PDU including the RRC reconfiguration message 308A, an RLC PDU including the PDCP PDU and a MAC PDU including the RLC PDU. The base station 106A generates one or more HARQ transmissions of the MAC PDU and one or more DCI commands (DCI(s)) for the HARQ transmission(s). The base station 106A can transmit the DCI(s) and the HARQ transmission(s) to the UE 102 on the PCell 125A. The UE 102 can receive the HARQ transmission(s) according to the DCI(s), obtain the MAC PDU from the HARQ transmission(s), extracts the RLC PDU from the MAC PDU, extracts the PDCP PDU from the RLC PDU and then extracts the RRC reconfiguration message from the PDCP PDU.

In some implementations, the UE 102 generates a PDCP PDU including the RRC reconfiguration complete message 312A, an RLC PDU including the PDCP PDU and a MAC PDU including the RLC PDU. The UE 102 can receive one or more DCI commands (DCI(s)) for UL transmission on the PCell 125A from the base station 106A and uses the DCI(s) to generate one or more HARQ transmissions of the MAC PDU. The UE 102 can transmit the HARQ transmission(s) to the base station 106A on the PCell 125A. The base station 106A can receive the HARQ transmission(s) according to the DCI(s), obtain the MAC PDU from the HARQ transmission(s), extracts the RLC PDU from the MAC PDU, extracts the PDCP PDU from the RLC PDU and then extracts the RRC reconfiguration complete message from the PDCP PDU.

In some implementations, if the base station 106A is a gNB, the RRC reconfiguration and RRC reconfiguration complete messages are RRCReconfiguration and RRCReconfigurationComplete messages, respectively.

Now referring to FIG. 3B, a scenario 300B is generally similar to the scenario 300A of FIG. 3A, but here the UE 102 initially communicates with the base station 106A using CA, prior to the base station 106A providing cross-carrier scheduling configuration to the UE 102. The differences between the scenarios of FIGS. 3A and 3B are considered below. Similar events are labeled with same reference numbers, with different letters appended to the reference numbers to more clearly distinguish the scenarios.

The UE 102 initially communicates 303A data with the base station 106A via the PCell 125A as well as via the SCell 126A. Similar to the communications of the event 302A discussed above, these communications can include UL and/or DL transmissions. After the base station 106A determines 304B to configure cell 126A as a scheduling SCell for scheduling PDSCH or PUSCH of the PCell 125A, similar to the event 304A, the base station 106A transmits 309B an RRC reconfiguration message including cross-carrier scheduling configuration for the cell 126A to the UE 102. The base station 106A can transmit 309B this message in the PCell 126A.

FIGS. 4A-D illustrate several scenarios in which the UE 102 operates in DC with the base stations 104 and 106B. The base station 104 operates as the MN in these scenarios, and the base station 106A operates as an SN. Accordingly, the cells 125A and 126A operate as a PSCell and an SCell, respectively. The differences between the scenarios of FIGS. 3A, 3B, and 4A-D are considered below. Similar events are labeled with same reference numbers, with different letters appended to the reference numbers to more clearly distinguish the scenarios.

Figure 4A:
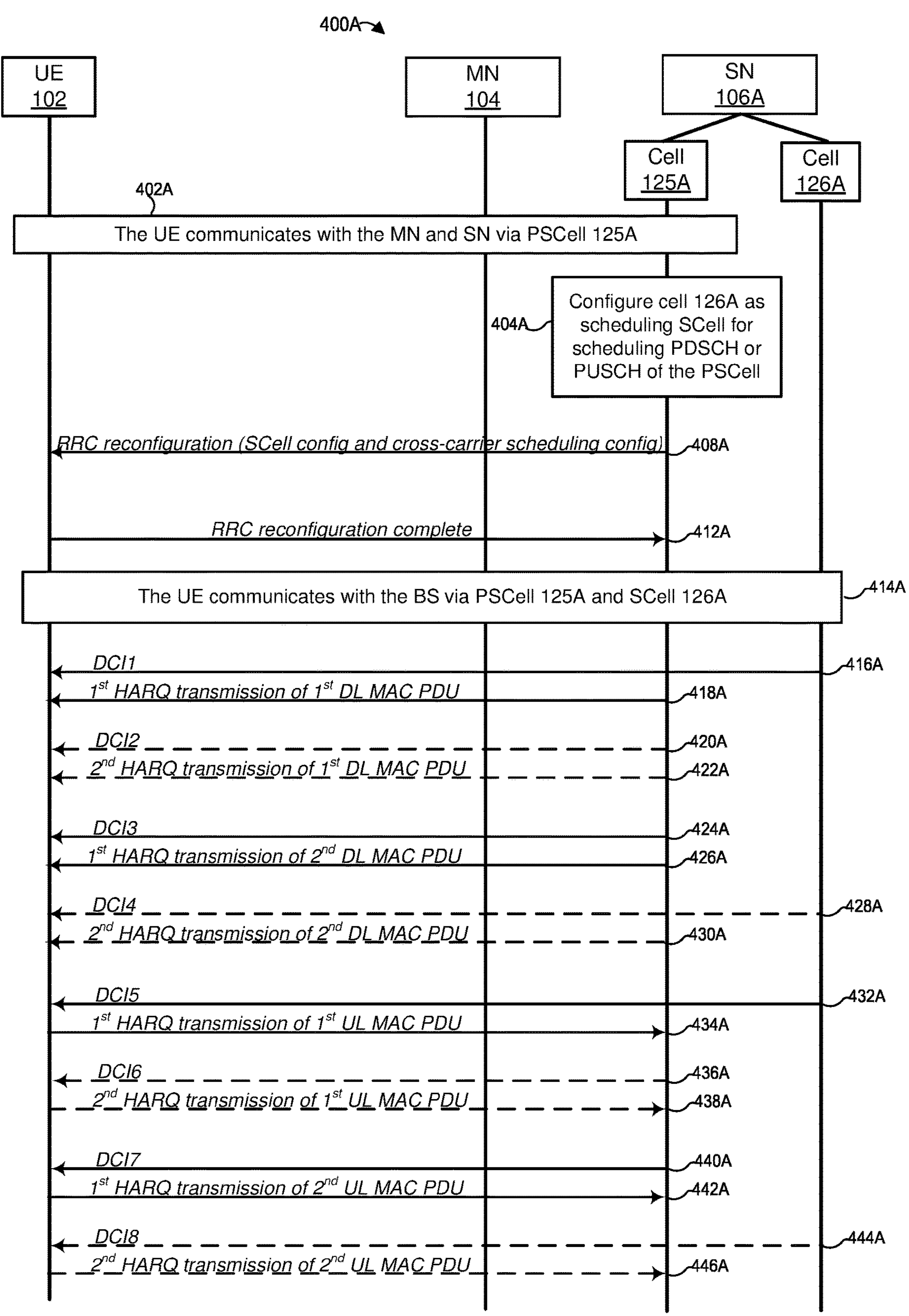
FIG. 4A is a messaging diagram of an example scenario similar to that of FIG. 3A, but with the base station operating as a secondary node (SN) and configuring the scheduling cell directly over the radio interface.

Referring first to a scenario 400A of FIG. 4A, the UE 102 communicates 402A data in DC with the base station 106A, in the PSCell 125A. This event is similar to the event 402A, but here the UE 102 also communicates with the MN 104, and the base station 106A operates as an SN. In this scenario, an SRB3 is available for the UE 102 and the SN 106A to exchange control messages directly via the radio interface, and the SN 106A accordingly transmits 408A an RRC reconfiguration message including an SCell configuration and a cross-carrier scheduling configuration for the cell 126A to the UE 102.

Figure 4B:
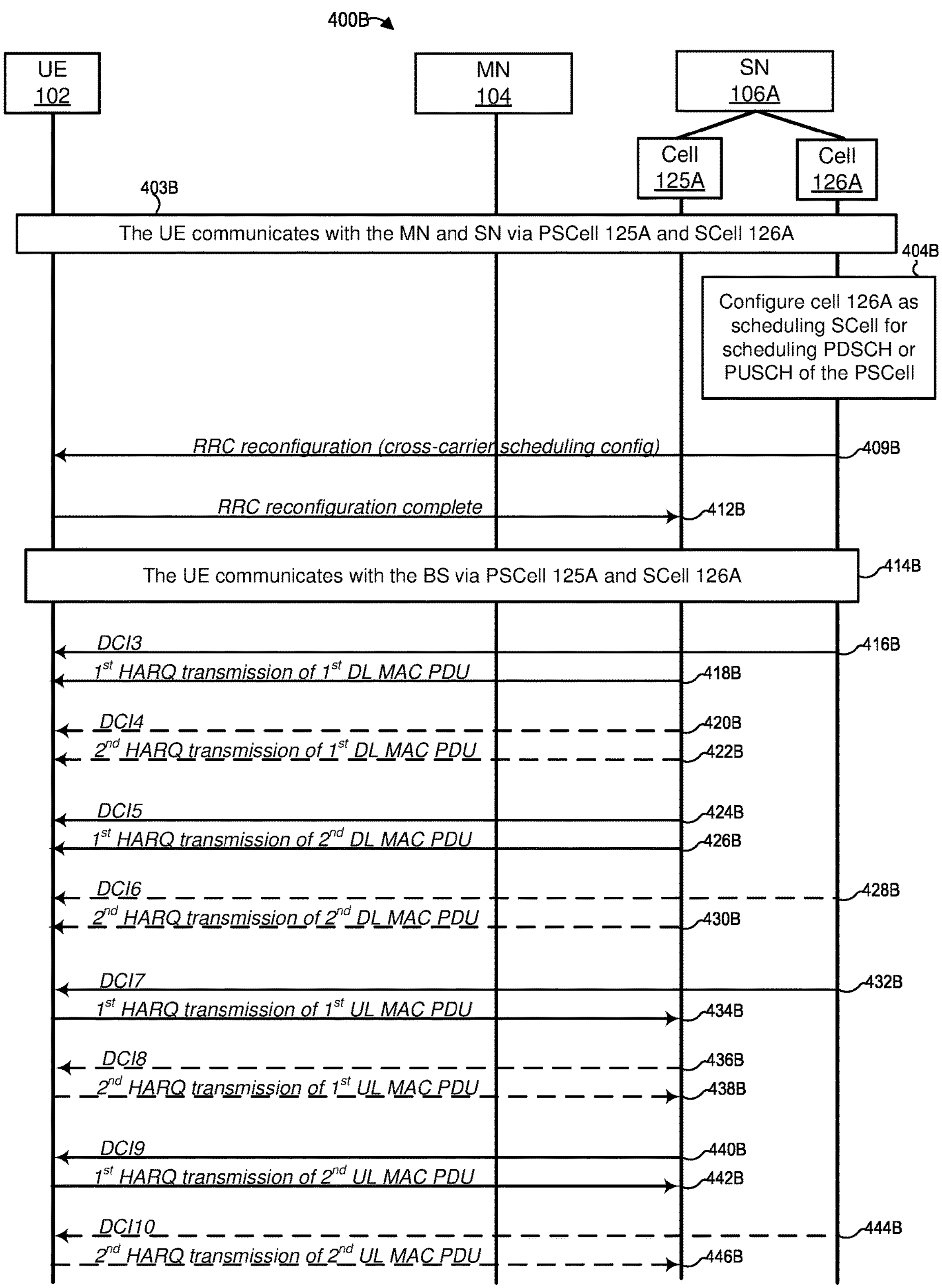
FIG. 4B is a messaging diagram of an example scenario similar to that of FIG. 4A, but with the UE communicating with the SN using CA prior to the base station configuring the secondary cell as a scheduling cell.

In a scenario 400B of FIG. 4B, the UE 102 initially communicates 403A with the base station 106A using CA, prior to the base station 106A providing cross-carrier scheduling configuration to the UE 102, similar to the scenario 300B discussed above. The SN 106A transmits an RRC reconfiguration message including cross-carrier scheduling configuration via an SRB3, on the cell 126A.

Figure 4C:
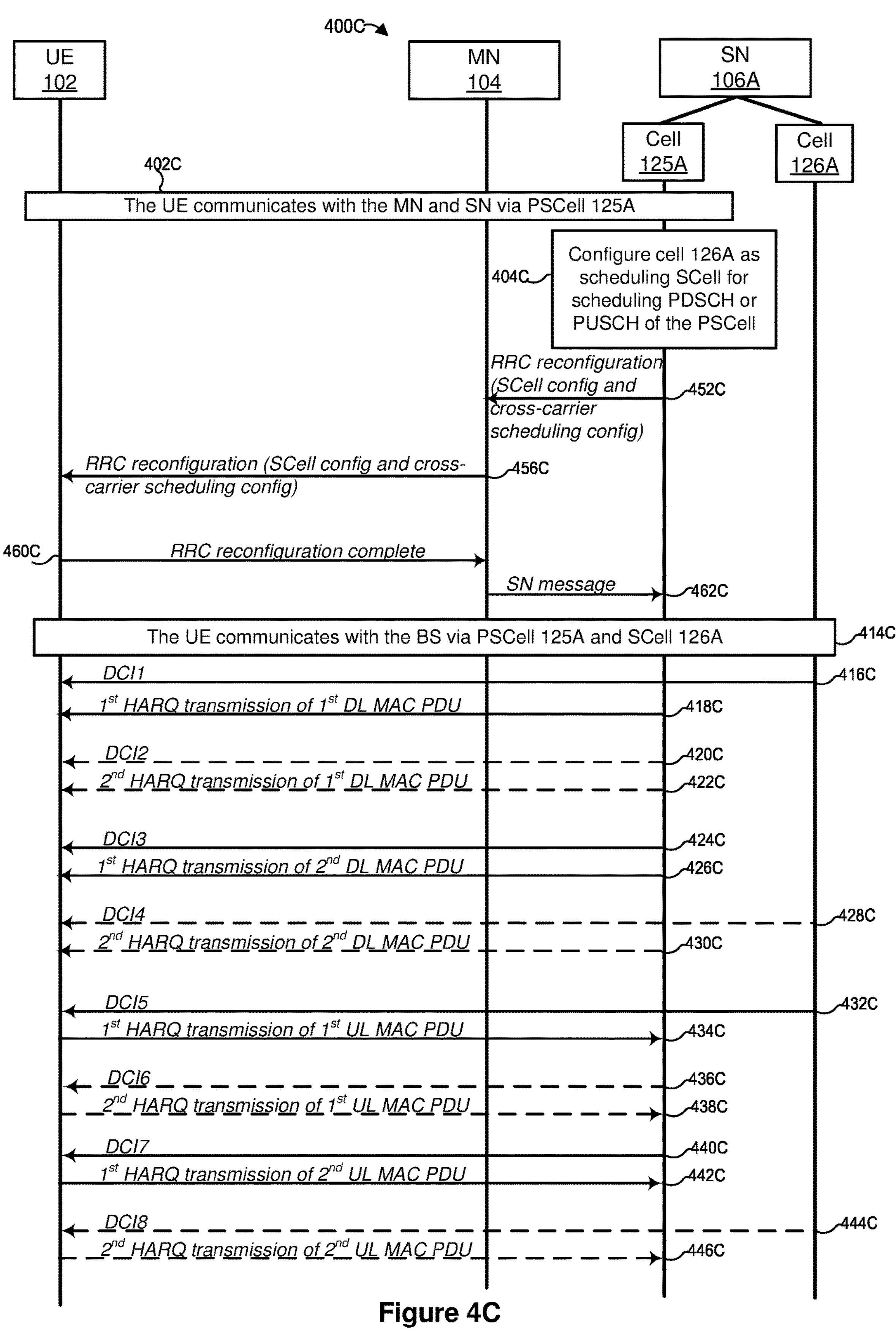
FIG. 4C is a messaging diagram of an example scenario similar to that of FIG. 4A, but with the SN providing the configuration via the MN.

A scenario 400C of FIG. 4C is similar to the scenario 400A of FIG. 4A, and here the UE 102 also communicates 402A data in DC with the base station 106A, in the PSCell 125A. However, here an SRB3 is not available for the UE 102 and the SN 106A to exchange control messages directly via the radio interface. As a result, the SN 106A transmits 452C an RRC reconfiguration message including an SCell configuration and a cross-carrier scheduling configuration for the cell 126A to the MN 104, and the MN 104 in turn forwards 456C the RRC reconfiguration message to the UE 102 via the radio interface (e.g., an SRB1).

Figure 4D:
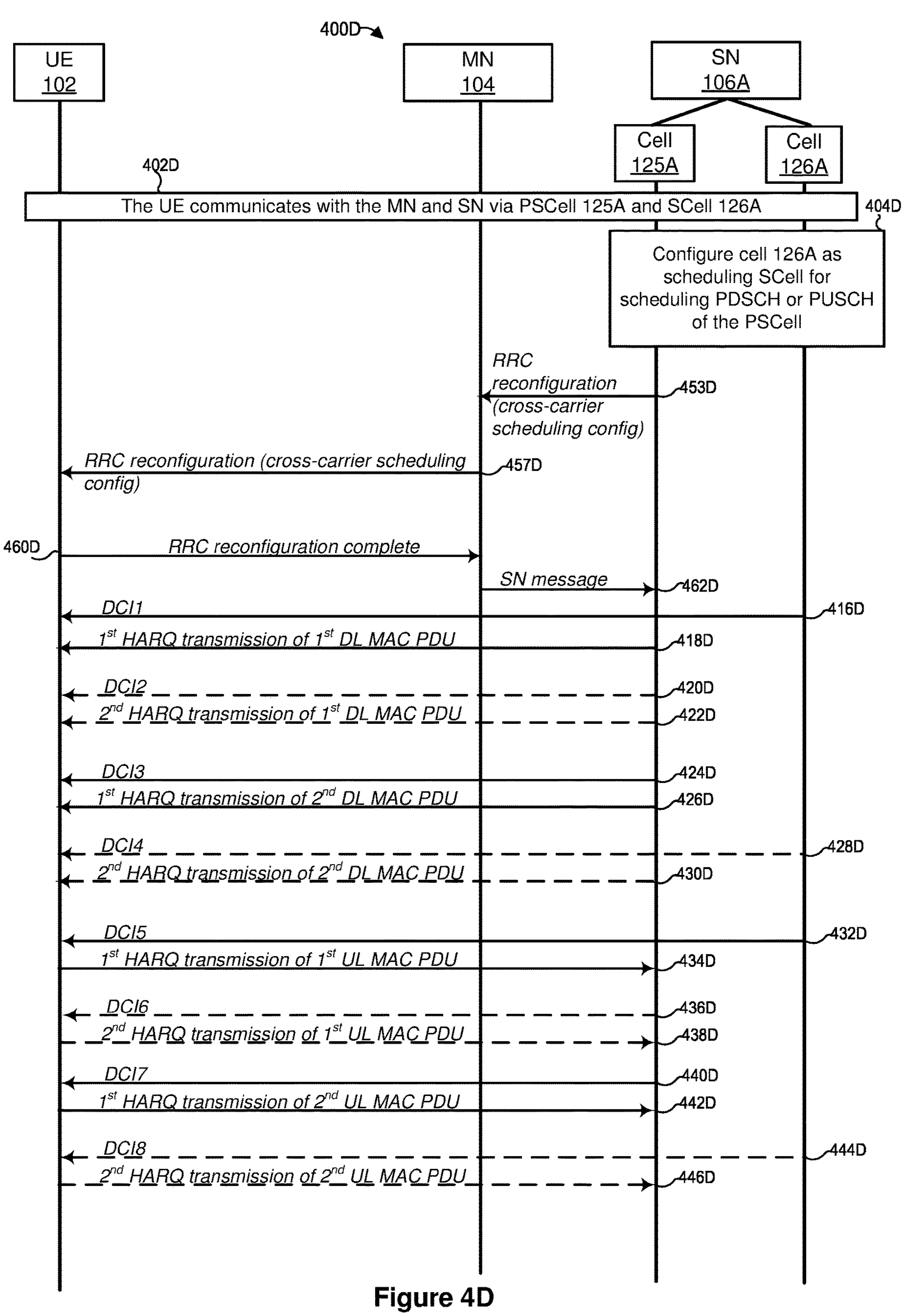
FIG. 4D is a messaging diagram of an example scenario similar to that of FIG. 4B, but with the SN providing the configuration via the MN.

In a scenario 400D of FIG. 4D, the UE 102 initially communicates 403A with the base station 106A using CA, prior to the base station 106A providing cross-carrier scheduling configuration to the UE 102, similar to the scenario 400B discussed above. Similar to the scenario 400C, the base station 106A cannot directly transmit an RRC reconfiguration message via a radio interface, and accordingly the SN 106A transmits 453D an RRC reconfiguration message including a cross-carrier scheduling configuration for the cell 126A to the MN 104, and the MN 104 in turn forwards 457D the RRC reconfiguration message to the UE 102 via the radio interface (e.g., an SRB1).

Next, several example scenarios in which a base station initiates a CA operation procedure with multi-cell scheduling. FIGS. 5A-D depict scenarios in which a base station enables CA and multi-cell scheduling for PUSCH or PDSCH of a PCell for a UE with the base station. In the following description, the terms "DCI" and "DCI command" can be used interchangeably.

Figure 5A:
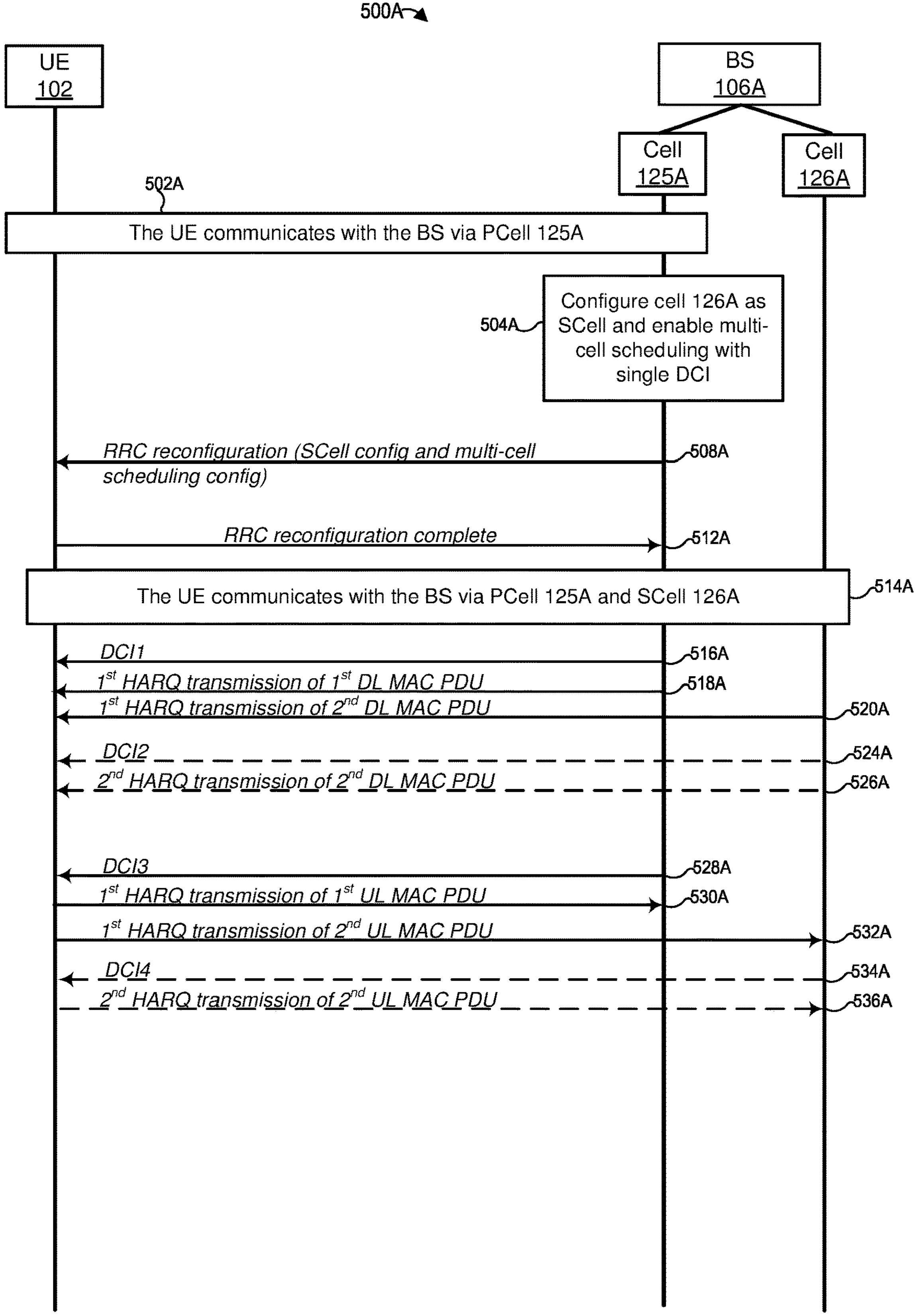
FIG. 5A is a messaging diagram of an example scenario in which a base station schedules HARQ transmissions of the same data unit in multiple cells, via the primary cell.

Referring first to FIG. 5A, in a scenario 500A, the base station 106A is a serving base station operating cell 125A and 126A. Initially, the UE 102 communicates 502A data (e.g., uplink (UL) data PDUs and/or downlink (DL) data PDUs) with the base station 106A via PCell 125A. In some scenarios, the UE 102 communicates 502A data in SC with the base station 106A, or communicates 502A data in DC with the base station 106A operating as an MN and an SN (e.g., the base station 106B) not shown in FIG. 5A.

The base station 106A at some point determines 504A that it should configure cell 126A as a SCell for PDSCH and/or PUSCH of the PCell 125A and enables multi-cell scheduling with a single DCI on the PCell 125A. The base station 106A can make this determination based on one or more measurement results for cell 126A received from the UE 102, for example, or another suitable event. In response to this determination, the base station 106A transmits 508A an RRC reconfiguration message including a SCell configuration and a multi-cell scheduling configuration for the PCell 125A to the UE 102. In response to the RRC reconfiguration message, the UE 102 transmits 512A an RRC reconfiguration complete message to the base station 106A. In some implementations, the base station 106A can include the multi-cell scheduling configuration in the SCell configuration to enable multi-cell scheduling on the PCell 125A. For example, the SCell configuration can be an SCellConfig information element (IE).

After receiving the RRC reconfiguration message, the UE 102 in CA communicates 514A with the base station 106A via the PCell 125A and SCell 126A. The UE 102 enables multi-cell scheduling according to/in response to the multi-cell scheduling configuration. According to the multi-cell scheduling configuration, the base station 106A can transmit 516A to the UE 102, via the PCell 125A, a first DCI command (DCI1) which includes multiple configuration parameters for a first HARQ transmission of a first DL MAC PDU on the PCell 125A and a first HARQ transmission of a second DL MAC PDU on the SCell 126A. Then the base station 106A transmits 518A the first HARQ transmission of the first DL MAC PDU on the PCell 125A to the UE 102 and transmits 520A the first HARQ transmission of the second DL MAC PDU on the SCell 126A to the UE 102 according to the multiple configuration parameters. The UE 102 receives and processes the first HARQ transmission 518A on the PCell 125A and receives and processes the first HARQ transmission 520A on the SCell 126A according to the multiple configuration parameters in the DCI1.

In some implementations, the multiple configuration parameters can include a first set of parameters and a second set of parameters configuring the first HARQ transmission 518A and the first HARQ transmission 520A respectively. Each of the two sets can include some or all of parameters such as carrier indicator, HARQ process number, frequency-domain resource assignment, time-domain resource assignment, RV, NDI, MCS, TPC command for PUCCH and/or PUCCH resource indicator. Each of the two sets can further include some or all of other parameters such as identifier of DCI format, BWP indicator, VRB to PRB mapping, PRB bundling size indicator, rate matting indicator, CSI-RS trigger, downlink assignment index, PDSCH to HARQ feedback timing indicator, antenna port(s) and number of layers, transmission configuration indication, SRS request and/or DRMS sequence initialization. If each of the two sets includes some of the parameters, the rest of the parameters can be common parameters for both the first HARQ transmission 518A and the first HARQ transmission 520A.

In different implementations, the first set may or may not include a carrier indicator, and the second set may or may include a carrier indicator. In one implementation, the first set may include a first carrier indicator indicating the first HARQ transmission 518A is on the PCell 125A, and the second set may include a second carrier indicator indicating the first HARQ transmission 520A is on the SCell 126A. The UE 102 can determine to receive the first HARQ transmission 518A on the PCell 125A according to the first carrier indicator and receive the first HARQ transmission 520A on the SCell 126A according to the second carrier indicator. In one implementation, the base station 106A can configure the first carrier indicator (value) and the second carrier indicator (value) in the multi-cell configuration. The multi-cell configuration can configure the first carrier indicator (value) and the second carrier indicator (value) associated to the PCell 125A and the SCell 126A respectively.

In another implementation, the first set may not include a carrier indicator and the second set may include a carrier indicator indicating the first HARQ transmission 520A is on the SCell 126A. In this implementation, the UE 102 can determine to receive the first HARQ transmission 518A on the PCell 125A according to according to a default configuration. The default configuration can be that if the UE 102 receives a DCI (e.g., DCI1) on a cell (e.g., the PCell 125A), which does not include a carrier indicator for a HARQ transmission (e.g., the first HARQ transmission 518A) and configures a DL transmission, the UE 102 receives a HARQ transmission (e.g., the first HARQ transmission 518A) in the cell (e.g., the PCell 125A) according to the DCI. The UE 102 can determine to receive the first HARQ transmission 518A on the SCell 126A according to the carrier indicator. In one implementation, the base station 106A can configure the carrier indicator associated to the SCell 126A in the multi-cell configuration. In yet another implementation, neither the first set nor the second set include a carrier indicator. The UE 102 can determine to receive the first HARQ transmission 518A on the PCell 125A and receive the first HARQ transmission 520A on the SCell 126A according to a format of the DCI1 or a particular field in the DCI1. For example, the format of the DCI1 or the particular field is specifically designed to indicate that the UE 102 receives HARQ transmissions on two cells (e.g., the PCell 125A and the SCell 126A) configured by the RRC reconfiguration message.

In other implementations, the multiple configuration parameters can include a single set of parameters configuring both the first HARQ transmission 518A and the first HARQ transmission 520A. That is, the base station 106A use each single parameter in the single set of parameters to transmit the first HARQ transmission 518A and the first HARQ transmission 520A. There are no duplicate parameter fields in the DCI1. The single set of parameters can include HARQ process number, frequency-domain resource assignment, time-domain resource assignment, RV, NDI, MCS, TPC command for PUCCH and/or PUCCH resource indicator. The single set can also include other parameters such as identifier of DCI format, BWP indicator, VRB to PRB mapping, PRB bundling size indicator, rate matting indicator, CSI-RS trigger, downlink assignment index, PDSCH to HARQ feedback timing indicator, antenna port(s) and number of layers, transmission configuration indication, SRS request and/or DRMS sequence initialization.

In some implementations, the first set includes a first NDI and a first HARQ process number, and the second set includes a second NDI and a second HARQ process number. In one implementation, the base station 106A can set the first NDI to a first value indicating the first HARQ transmission 518A is a new transmission. Thus, the UE 102 can determine the first HARQ transmission 518A is a new transmission according to the first value. In response to the determination, the UE 102 can flush a soft buffer associated to the first HARQ process number to store the first HARQ transmission 518A. Similarly, the base station 106A can set the second NDI to a second value indicating the first HARQ transmission 520A is a new transmission. Thus, the UE 102 can determine the first HARQ transmission 520A is a new transmission according to the second value. In response to the determination, the UE 102 can flush a soft buffer associated to the (first) HARQ process number to store the first HARQ transmission 520A. The first and second values can be the same or different.

In another implementation, the base station 106A can set the first NDI to a third value indicating the first HARQ transmission 518A is a retransmission. Thus, the UE 102 can determine the first HARQ transmission 518A is a retransmission according to the third value. In response to the determination, the UE 102 does to flush a soft buffer associated to the (first) HARQ process number. The UE 102 stores the first HARQ transmission 518A in the soft buffer. Similarly, the base station 106A can set the second NDI to a fourth value indicating the first HARQ transmission 520A is a retransmission. Thus, the UE 102 can determine the first HARQ transmission 520A is a HARQ retransmission according to the fourth value. In response to the determination, the UE 102 does not flush a soft buffer associated to the (second) HARQ process number. The UE 102 stores the first HARQ transmission 520A in the soft buffer. The third and fourth values can be the same or different. For example, the UE 102 may store a value of a previously received NDI associated to a HARQ process identified by the first HARQ process number. The UE 102 determines the first HARQ transmission 518A is a new HARQ transmission if the first or third value compared to the stored value of the previously NDI is different (e.g., toggled). Similarly, the UE 102 may store a value of a previously received NDI associated to a HARQ process identified by the second HARQ process number. The UE 102 determines the first HARQ transmission 520A is a HARQ new transmission if the second or fourth value compared to the stored value of the previously NDI is different (e.g., toggled). The first and second HARQ process numbers can be the same or different.

In other implementations, the base station 106A can use a single NDI for both the first HARQ transmission 518A and the first HARQ transmission 520A, and the UE 102 can use the single NDI to determine both the first HARQ transmission 518A and the first HARQ transmission 520A are new transmissions or retransmissions in a similar manner as described above.

In some implementations, the first set includes a first MCS, and the second set includes a second MCS. The first MCS and the second MCS can be set to the same value or different values. The UE 102 decodes the first HARQ transmission 518A according to the first MCS and decodes the first HARQ transmission 520A according to the second MCS. In some implementations, the base station 106A can determine the first MCS according to at least one first channel state information (CSI) and/or at least one first SRS received on the PCell 125A from the UE 102. Similarly, the base station 106A can determine the second MCS according to at least one second CSI received on the PCell 125A from the UE 102 and/or according to at least one second SRS received on the SCell 126A from the UE 102. In one implementation, the UE 102 can obtain the at least one first CSI according to at least one first signal detected/received on the PCell 125A and transmits the at least one first CSI on the PCell 125A to the base station 106A. Similarly, the UE 102 can obtain the at least one second CSI according at least one second signal detected/received on the SCell 126A and transmits the at least one second CSI on the PCell 125A to the base station 106A. The at least one first or second signal can include synchronization signal(s) such as primary synchronization signal(s), secondary synchronization(s) and/or synchronization signal block(s) and/or, include reference signal(s) such as CSI reference signal(s) (CSI-RS(s)). In other implementations, the base station 106A can include a single MCS in the DCI1 for both the first HARQ transmission 518A and the first HARQ transmission 520A, and the UE 102 can use the single MCS to decode the first HARQ transmission 518A and the first HARQ transmission 520A in a similar manner as described above. In one implementation, the base station 106A can determine the single MCS value according to either the at least one first CSI or SRS, or the at least one second CSI or SRS. In another implementation, the base station 106A can determine the single MCS value according to the at least one first CSI or SRS, and the at least one second CSI or SRS.

In some implementations, the first set includes a first RV, and the second set includes a second RV. The first RV and the second RV can be set to the same value or different values. The UE 102 decodes the first HARQ transmission 518A according to the first RV and decodes the first HARQ transmission 520A according to the second RV. In some implementations, the base station 106A can set the first RV value to 0 if the first HARQ transmission 518A is a new transmission. Similarly, the base station 106A can set the second RV value to 0 if the first HARQ transmission 520A is a new transmission. In other implementations, the base station 106A can set the first RV value to 2, 3 or 1 if the first HARQ transmission 518A is a retransmission. Similarly, the base station 106A can set the second RV value to 2, 3 or 1 if the first HARQ transmission 520A is a retransmission. In other implementations, the base station 106A can include a single RV in the DCI1 for both the first HARQ transmission 518A and the first HARQ transmission 520A, and the UE 102 can use the single RV to decode the first HARQ transmission 518A and the first HARQ transmission 520A in a similar manner as described above.

In some implementations, the first set can include a first time-domain resource assignment and/or a first frequency-domain resource assignment which assign first time and/or frequency resources on the PCell 125A, and the second set can include a second time-domain resource assignment and/or a second frequency-domain resource assignment which assign second time and/or frequency resources on the SCell 126A. In such implementations, the base station 106A can transmit the first HARQ transmission 518A on the PCell 125A and the first HARQ transmission 520A on the first and time and/or frequency resources and the second time and/or frequency resources, respectively. In other implementations, the base station 106A can include a single time-domain resource assignment and/or a single frequency-domain resource assignment in the DCI1 for both the first HARQ transmission 518A and the first HARQ transmission 520A, and the UE 102 can use the single time-domain resource assignment and/or the single frequency-domain resource assignment to receive the first HARQ transmission 518A on the PCell 125A and the first HARQ transmission 520A on the SCell 126A in a similar manner as described above.

In some implementations, the first set can include a first BWP indicator indicating a first BWP on the PCell 125A, and the second set can include a second BWP indicator indicating a second BWP on the SCell 126A. The first and second BWP indicators can be set to the same value or different values. The base station 106A can transmit the HARQ transmission 518A on the first BWP, and transmit the HARQ transmission 520A on the second BWP. The UE 102 can receive the HARQ transmission 518A on the first BWP according to the first BWP indicator, and receive the HARQ transmission 520A on the second BWP according to the second BWP indicator. In other implementations, the base station 106A can use a single BWP indicator to indicate a first BWP on the PCell 125A and a second BWP on the SCell 126A, and include the single BWP indicator in the DCI1 for both the first HARQ transmission 518A and the first HARQ transmission 520A. The base station 106A can transmit the HARQ transmission 518A on the first BWP, and transmit the HARQ transmission 520A on the second BWP. The UE 102 can use the single BWP indicator to receive the first HARQ transmission 518A on the first BWP and receive the first HARQ transmission 520A on the second BWP.

In some scenarios and implementations, the UE 102 succeeds to obtain the first DL MAC PDU from the first HARQ transmission 518A according to the DCI1. In this case, the UE 102 transmits a HARQ ACK on the PCell 125A to the base station 106A to indicate successful reception of the first DL MAC PDU. For example, the UE 102 may decode the first HARQ transmission 518A according to the DCI1 to obtain a transport block including the first DL MAC PDU and the transport block passes CRC check, so that the UE 102 succeeds to obtain the first DL MAC PDU from the transport block.

In some scenarios and implementations, the UE 102 succeeds to obtain the second DL MAC PDU from the first HARQ transmission 520A according to the DCI1. In this case, the UE 102 transmits a HARQ ACK on the PCell 125A to the base station 106A to indicate successful reception of the second DL MAC PDU. For example, the UE 102 may decode the first HARQ transmission 520A according to the DCI1 to obtain a transport block including the second DL MAC PDU and the transport block passes CRC check, so that the UE 102 succeeds to obtain the second DL MAC PDU from the transport block.

In other scenarios and implementations, the UE 102 can transmit a HARQ NACK to the base station 106A on the PCell 125A if the UE 102 fails to obtain the second DL MAC PDU from the first HARQ transmission 520A according to the DCI1. For example, the UE 102 may decode the first HARQ transmission 520A according to the DCI1 to obtain a transport block and fail CRC check for the transport block, so that the UE 102 fails to obtain the second DL MAC PDU from the transport block. In response to the HARQ NACK, the base station 106A can transmit 524A a second DCI command (DCI2) on the SCell 126A for transmitting a second HARQ transmission of the second DL MAC PDU on the SCell 126A. The base station 106A can then transmit 526A the second HARQ transmission of the second DL MAC PDU on the SCell 126A to the UE 102. The UE 102 can combine the first HARQ transmission 520A and the second HARQ transmission, and decode the combination of the first HARQ transmission and the second HARQ transmission to obtain the second DL MAC PDU. The base station 106A may determine to perform events 524A and 526A because the UE 102 does not support cross-carrier scheduling or the base station 106A does not enable cross-carrier scheduling for the UE 102. If the base station 106A enables cross-scheduling for the UE 102, the base station 106A can transmit a DCI command on the SCell 126A for transmitting the second HARQ transmission of the second DL MAC PDU on the PCell 125A in a similar manner as described for events 328A and 330A.

The DCI2 can include multiple configuration parameters for the UE 102 to receive the second HARQ transmission 526A. The multiple configuration parameters can include carrier indicator, HARQ process number, frequency-domain resource assignment, time-domain resource assignment, RV, NDI, MCS, TPC command for PUCCH and/or PUCCH resource indicator. The multiple configuration parameters can also include other parameters such as identifier of DCI format, BWP indicator, VRB to PRB mapping, PRB bundling size indicator, rate matting indicator, CSI-RS trigger, downlink assignment index, PDSCH to HARQ feedback timing indicator, antenna port(s) and number of layers, transmission configuration indication, SRS request and/or DRMS sequence initialization. In one implementation, the DCI2 may not include a carrier indicator if the base station 106A does not enable cross-carrier scheduling for the UE 102. In this implementation, the UE 102 can determine to receive the second HARQ transmission of the second DL MAC PDU on the SCell 125A according to the DCI2 because the UE 102 does not support cross-carrier scheduling or the base station 106A does not enable cross-carrier scheduling for the UE 102. In another implementation, the DCI2 includes a carrier indicator if the base station 106A enables multi-cell scheduling for the UE 102. In this implementation, the base station 106A can set a value of the carrier indicator to a value included in the multi-cell scheduling configuration. Thus, the UE 102 can determine to receive the second HARQ transmission 526A on the SCell 126A according to the value of the carrier indicator. The carrier indicator in the DCI2 and the carrier indicator in the DCI1 can have the same values or different values.

In some implementations, the DCI2 and the DCI1 include the same HARQ process number (i.e., value) and the same NDI value for the first HARQ transmission 520A and the second HARQ transmission 526A, so that the UE 102 can determine the second HARQ transmission 526A is a HARQ retransmission from the HARQ process number and the NDI (value) in the DCI2. The base station 106A can set a RV in the DCI2 for the second HARQ transmission 526A to a value which is the same as or different from the RV in the DCI1 for the first HARQ transmission 520A. If the RV in the DCI2 and the RV in the DCI1 are different, the UE 102 can perform HARQ operation (e.g., HARQ combining with incremental redundancy) to combine the first HARQ transmission 520A and second HARQ transmissions 526A to obtain the second DL MAC PDU. If the RV in the DCI2 and the RV in the DCI1 are the same, the UE 102 can HARQ operation (e.g., HARQ chase combining) to combine the first HARQ transmission 520A and second HARQ transmissions 526A to obtain the second DL MAC PDU.

If the UE 102 succeeds to obtain the second DL MAC PDU from the HARQ operation, i.e., decoding the combination to obtain a transport block including the first DL MAC PDU and passing CRC check, the UE 102 transmits a HARQ ACK on the PCell 125A to the base station 106A to indicate successful reception of the second DL MAC PDU. If the UE 102 fails to obtain the second DL MAC PDU from the HARQ operation, i.e., decoding the combination to obtain a transport block failing CRC check, the UE 102 transmits a HARQ NACK on the PCell 125A to the base station 106A to indicate failing reception of the second DL MAC PDU. In response to the HARQ NACK, the base station 106A can transmit an additional DCI to the UE 102 on the SCell 126A to indicate the UE 102 to receive a HARQ retransmission of the second DL MAC PDU on the SCell 126A. The additional DCI can include the same HARQ process number as the DCI2. The additional DCI can include the same NDI (value) for the second HARQ transmission 526A as the DCI2 to indicate the HARQ retransmission. The additional DCI can include the same RV for the second HARQ transmission 526A as the DCI2. Alternatively, the additional DCI can include a RV for the HARQ retransmission, which is different from the RV for the second HARQ transmission in the DCI2. Similarly, the UE 102 can perform HARQ operation to combine the HARQ retransmission with the first HARQ transmission 520A and second HARQ transmission 526A according to the RV in the additional DCI to obtain the second DL MAC PDU in a similar manner as described above.

In some scenarios and implementations, the base station 106A can also configure the UE 102 to receive a first additional HARQ transmission of a first additional DL MAC PDU on the PCell 125A in the DCI1 in a similar manner as described for the DCI1 in FIG. 3A. The base station 106A can include additional configuration parameters for the first additional HARQ transmission in the DCI1 and the UE 102 can receive the first additional HARQ transmission on the PCell 125A according to the DCI1. If the base station 106A receives a HARQ NACK for the first additional HARQ transmission from the UE 102, the base station 106A can also configure the UE 102 to receive a second additional HARQ transmission of the first additional DL MAC PDU on the PCell 125A in a fifth DCI command (DCI5) in a similar manner as described for the DCI2 in FIG. 3A.

In some scenarios and implementations, the base station 106A can also configure the UE 102 to receive a first additional HARQ transmission of a second additional DL MAC PDU on the SCell 126A in the DCI1 in a similar manner as described for the DCI3 in FIG. 3A. The base station 106A can include additional configuration parameters for the first additional HARQ transmission in the DCI1 and the UE 102 can receive the first additional HARQ transmission on the SCell 126A according to the DCI1. If the base station 106A receives a HARQ NACK for the first additional HARQ transmission from the UE 102, the base station 106A can also configure the UE 102 to receive a second additional HARQ transmission of the second additional DL MAC PDU on the SCell 126A in the DCI2 in a similar manner as described for the DCI2 in FIG. 3A. The description for the DCI2 320A and the second HARQ transmission 322A on the PCell 125A can apply to the DCI1 and the second additional HARQ transmission of the second additional DL MAC PDU on the SCell 126A.

In some implementations, the base station 106A uses the same DCI format or different DCI formats for the DCIs (e.g., the DCI1, DCI2, additional DCI, etc.). For example, the base station 106A can use an existing DCI format (e.g., DCI format 1_0, DCI format 1_1) or a new DCI format (e.g., DCI format 1_2, DCI format 1_3, etc.) for the DCI1. In another example, the base station 106A can use an existing DCI formation (e.g., DCI format 1_0, DCI format 1_1) or a new DCI format (e.g., DCI format 1_2, DCI format 1_3, etc.) for the DCI2.

After receiving the RRC reconfiguration message, the UE 102 in CA communicates 514A with the base station 106A via the PCell 125A and SCell 126A. The UE 102 enables multi-cell scheduling according to/in response to the multi-cell scheduling configuration. According to the multi-cell scheduling configuration, the base station 106A can transmit the UE 102, via the PCell 125A, 528A a third DCI command (DCI3) which includes multiple configuration parameters for a first HARQ transmission of a first UL MAC PDU on the PCell 125A and a first HARQ transmission of a second UL MAC PDU on the SCell 126A. Then the UE 102 transmits 530A the first HARQ transmission of the first UL MAC PDU on the PCell 125A to the base station 106A and transmits 532A the first HARQ transmission of the second UL MAC PDU on the SCell 126A to the base station 106A according to the multiple configuration parameters. The base station 106A receives and processes the first HARQ transmission 530A on the PCell 125A and receives and processes the first HARQ transmission 532A on the SCell 126A according to the multiple configuration parameters in the DCI3.

In some implementations, the multiple configuration parameters can include a first set of parameters and a second set of parameters configuring the first HARQ transmission 530A and the first HARQ transmission 532A respectively. Each of the two sets can include some or all of parameters such as carrier indicator, HARQ process number, frequency domain resource assignment, time domain resource assignment, frequency hopping flag, RV, NDI, MCS, TPC command for PUSCH. Each of the two sets can further include some or all of other parameters such as identifier of DCI format, BWP indicator, 1$^{st}$ DL assignment index, 2$^{nd}$ DL assignment index, SRS resource indicator, precoding information and number of layers, antenna ports, SRS request, CSI request, and/or DMRS sequence initialization. If each of the two sets includes some of the parameters, the rest of the parameters can be common parameters for both the first HARQ transmission 530A and the first HARQ transmission 532A.

In different implementations, the first set may or may not include a carrier indicator, and the second set may or may include a carrier indicator. In one implementation, the first set may include a first carrier indicator indicating the first HARQ transmission 530A is on the PCell 125A, and the second set may include a second carrier indicator indicating the first HARQ transmission 532A is on the SCell 126A. The UE 102 can determine to transmit the first HARQ transmission 530A on the PCell 125A according to the first carrier indicator and transmit the first HARQ transmission 532A on the SCell 126A according to the second carrier indicator. In one implementation, the base station 106A can configure the first carrier indicator (value) and the second carrier indicator (value) in the multi-cell configuration. The multi-cell configuration can configure the first carrier indicator (value) and the second carrier (value) indicator associated to the PCell 125A and the SCell 126A respectively.

In another implementation, the first set may not include a carrier indicator and the second set may include a carrier indicator indicating the first HARQ transmission 532A is on the SCell 126A. In this implementation, the UE 102 can determine to transmit the first HARQ transmission 530A on the PCell 125A according to according to a default configuration. The default configuration can be that if the UE 102 receives a DCI (e.g., DCI3) on a cell (e.g., the PCell 125A), which does not include a carrier indicator for a HARQ transmission (e.g., the first HARQ transmission 530A) and configures a UL transmission, the UE 102 transmit a HARQ transmission (e.g., the first HARQ transmission 530A) in the cell (e.g., the PCell 125A) according to the DCI. The UE 102 can determine to transmit the first HARQ transmission 530A on the SCell 126A according to the carrier indicator. In one implementation, the base station 106A can configure the carrier indicator associated to the SCell 126A in the multi-cell configuration. In yet another implementation, neither the first set nor the second set include a carrier indicator. The UE 102 can determine to transmit the first HARQ transmission 530A on the PCell 125A and transmit the first HARQ transmission 532A on the SCell 126A according to a format of the DCI3 or a particular field in the DCI3. For example, the format of the DCI3 or the particular field is specifically designed to indicate that the UE 102 transmits HARQ transmissions on two cells (e.g., the PCell 125A and the SCell 126A) configured by the RRC reconfiguration message.

In other implementations, the multiple configuration parameters can include a single set of parameters configuring both the first HARQ transmission 530A and the first HARQ transmission 532A. That is, the UE 102 use each single parameter in the single set of parameters to transmit the first HARQ transmission 530A and the first HARQ transmission 532A. There are no duplicate parameter fields in the DCI3. The single set of parameters can include carrier indicator, HARQ process number, frequency domain resource assignment, time domain resource assignment, frequency hopping flag, RV, NDI, MCS, TPC command for physical uplink shared channel (PUSCH). The single set can also include other parameters such as identifier of DCI format, BWP indicator, 1st DL assignment index, 2nd DL assignment index, SRS resource indicator, precoding information and number of layers, antenna ports, SRS request, CSI request, and/or DMRS sequence initialization.

In some implementations, the first set includes a first NDI and a first HARQ process number, and the second set includes a second NDI and a second HARQ process number. In one implementation, the base station 106A can set the first NDI to a first value indicating the first HARQ transmission 530A is a new HARQ transmission. Thus, the UE 102 can determine the first HARQ transmission 530A is a new HARQ transmission according to the first value. For example, the UE 102 may store a value of a previously received NDI associated to a HARQ process identified by the first HARQ process number. Because of the new HARQ transmission, the base station 106A can flush a soft buffer associated to the (first) HARQ process number and stores the first HARQ transmission 530A. Similarly, the base station 106A can set the second NDI to a second value indicating the first HARQ transmission 532A is a new HARQ transmission. Thus, the UE 102 can determine the first HARQ transmission 532A is a new HARQ transmission according to the second value. Because of the new HARQ transmission, the base station 106A can flush a soft buffer associated to the (second) HARQ process number and stores the first HARQ transmission 532A. The first and second values can be the same or different.

In another implementation, the base station 106A can set the first NDI to a third value indicating the first HARQ transmission 530A is a HARQ retransmission. Thus, the UE 102 can determine the first HARQ transmission 530A is a HARQ retransmission according to the third value. Because of the retransmission, the base station 106A does not flush a soft buffer associated to the (first) HARQ process number and stores the first HARQ transmission 530A. Similarly, the base station 106A can set the second NDI to a fourth value indicating the first HARQ transmission 532A is a HARQ retransmission. Thus, the UE 102 can determine the first HARQ transmission 532A is a HARQ retransmission according to the fourth value. Because of the retransmission, the base station 106A does not flush a soft buffer associated to the (second) HARQ process number and stores the first HARQ transmission 532A. The third and fourth values can be the same or different. For example, the UE 102 may store a value of a previously received NDI associated to a HARQ process identified by the first HARQ process number. If the first or third value compared to the stored value of the previously NDI is different (e.g., toggled), the UE 102 determines the first HARQ transmission 530A is a new HARQ transmission. Otherwise, the UE 102 determines the first HARQ transmission 530A is a HARQ retransmission. Similarly, the UE 102 may store a value of a previously received NDI associated to a HARQ process identified by the second HARQ process number. If the second or fourth value compared to the stored value of the previously NDI is different (e.g., toggled), the UE 102 determines the first HARQ transmission 532A is a new HARQ transmission. Otherwise, the UE 102 determines the first HARQ transmission 532A is a HARQ retransmission. The first and second HARQ process numbers can be the same or different.

In other implementations, the base station 106A can use a single NDI for both the first HARQ transmission 530A and the first HARQ transmission 532A, and the UE 102 can use the single NDI to determine both the first HARQ transmission 530A and the first HARQ transmission 532A are new HARQ transmissions or retransmissions in a similar manner as described above.

In some implementations, the first set includes a first MCS, and the second set includes a second MCS. The first MCS and the second MCS can be set to the same value or different values. The UE 102 generates the first HARQ transmission 530A according to the first MCS and generates the first HARQ transmission 532A according to the second MCS. In some implementations, the base station 106A can determine the first MCS according to at least one first channel state information (CSI) and/or at least one first SRS received on the PCell 125A from the UE 102. Similarly, the base station 106A can determine the second MCS according to at least one second CSI received on the PCell 125A from the UE 102 and/or according to at least one second SRS received on the SCell 126A from the UE 102. In one implementation, the UE 102 can obtain the at least one first CSI according to at least one first signal detected/received on the PCell 125A and transmits the at least one first CSI on the PCell 125A to the base station 106A. Similarly, the UE 102 can obtain the at least one second CSI according at least one second signal detected/received on the SCell 126A and transmits the at least one second CSI on the PCell 125A to the base station 106A. The at least one first or second signal can include synchronization signal(s) such as primary synchronization signal(s), secondary synchronization(s) and/or synchronization signal block(s) and/or, include reference signal(s) such as CSI reference signal(s) (CSI-RS(s)). In other implementations, the base station 106A can include a single MCS in the DCI3 for both the first HARQ transmission 530A and the first HARQ transmission 532A, and the UE 102 can use the single MCS to decode the first HARQ transmission 530A and the first HARQ transmission 532A in a similar manner as described above. In one implementation, the base station 106A can determine the single MCS value according to either the at least one first CSI or SRS, or the at least one second CSI or SRS. In another implementation, the base station 106A can determine the single MCS value according to the at least one first CSI or SRS, and the at least one second CSI or SRS.

In some implementations, the first set includes a first RV, and the second set includes a second RV. The first RV and the second RV can be set to the same value or different values. The UE 102 generates the first HARQ transmission 530A according to the first RV and generates the first HARQ transmission 532A according to the second RV. In some implementations, the base station 106A can set the first RV value to 0 if the first HARQ transmission 530A is a new HARQ transmission. Similarly, the base station 106A can set the second RV value to 0 if the first HARQ transmission 532A is a new HARQ transmission. In other implementations, the base station 106A can set the first RV value to 2, 3 or 1 if the first HARQ transmission 530A is a retransmission. Similarly, the base station 106A can set the second RV value to 2, 3 or 1 if the first HARQ transmission 532A is a retransmission. In other implementations, the base station 106A can include a single RV in the DCI3 for both the first HARQ transmission 530A and the first HARQ transmission 532A, and the UE 102 can use the single RV to generate the first HARQ transmission 530A and the first HARQ transmission 532A in a similar manner as described above.

In some implementations, the first set can include a first time-domain resource assignment and/or a first frequency-domain resource assignment which assign first time and/or frequency resources on the PCell 125A, and the second set can include a second time-domain resource assignment and/or a second frequency-domain resource assignment which assign second time and/or frequency resources on the SCell 126A. In such implementations, the UE 102 can transmit the first HARQ transmission 530A on the PCell 125A and the first HARQ transmission 532A on the first and time and/or frequency resources and the second time and/or frequency resources, respectively. In other implementations, the base station 106A can include a single time-domain resource assignment and/or a single frequency-domain resource assignment in the DCI3 for both the first HARQ transmission 530A and the first HARQ transmission 532A, and the UE 102 can use the single time-domain resource assignment and/or the single frequency-domain resource assignment to transmit the first HARQ transmission 530A on the PCell 125A and the first HARQ transmission 532A on the SCell 126A in a similar manner as described above.

In some implementations, the first set can include a first BWP indicator indicating a first BWP on the PCell 125A, and the second set can include a second BWP indicator indicating a second BWP on the SCell 126A. The first and second BWP indicators can be set to the same value or different values. The UE 102 can transmit the HARQ transmission 530A on the first BWP according to the first BWP indicator. The UE 102 can transmit the HARQ transmission 532A on the second BWP according to the second BWP indicator. The base station 106A can receive the HARQ transmission 530A on the first BWP according to the first BWP indicator, and receive the HARQ transmission 532A on the second BWP according to the second BWP indicator. In other implementations, the UE 102 can use a single BWP indicator to indicate a first BWP on the PCell 125A and a second BWP on the SCell 126A, and include the single BWP indicator in the DCI1 for both the first HARQ transmission 530A and the first HARQ transmission 532A. The UE 102 can use the single BWP indicator to transmit the first HARQ transmission 530A on the first BWP and transmit the first HARQ transmission 532A. The base station 106A can receive the HARQ transmission 530A on the first BWP according to the first BWP indicator, and receive the HARQ transmission 532A on the second BWP according to the second BWP indicator.

In some scenarios and implementations, the UE 102 succeeds to obtain the first UL MAC PDU from the first HARQ transmission 530A according to the DCI3. In this case, the UE 102 transmits a HARQ ACK on the PCell 125A to the base station 106A to indicate successful reception of the first UL MAC PDU. For example, the UE 102 may decode the first HARQ transmission 530A according to the DCI3 to obtain a transport block including the first UL MAC PDU and the transport block passes CRC check, so that the UE 102 succeeds to obtain the first UL MAC PDU from the transport block.

In some scenarios and implementations, the base station 106A succeeds to obtain the first UL MAC PDU from the first HARQ transmission 530A and obtain the second UL MAC PDU from the first HARQ transmission 532A according to the DCI3. In this case, the base station 106A can transmits a DCI command to the UE 102 to schedule the UE 102 to transmit HARQ transmissions of UL MAC PDUs in a manner similar to the description for the DCI3 and the first HARQ transmissions 324A and 326A. The DCI command may not include a carrier indicator. For example, the base station 106A may decode the first HARQ transmissions 530A and 532A according to the DCI3 to obtain transport blocks including the first UL MAC PDU and the second UL MAC PDU respectively and the transport blocks passes CRC check, so that the base station 106A succeeds to obtain the first and second UL MAC PDUs from the transport blocks.

In other scenarios and implementations, the base station 106A fails to obtain the second UL MAC PDU from the first HARQ transmission 532A according to the DCI3. For example, the base station 106A may decode the first HARQ transmission 532A according to the DCI3 to obtain a transport block and fail CRC check for the transport block, so that the base station 106A fails to obtain the second UL MAC PDU from the transport block. In response to the failure, the base station 106A can transmit 534A a fourth DCI command (DCI4) on the SCell 126A for a second HARQ transmission of the second UL MAC PDU on the SCell 126A. The UE 102 can then transmit 536A the second HARQ transmission of the second UL MAC PDU on the SCell 126A to the base station 106A. The base station 106A can combine the first HARQ transmission 532A and the second HARQ transmission 536A, and decode the combination of the first HARQ transmission and the second HARQ transmission to obtain the second UL MAC PDU. The base station 106A may determine to perform events 534A and 536A because the UE 102 does not support cross-carrier scheduling or the base station 106A does not enable cross-carrier scheduling for the UE 102. If the base station 106A enables cross-carrier scheduling for the UE 102, the base station 106A can transmit a DCI command on the SCell 126A for transmitting the second HARQ transmission of the second UL MAC PDU on the PCell 125A in a similar manner as described for events 344A and 346A.

The DCI4 can include multiple configuration parameters for the UE 102 to transmit the second HARQ transmission 536A. The multiple configuration parameters can include carrier indicator, HARQ process number, frequency domain resource assignment, time domain resource assignment, frequency hopping flag, RV, NDI, MCS, TPC command for PUSCH. The multiple configuration parameters can further include some or all of other parameters such as identifier of DCI format, BWP indicator, $1^{st}$ DL assignment index, $2^{nd}$ DL assignment index, SRS resource indicator, precoding information and number of layers, antenna ports, SRS request, CSI request, and/or DMRS sequence initialization. In one implementation, the DCI4 may not include a carrier indicator if the base station 106A does not enable cross-carrier scheduling for the UE 102. In this implementation, the UE 102 can determine to transmit the second HARQ transmission of the second UL MAC PDU on the SCell 125A according to the DCI4 because the UE 102 does not support cross-carrier scheduling or the base station 106A does not enable cross-carrier scheduling for the UE 102. In another implementation, the DCI4 includes a carrier indicator if the base station 106A enables multi-cell scheduling for the UE 102. In this implementation, the base station 106A can set a value of the carrier indicator to a value included in the multi-cell scheduling configuration. Thus, the UE 102 can determine to transmit the second HARQ transmission 536A on the SCell 126A according to the value of the carrier indicator. The carrier indicator in the DCI4 and the carrier indicator in the DCI3 can have the same values or different values.

In some implementations, the DCI4 and the DCI3 include the same HARQ process number (i.e., value) and the same NDI value for the first HARQ transmission 532A and the second HARQ transmission 536A, so that the UE 102 can determine the second HARQ transmission 536A is a HARQ retransmission from the HARQ process number and the NDI (value) in the DCI4. The base station 106A can set a RV in the DCI4 for the second HARQ transmission 536A to a value which is the same as or different from the RV in the DCI3 for the first HARQ transmission 532A. The UE 102 generates the second HARQ transmission 536A according to the RV in the DCI4. If the RV in the DCI4 and the RV in the DCI3 are different, the base station 106A can perform HARQ operation (e.g., HARQ combining with incremental redundancy) to combine the first HARQ transmission 532A and second HARQ transmissions 536A to obtain the second UL MAC PDU. If the RV in the DCI4 and the RV in the DCI3 are the same, the base station 106A can HARQ operation (e.g., HARQ chase combining) to combine the first HARQ transmission 532A and second HARQ transmissions 536A to obtain the second UL MAC PDU.

If the base station 106A succeeds to obtain the second UL MAC PDU from the HARQ operation, i.e., decoding the combination to obtain a transport block including the first UL MAC PDU and passing CRC check, the base station 106A can transmits a DCI command to the UE 102 to schedule the UE 102 to transmit HARQ transmissions of UL MAC PDUs in a manner similar to the description for the DCI1 and the first HARQ transmissions 518A and 520A. If the base station 106A fails to obtain the second UL MAC PDU from the HARQ operation, i.e., decoding the combination to obtain a transport block failing CRC check, the base station 106A can transmit an additional DCI to the UE 102 on the SCell 126A to indicate the UE 102 to transmit a HARQ retransmission of the second UL MAC PDU on the SCell 126A. The additional DCI can include the same HARQ process number as the DCI4. The additional DCI can include the same NDI (value) for the second HARQ transmission 536A as the DCI4 to indicate the HARQ retransmission. The additional DCI can include the same RV for the second HARQ transmission 536A as the DCI4. Alternatively, the additional DCI can include a RV for the HARQ retransmission, which is different from the RV for the second HARQ transmission 536A in the DCI4. Similarly, the base station 106A can perform HARQ operation to combine the HARQ retransmission with the first HARQ transmission 532A and second HARQ transmission 536A according to the RV in the additional DCI to obtain the second UL MAC PDU in a similar manner as described above.

In some scenarios and implementations, the base station 106A can also configure the UE 102 to transmit a first additional HARQ transmission of a first additional UL MAC PDU on the PCell 125A in the DCI3 in a similar manner as described for the DCI5 in FIG. 3A. The base station 106A can include additional configuration parameters for the first additional HARQ transmission on the PCell 125A in the DCI1 and the UE 102 can transmit the first additional HARQ transmission on the PCell 125A according to the DCI3. If the base station 106A fails to obtain the first additional UL MAC PDU from the first additional HARQ transmission, the base station 106A can transmit a DCI command on the PCell 125A to indicate the UE 102 to transmit a second HARQ transmission of the first additional UL MAC PDU on the PCell 125A to the base station 106A. The description for the DCI6 336A and the second HARQ transmission 338A on the PCell 125A can apply to the DCI command and the second additional HARQ transmission of the second additional UL MAC PDU on the SCell 126A.

In some scenarios and implementations, the base station 106A can also configure the UE 102 to transmit a first additional HARQ transmission of a second additional UL MAC PDU on the SCell 126A in the DCI3 in a similar manner as described for the DCI5 in FIG. 3A. The base station 106A can include additional configuration parameters for the first additional HARQ transmission on the SCell 126A in the DCI3 and the UE 102 can transmit the first additional HARQ transmission on the SCell 126A according to the DCI3. The description for the DCI5 332A and the first HARQ transmission 334A on the PCell 125A can apply to the DCI3 and the second additional HARQ transmission of the second additional UL MAC PDU on the SCell 126A. If the base station 106A fails to obtain the second additional UL MAC PDU from the first additional HARQ transmission, the base station 106A can configures the UE 102 to transmit a second additional HARQ transmission of the second additional UL MAC PDU on the PCell 125A in the DCI4 in a similar manner as described for the DCI6 in FIG. 3A. The description for the DCI6 336A and the second HARQ transmission 338A on the PCell 125A can apply to the DCI command and the second additional HARQ transmission of the second additional UL MAC PDU on the SCell 126A.

If the base station 106A fails to obtain the first and second additional UL MAC PDUs from the first and second additional HARQ transmission respectively, the base station 106A can configures the UE 102 to transmit a HARQ retransmission of the first additional UL MAC PDU on the PCell 125A and a HARQ retransmission of the second additional UL MAC PDU on the SCell 126A in a DCI command in a similar manner as described for the DCI3 528A. The UE 102 can transmit the HARQ retransmission of the first additional UL MAC PDU on the PCell 125A and the HARQ retransmission of the second additional UL MAC PDU on the SCell 126A to the base station 106A in a similar manner as described for the first HARQ transmission 518A and the first HARQ transmission 520A.

In some implementations, the base station 106A uses the same DCI format or different DCI formats for the DCIs (e.g., the DCI3, DCI4, additional DCI, etc.). For example, the base station 106A can use an existing DCI format (e.g., DCI format 1_0, DCI format 1_1) or a new DCI format (e.g., DCI format 1_2, DCI format 1_3, etc.) for the DCI3. In another example, the base station 106A can use an existing DCI formation (e.g., DCI format 1_0, DCI format 1_1) or a new DCI format (e.g., DCI format 1_2, DCI format 1_3, etc.) for the DCI4.

In some scenarios, the UE 102 in CA can communicate with the base station 106A on the PCell 125A, the SCell 126A and a SCell 127A (not shown in FIG. 5A). In one implementation, the base station 106A can enable the multi-cell scheduling only for the PCell 125A and SCell 126A and does not enable the multi-cell scheduling only for the SCell 127A as described above. In this implementation, the base station 106A can transmit a single DCI (e.g., the DCI1) to the UE 102, which indicates (i.e., schedules) two HARQ transmissions on the PCell 125A and SCell 126A respectively, in a manner as described above. To schedule a HARQ transmission on the SCell 127A, the base station 106A can only transmit a DCI for the HARQ transmission on the SCell 127A unless the base station 106A enables a cross-carrier scheduling on a cell (i.e., the PCell 125A or the SCell 126A) to schedule HARQ transmissions on the SCell 127A for the UE 102. In another implementation, the base station 106A can enable multi-cell scheduling with a single DCI on the SCell 126A for the PCell 125A and SCell 126A (See FIG. 5B) in addition to enabling multi-cell scheduling with a single DCI on the PCell 125A. In yet another implementation, the base station 106A can enable multi-cell scheduling with a single DCI on the SCell 126A for scheduling HARQ transmissions on the SCell 127A.

In some implementations, the base station 106A can receive a UE capability IE (e.g., UE-NR-Capability IE or UE-MRDC-Capability IE) from the UE 102, another base station (e.g., base station 104) or a core network 110 (e.g., AMF 164) as described above. The UE capability IE includes UE capabilities of the UE 102, indicating support of different protocol functions or features for different protocol layers, mobility and measurement. The UE capability IE also include a multi-cell scheduling capability indicating that the UE 102 supports the multi-cell scheduling with single DCI. In one implementation, the UE 102 can indicate support of the multi-cell scheduling with single DCI for a specific CA band combination in the UE capability IE. For example, in the UE capability IE, the UE 102 can indicate support of the multi-cell scheduling with single DCI for at least one first CA band combinations and indicate not support of the multi-cell scheduling with single DCI for at least one second CA band combinations. The base station 106A can determine to enable the multi-cell scheduling with single DCI for the UE 102 if the base station 106A configures CA to the UE 102 on a CA band combination of the at least one first CA band combination. For example, carrier frequency(ies) of PCell 125A and carrier frequency(ies) of SCell 126A conform to the CA band combination. The base station 106A can determine not to enable the multi-cell scheduling with single DCI for the UE 102 if the base station 106A configures CA to the UE 102 on a CA band combination of the at least one second CA band combination.

In another implementation, the UE 102 can indicate support of the multi-cell scheduling with single DCI irrespective of a specific CA band combination in the UE capability IE. In other words, if the UE 102 includes the multi-cell scheduling capability in the UE capability IE, the UE 102 supports the multi-cell scheduling with single DCI for all CA band combinations of a RAT (e.g., NR) that the UE supports.

In some implementations, the base station 106A generates a PDCP PDU including the RRC reconfiguration message 308A, an RLC PDU including the PDCP PDU and a MAC PDU including the RLC PDU. The base station 106A generates one or more HARQ transmissions of the MAC PDU and one or more DCI commands (DCI(s)) for the HARQ transmission(s). The base station 106A can transmit the DCI(s) and the HARQ transmission(s) to the UE 102 on the PCell 125A. The UE 102 can receive the HARQ transmission(s) according to the DCI(s), obtain the MAC PDU from the HARQ transmission(s), extracts the RLC PDU from the MAC PDU, extracts the PDCP PDU from the RLC PDU and then extracts the RRC reconfiguration message from the PDCP PDU.

In some implementations, the UE 102 generates a PDCP PDU including the RRC reconfiguration complete message 312A, an RLC PDU including the PDCP PDU and a MAC PDU including the RLC PDU. The UE 102 can receive one or more DCI commands (DCI(s)) for UL transmission on the PCell 125A from the base station 106A and uses the DCI(s) to generate one or more HARQ transmissions of the MAC PDU. The UE 102 can transmit the HARQ transmission(s) to the base station 106A on the PCell 125A. The base station 106A can receive the HARQ transmission(s) according to the DCI(s), obtain the MAC PDU from the HARQ transmission(s), extracts the RLC PDU from the MAC PDU, extracts the PDCP PDU from the RLC PDU and then extracts the RRC reconfiguration complete message from the PDCP PDU.

In some implementations, if the base station 106A is a gNB, the RRC reconfiguration and RRC reconfiguration complete messages are RRCReconfiguration and RRCReconfigurationComplete messages, respectively.

Figure 5B:
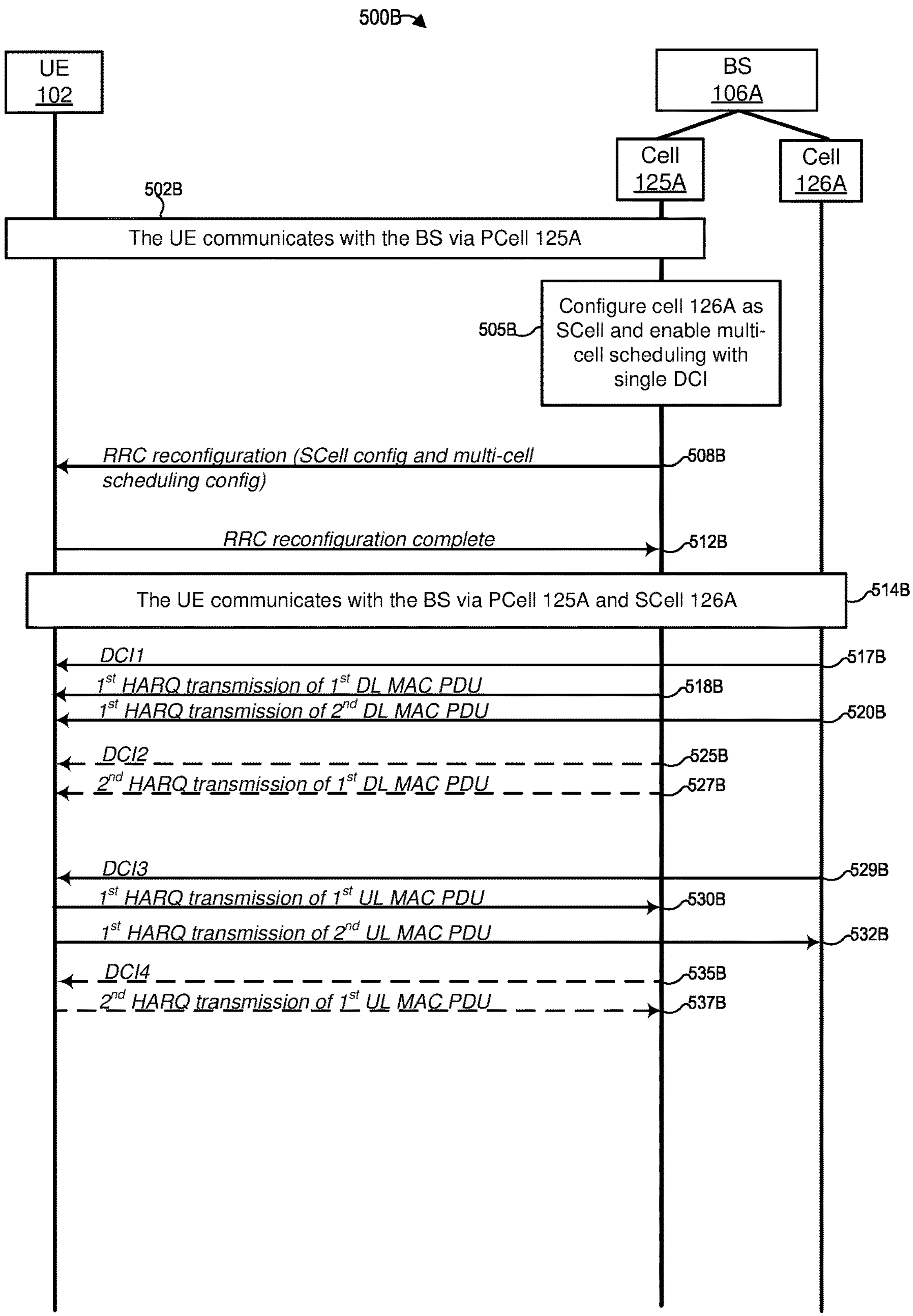
FIG. 5B is a messaging diagram of an example scenario in which a base station schedules HARQ transmissions of the same data unit in multiple cells, via the secondary cell.

Now referring to FIG. 5B, a scenario 500B is generally similar to the scenario 500A of FIG. 5A, but here the base station 106A schedules HARQ transmissions via the secondary cell rather than the primary cell, as in the scenario 500A. The differences between the scenarios of FIGS. 5A and 5B are considered below. Similar events are labeled with same reference numbers, with different letters appended to the reference numbers to more clearly distinguish the scenarios.

According to the multi-cell scheduling configuration, the base station 106A transmits 517B to the UE 102, via the SCell 126A, a first DCI command (DCI1) which includes multiple configuration parameters for a first HARQ transmission of a first DL MAC PDU on the PCell 125A and a first HARQ transmission of a second DL MAC PDU on the SCell 126A. The base station 106A then transmits 518B, 520B then first and second DL MAC PDUs, similarly to the events 518A and 520A. In response to a HARQ NACK for the first DL MAC PDU, the base station 106A can transmit 524A a second DCI command (DCI2) on the PCell 125A for performing a second HARQ transmission of the second DL MAC PDU on the PCell 125A.

In the uplink direction, the base station 106A transmits 529B to the UE 102, via the SCell 126A, a first DCI command (DCI1) which includes multiple configuration parameters for a first HARQ transmission of a first UL MAC PDU on the PCell 125A and a first HARQ transmission of a second UL MAC PDU on the SCell 126A. The base station 106A then transmits 530B, 532B then first and second UL MAC PDUs, similarly to the events 530A and 532A. If the base station fails to receive the first UL MAC PDU, the base station 106A can transmit 535B a second DCI command (DCI2) on the PCell 125A for performing a second HARQ transmission of the second UL MAC PDU on the PCell 125A.

Figure 5C:
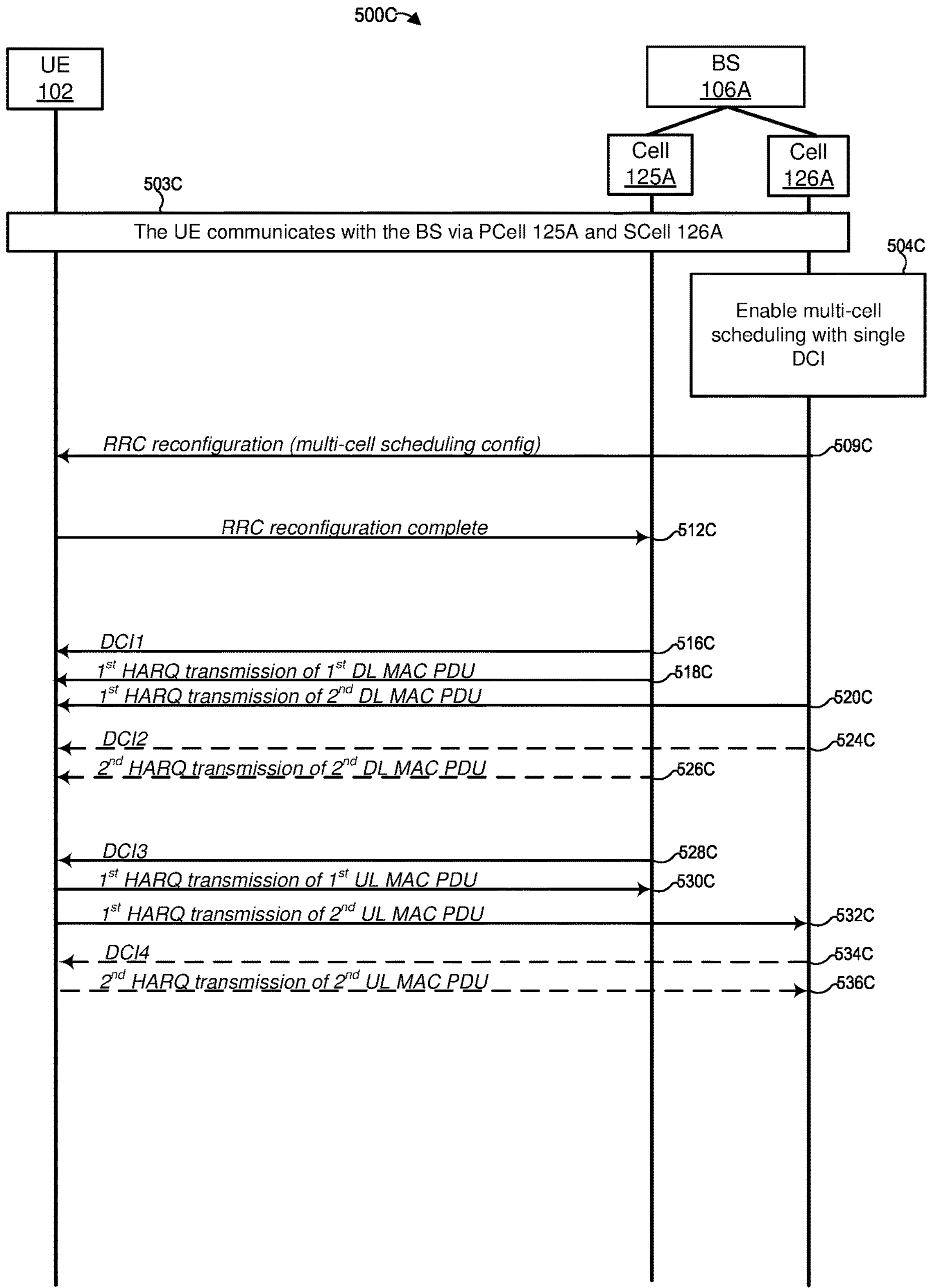
FIG. 5C is a messaging diagram of an example scenario similar to that of FIG. 5A, but with the UE communicating with the SN using CA prior to the base station configuring multi-cell communications.

A scenario 500C of FIG. 5C is generally similar to the scenario 500A of FIG. 5A, but here the UE communicates 503C with the base station using CA prior to the base station configuring the secondary cell as a scheduling cell. The differences between the scenarios of FIGS. 5A and 5C. Similar events are labeled with same reference numbers, with different letters appended to the reference numbers to more clearly distinguish the scenarios.

The UE 102 initially communicates 503C data with the base station 106A via the PCell 125A as well as via the SCell 126A. Similar to the communications of the event 502A discussed above, these communications can include UL and/or DL transmissions. After the base station 106A determines 504C to configure cell 126A for multi-cell scheduling, the base station 106A transmits 509C an RRC reconfiguration message including multi-cell scheduling configuration for the cell 126A to the UE 102. The base station 106A can transmit 309C this message in the SCell 126A.

Figure 5D:
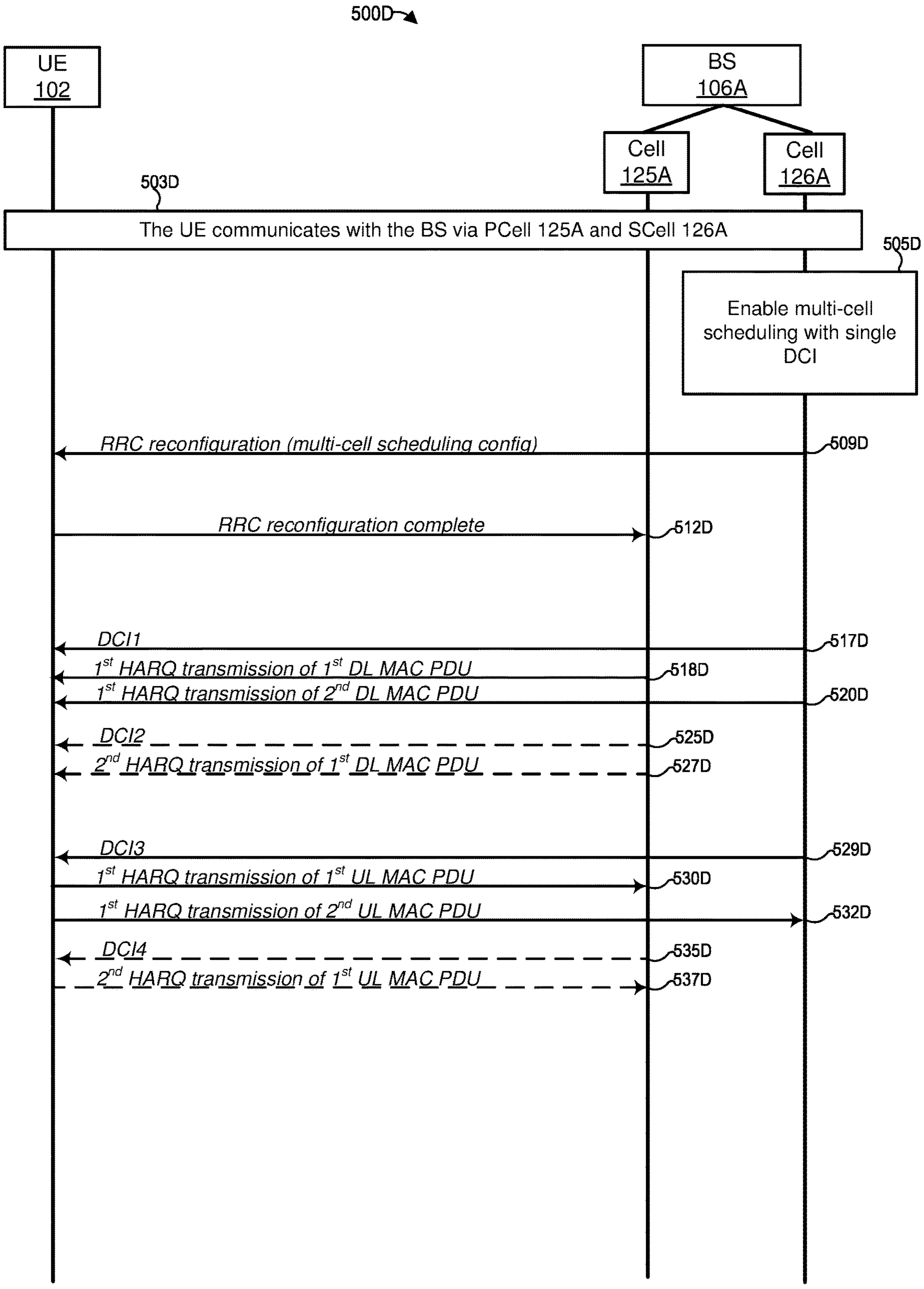
FIG. 5D is a messaging diagram of an example scenario similar to that of FIG. 5B, but with the UE communicating with the SN using CA prior to the base station configuring multi-cell communications.

A scenario 500D of FIG. 5D is generally similar to the scenario 500B of FIG. 5B, but here the UE communicates 503D with the base station using CA prior to the base station configuring the secondary cell as a scheduling cell. The differences between the scenarios of FIGS. 5B and 5D. Similar events are labeled with same reference numbers, with different letters appended to the reference numbers to more clearly distinguish the scenarios.

The UE 102 initially communicates 503D data with the base station 106A via the PCell 125A as well as via the SCell 126A. After the base station 106A determines 505D that it should configure cell 126A for multi-cell scheduling, the base station 106A transmits 509D RRC reconfiguration message including multi-cell scheduling configuration for the cell 126A to the UE 102. The base station 106A can transmit 509D this message in the SCell 126A. As in the scenario of FIG. 5B, the base station 106A transmits 517D a DCI1 command in the SCell 126A.

Several example methods that can be implemented in a base station, a UE, or both are discussed next. For clarity, the examples below are discussed with specific reference to the UE 102 and the base station 106A. These methods can be implemented using processing hardware such as one or more processors executing instructions stored on a non-transitory computer-readable medium.

Figure 6:
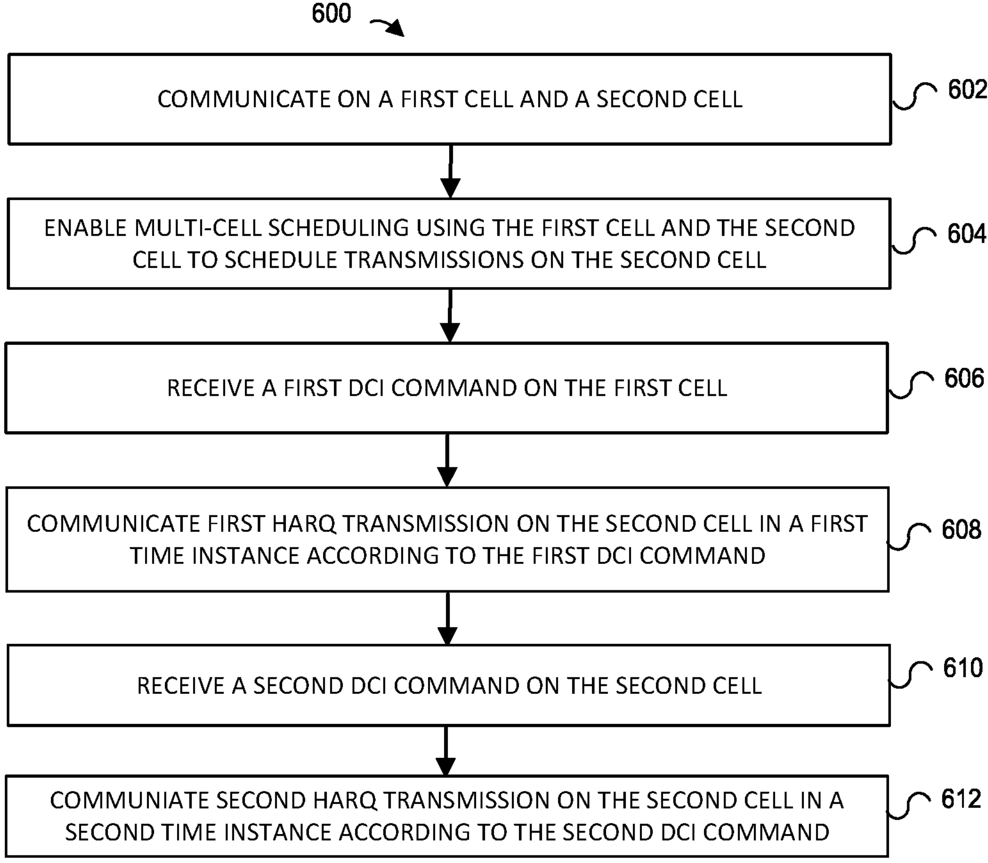
FIG. 6 is a flow diagram of an example method for transmitting or receiving the same data unit or signaling via multiple cells according to a HARQ scheme, which can be implemented in the UE of FIG. 1A.

Referring first to FIG. 6, the UE 102 (or another suitable UE) can implement an example method 600 to transmit or receive the same data unit or signaling via multiple cells according to a HARQ scheme. At block 602, the UE 102 communicates with a base station in a first cell and a second cell. At block 604, the UE 102 enables multi-cell scheduling, which can include cross-carrier scheduling, for the first and second cells. When the first cell is a primary cell and the second cell is a secondary cell, the UE 102 can enable multi-cell scheduling on the secondary cell.

At block 606, the UE 102 can receive a first DCI command on the first cell. Then, at block 608, the UE 102 can communicate a first HARQ transmission on the second cell, according to the first DCI command. The communicating can include transmitting or receiving an information unit, which can include data or signaling. The first HARQ transmission can occur within a first time instance, e.g., a time slot.

At block 610, UE 102 can receive a second DCI command on the second cell. Then, at block 612, the UE 102 can communicate a second HARQ transmission of the same information unit on the second cell, according to the second DCI command. The second HARQ transmission can occur within a second time instance, e.g., a time slot.

Figure 7:
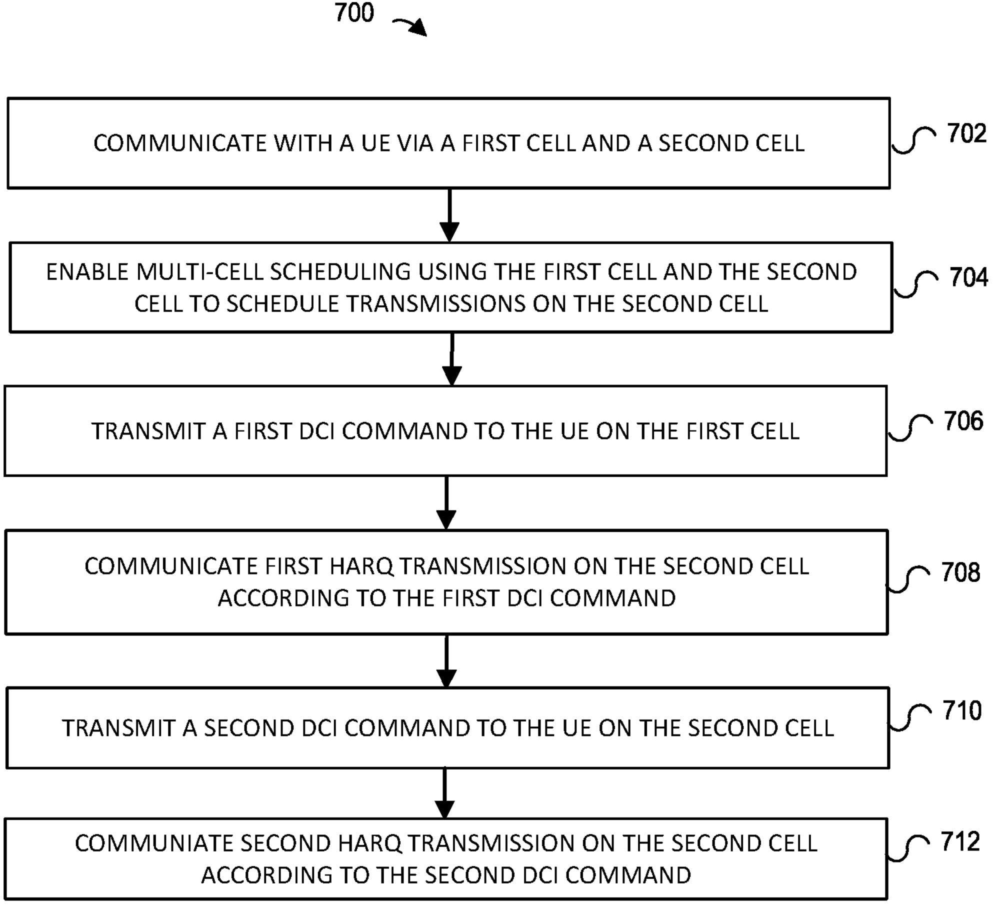
FIG. 7 is a flow diagram of an example method for transmitting or receiving the same data unit via multiple cells according to a HARQ scheme, which can be implemented in a base station of FIG. 1A.

FIG. 7 illustrates an example method 700 which the base station 106A can implement to transmit or receive the same data unit via multiple cells according to a HARQ scheme. At block 702, the base station 106A communicates with a UE in a first cell and a second cell. At block 704, the base station enables multi-cell scheduling, which can include cross-carrier scheduling, for the first and second cells. When the first cell is a primary cell and the second cell is a secondary cell, the base station 106A can enable multi-cell scheduling on the secondary cell.

At block 706, the base station 106A can transmit a first DCI command on the first cell. Then, at block 708, the base station 106A can communicate a first HARQ transmission on the second cell, according to the first DCI command. The communicating can include transmitting or receiving of a data unit. The first HARQ transmission can occur within a first time instance, e.g., a time slot.

At block 710, the base station 106A can transmit a second DCI command on the second cell. Then, at block 712, the base station 106A can communicate a second HARQ transmission of the same data unit on the second cell, according to the second DCI command. The second HARQ transmission can occur within a second time instance, e.g., a time slot.

Figure 8:
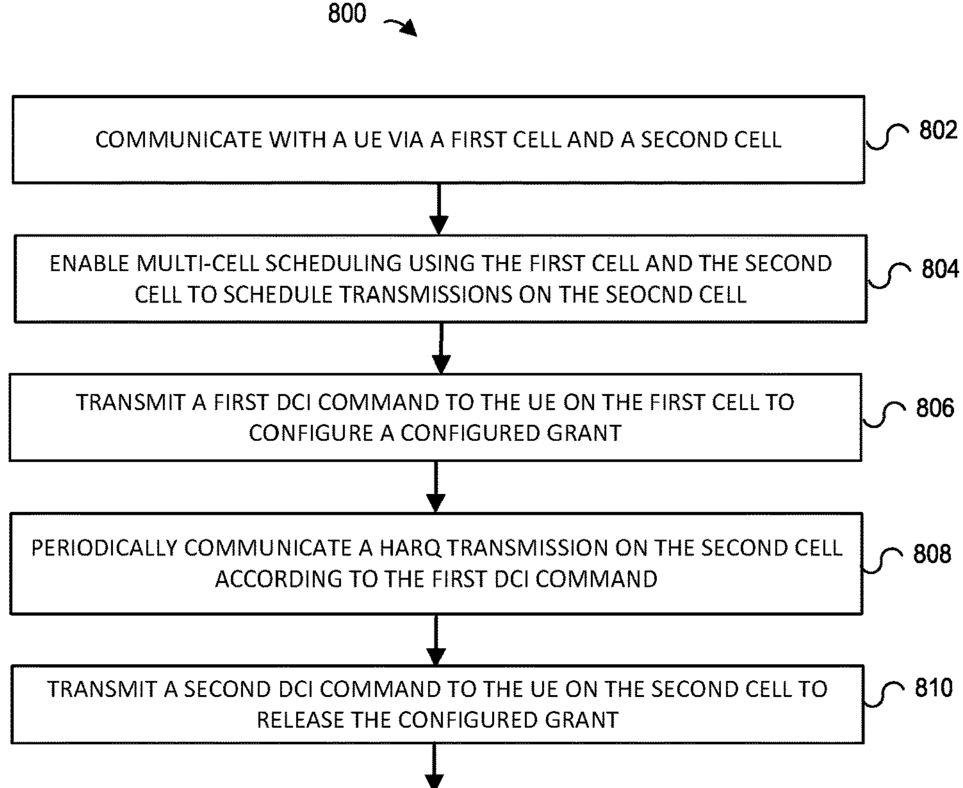
FIG. 8 is a flow diagram of an example method for periodically transmitting or receiving data units or signaling via multiple cells according to a HARQ scheme, which can be implemented in a base station of FIG. 1A.

Now referring to FIG. 8, the base station 106A can implement an example method 800 to periodically transmit or receive data units or signaling via multiple cells according to a HARQ scheme. The base station 106A can implement the method 800 t support semi-persistent scheduling, for example. At block 802, the base station 106A communicates with a UE in a first cell and a second cell. At block 804, the base station 106A enables multi-cell scheduling, which can include cross-carrier scheduling, for the first and second cells. When the first cell is a primary cell and the second cell is a secondary cell, the base station 106A can enable multi-cell scheduling on the secondary cell.

At block 806, the base station 106A transmit a first DCI command on the first cell. Unlike the first DCI of the methods above, however, the first DCI at block 806 includes a configured grant, which the UE 102 and the base station 106A can use for periodic transmissions.

At block 808, the base station 106A can periodically communicate a first HARQ transmission on the second cell, according to the first DCI command. The communicating can include transmitting or receiving of information units, which can include data or signaling.

At block 810, the base station 106A can transmit a second DCI command on the second cell. Unlike the second DCI of the methods above, the second DCI at block 810 includes a command to release the configured grant. Accordingly, at block 812, the base station 106A stops the periodic communication of a HARQ transmission on the second cell, in accordance with the second DCI.

Figure 9:
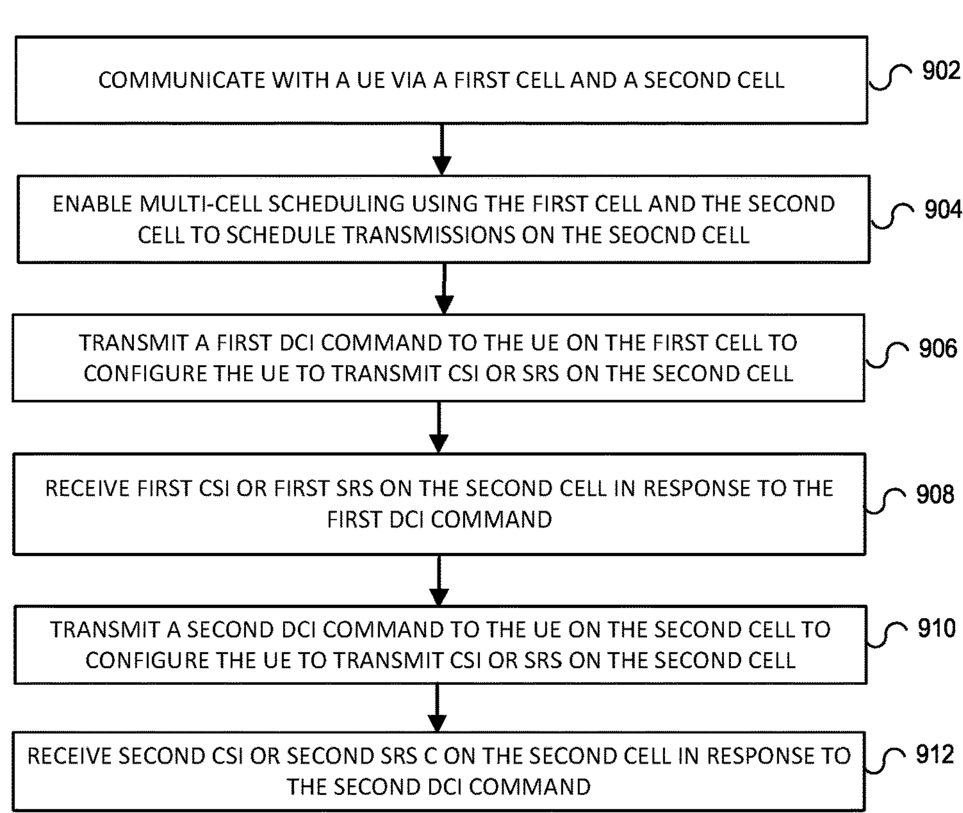
FIG. 9 is a flow diagram of an example method for transmitting or receiving the same signaling via multiple cells according to a HARQ scheme, which can be implemented in a base station of FIG. 1A.

FIG. 9 illustrates an example method 900 which the base station 106A can implement to transmit or receive the same signaling via multiple cells according to a HARQ scheme. At block 902, the base station 106A communicates with a UE in a first cell and a second cell. At block 904, the base station enables multi-cell scheduling, which can include cross-carrier scheduling, for the first and second cells. When the first cell is a primary cell and the second cell is a secondary cell, the base station 106A can enable multi-cell scheduling on the secondary cell.

At block 906, the base station 106A can transmit a first DCI command on the first cell. Then, at block 908, the base station 106A can receive a first HARQ transmission of signaling such as a CSI or SRS, for example, on the second cell, according to the first DCI command. The first HARQ transmission can occur within a first time instance, e.g., a time slot.

At block 910, the base station 106A can transmit a second DCI command on the second cell. Then, at block 912, the base station 106A can receive a second HARQ transmission of the signaling on the second cell, according to the second DCI command. The second HARQ transmission can occur within a second time instance, e.g., a time slot.

Figure 10:
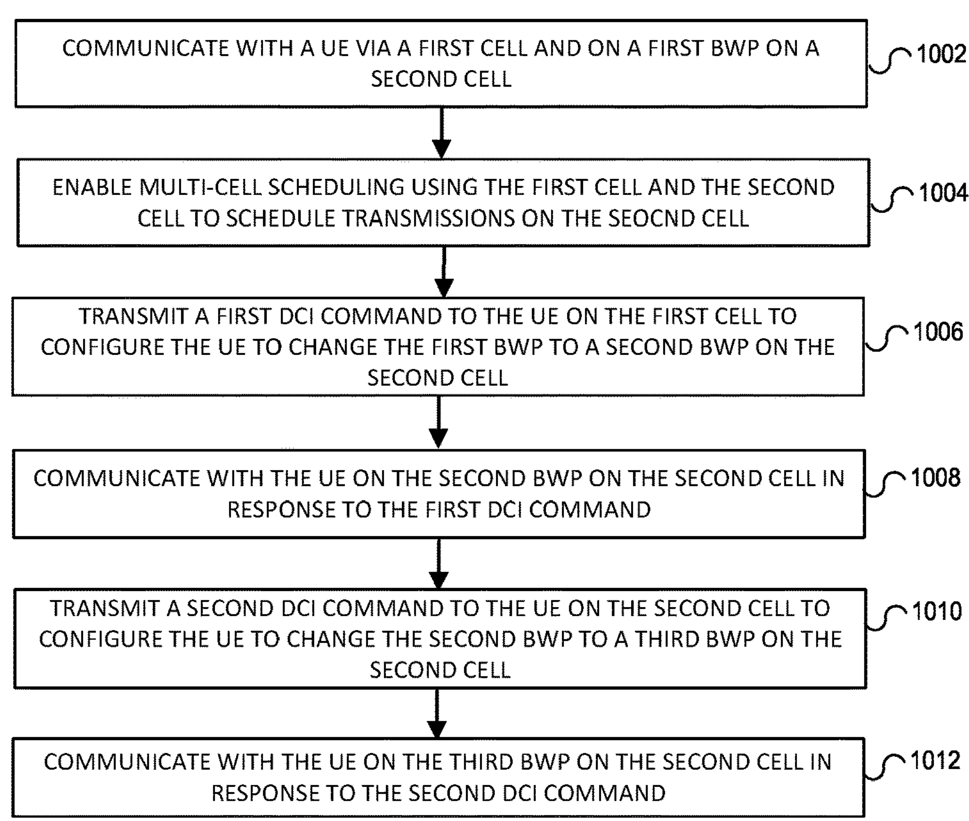
FIG. 10 is a flow diagram of an example method for transmitting a DCI in one cell with an indication that the UE should switch BWP in another cell, which can be implemented in a base station of FIG. 1A.

FIG. 10 illustrates an example method 1000 which the base station 106A can implement to transmit a DCI in one cell with an indication that the UE should switch BWP in another cell. At block 1002, the base station 106A communicates with a UE in a first cell and a second cell. At block 1004, the base station enables multi-cell scheduling, which can include cross-carrier scheduling, for the first and second cells. When the first cell is a primary cell and the second cell is a secondary cell, the base station 106A can enable multi-cell scheduling on the secondary cell.

At block 1006, the base station 106A can transmit a first DCI command to the UE on the first cell. The first DCI can include an indication that the UE 102 should switch from the first BWP to the second BWP on the second cell. For example, the base station 106A can determine that a certain BWP of the secondary cell is now dormant, and that the UE 102 may no longer be monitoring this BWP.

At block 1008, the base station 106A can communicate with the UE 102 on the second BWP of the second cell, according to the first DCI. The communicating can include receiving or transmitting an information unit, which can include data or signaling.

Next, at block 1010, the base station 106A can transmit a second DCI command to the UE on the second cell. The second DCI can include an indication that the UE 102 should switch from the second BWP to the third BWP on the second cell. Next, at block 1012, the base station 106A can communicate with the UE 102 on the third BWP of the second cell, according to the second DCI.

Figure 11:
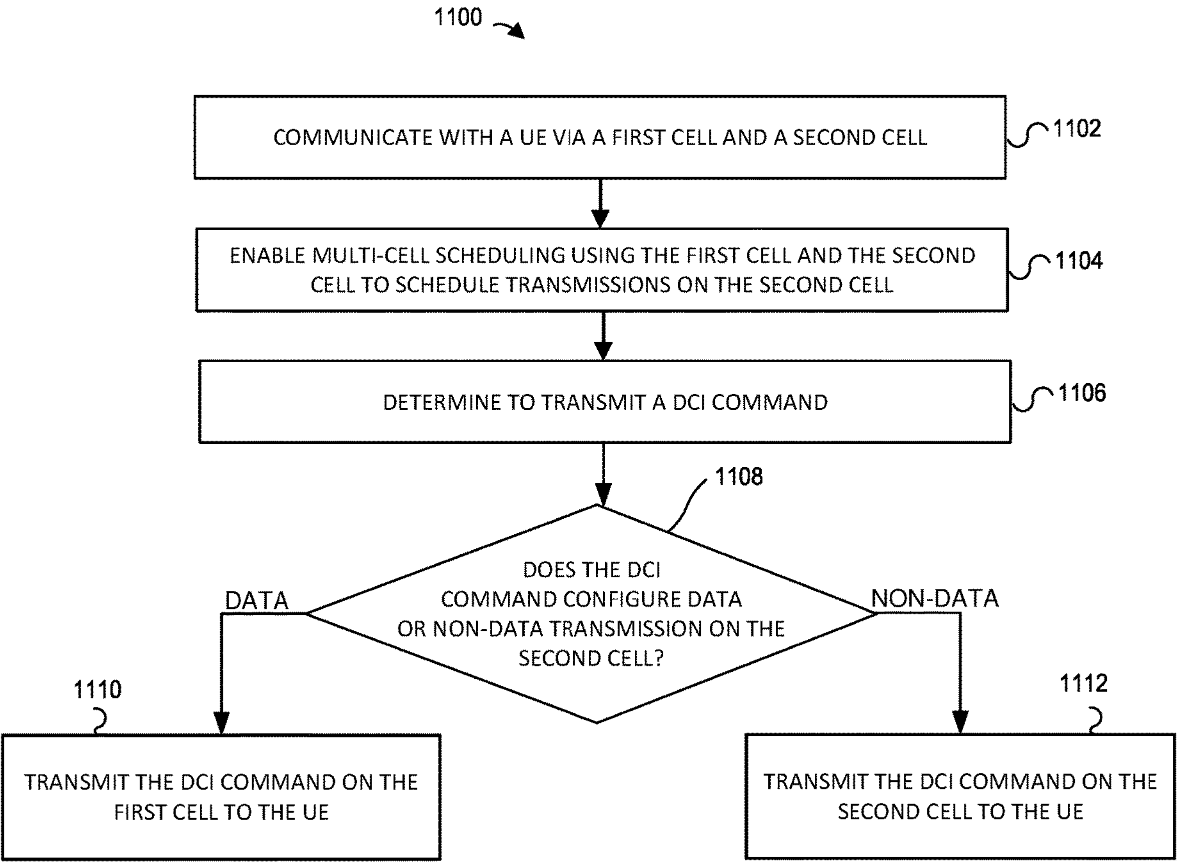
FIG. 11 is a flow diagram of an example method for determining whether the base station should transmit a DCI in the same cell as the corresponding HARQ transmission, depending on whether the transmission includes data or signaling, which can be implemented in a base station of FIG. 1A.

Now referring to FIG. 11, the base station 106A can implement an example method 1100 to determine whether the base station should transmit a DCI in the same cell as the corresponding HARQ transmission, depending on whether the transmission includes data or signaling, and transmit the DCI command accordingly.

At block 1102, the base station 106A communicates with a UE in a first cell and a second cell. At block 1104, the base station enables multi-cell scheduling, which can include cross-carrier scheduling, for the first and second cells. When the first cell is a primary cell and the second cell is a secondary cell, the base station 106A can enable multi-cell scheduling on the secondary cell.

At block 1106, the base station 106A can determine that a DCI command is available for transmission to the UE 102. The base station 106A further can determine that the DCI command can be transmitted over the primary cell or the secondary cell. At block 1108, the base station 106A determines whether the DCI command schedules a transmission of data (e.g., a PDU) or non-data (e.g., signaling such as SRS or CSI). When the base station 106A determines that the DCI command schedules data, the flow proceeds to block 1110; otherwise, the flow proceeds to block 1112.

At block 1110, the base station 106A transmits the DCI command to the UE 102 on the first cell. Thus, when the DCI command schedules transmission on the second cell, the base station 106A at block 1110 configures cross-carrier scheduling for data units. On the other hand, at block 1112, the base station 106A transmits the DCI command to the UE 102 on the second cell. When the DCI command schedules transmission on the second cell, the base station 106A at block 1110 thus configures same-carrier scheduling for non-data transmissions.

Figure 12:
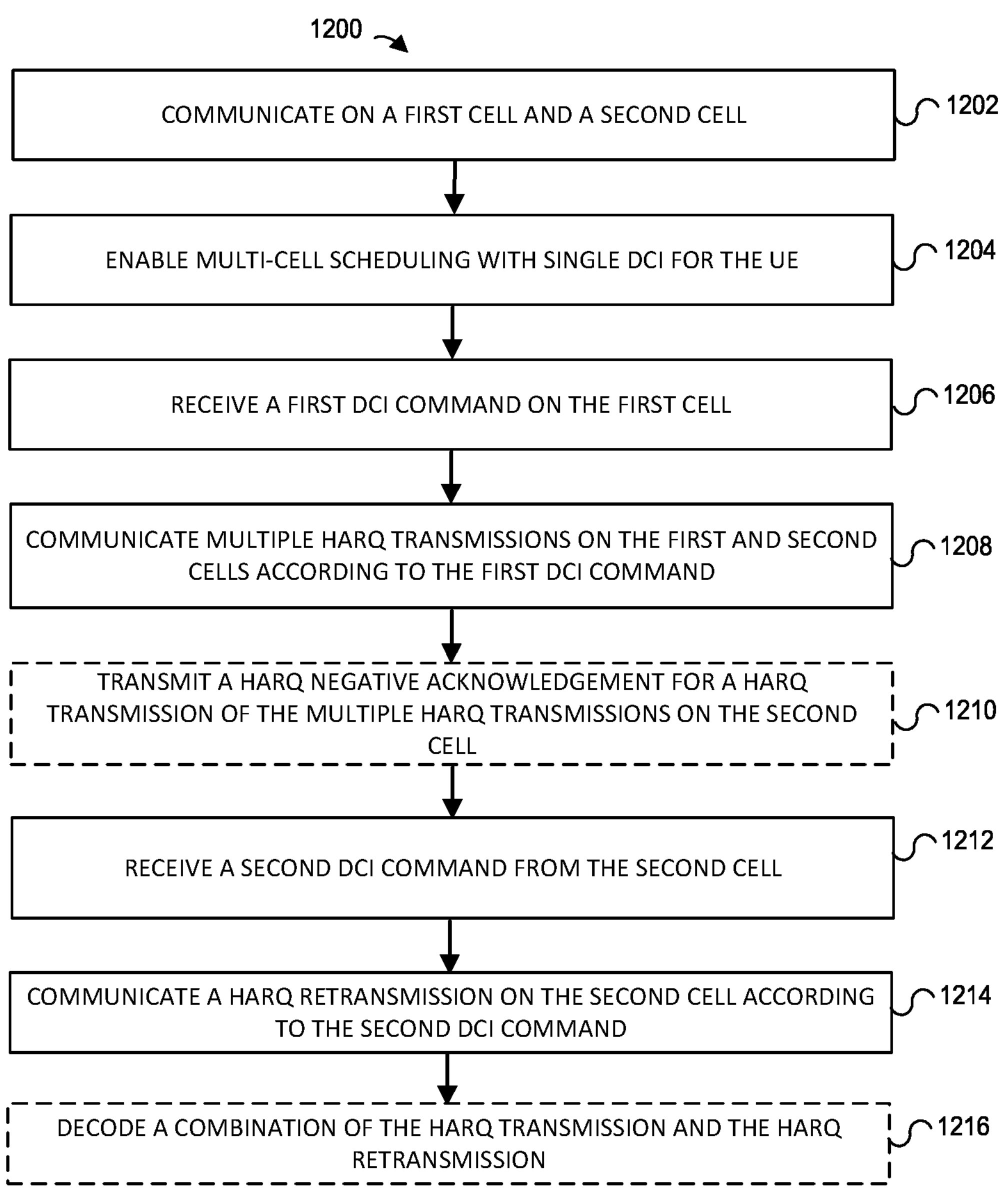
FIG. 12 is a flow diagram of an example method for processing HARQ transmission received over multiple cells, which can be implemented in the UE of FIG. 1A.

Now referring to FIG. 12, the UE 102 can implement a method 1200 to process HARQ transmission received over multiple cells in accordance with the same DCI. The method 1200 begins at block 1202, where the UE 102 communicates with the base station 106A in a first cell and a second cell. At block 1204, the UE 102 enables multi-cell scheduling with a single DCI.

At block 1206, the UE 102 receives a first DCI command on the first cell. Then, at block 1208, the UE 102 receives or transmits multiple HARQ transmissions on the first and second cells according to the first DCI.

In some cases, when the HARQ communications are downlink transmissions, the UE 102 can transmit on the second cell a HARQ negative acknowledgement at block 1210, for one of the HARQ transmissions. The UE 102 then can receive a second DCI command on the second cell (block 1212) and receive a HARQ retransmission on the second cell according to the second DCI command (block 1214). When the HARQ communications are uplink transmissions, the UE 102 is not configured to receive a HARQ negative acknowledgement, and can treat the second DCI command as an implicit indication that the first HARQ transmission failed. At block 1216, the UE 102 can decode a combination of the HARQ transmission and the HARQ retransmission to obtain the data unit or the signaling, when the HARQ transmissions are downlink transmissions.

Figure 13:
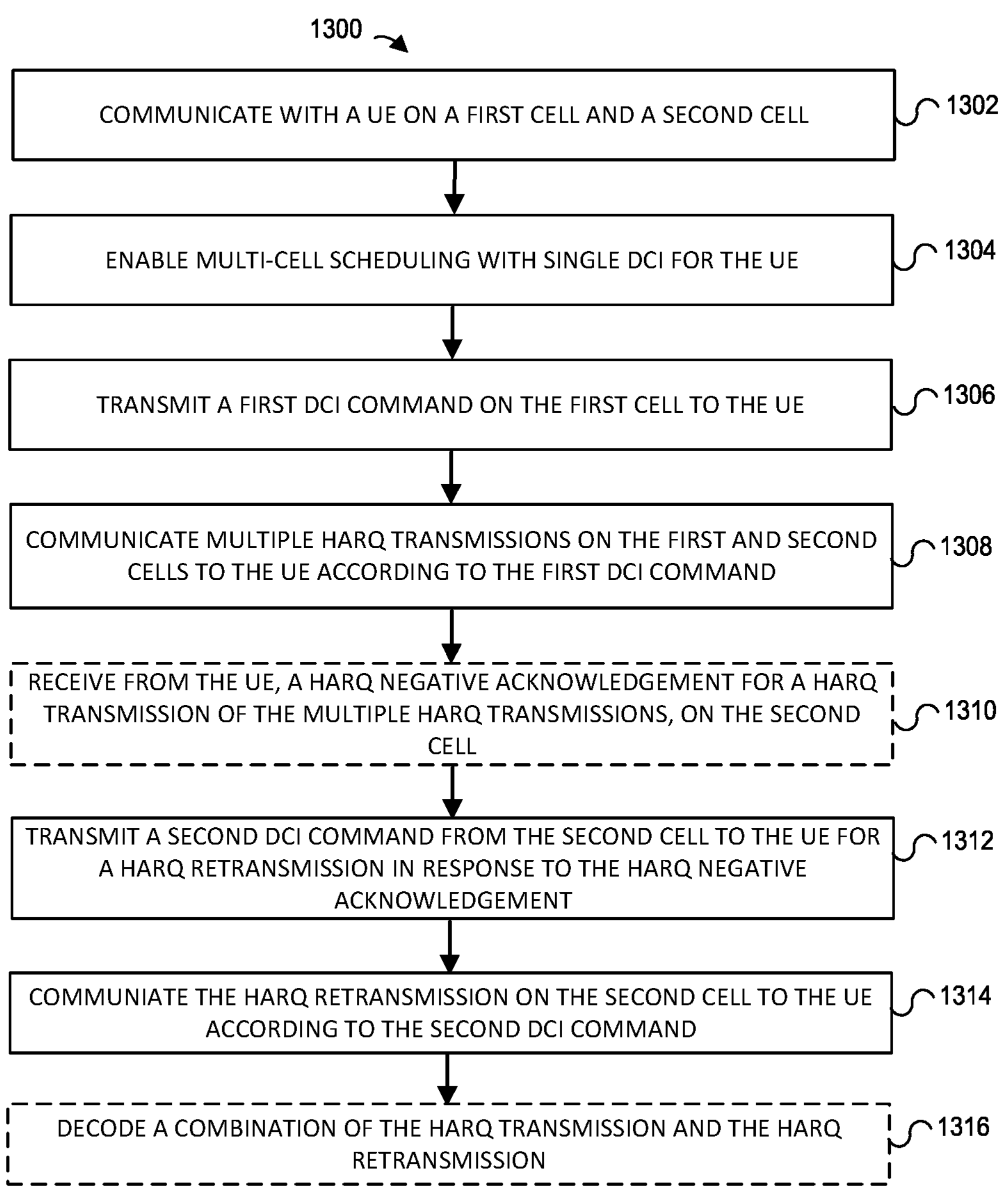
FIG. 13 is a flow diagram of an example method for processing HARQ transmission received over multiple cells, which can be implemented in the base station of FIG. 1A.

The base station 106A can implement a method 1300 of FIG. 13 to process HARQ transmission received over multiple cells in accordance with the same DCI. The method 1300 begins at block 1302, where the base station 106A communicates with the UE 102 in a first cell and a second cell. At block 1304, the base station 106A enables multi-cell scheduling with a single DCI.

At block 1306, the base station 106A transmits a first DCI command to the UE 102 on the first cell. Then, at block 1308, the base station 106A receives or transmits multiple HARQ transmissions on the first and second cells according to the first DCI.

In some cases, when the HARQ communicates are downlink transmissions, the base station 106A can receive on the second cell a HARQ negative acknowledgement at block 1310, for one of the HARQ transmissions. The base station 106A then can transmit a second DCI command on the second cell (block 1312) and transmit a HARQ retransmission on the second cell according to the second DCI command (block 1314). When the HARQ communications are uplink transmissions, the base station 106A is not configured to transmit a HARQ negative acknowledgement, and can transmit the second DCI command as an implicit indication that the first HARQ transmission failed. At block 1316, the base station can decode a combination of the HARQ transmission and the HARQ retransmission to obtain the data unit or the signaling, when the HARQ transmissions are uplink transmissions.

Figure 14:
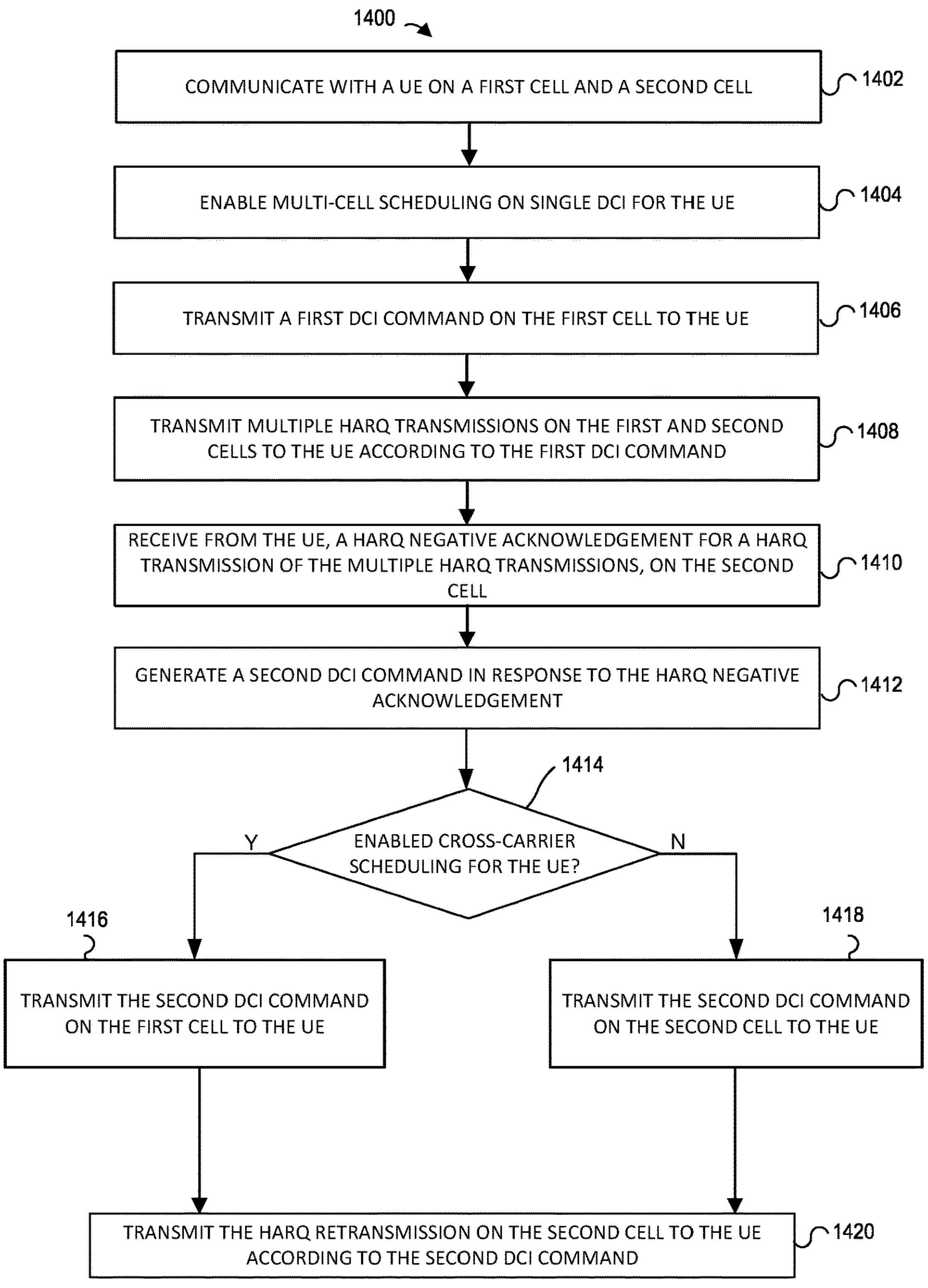
FIG. 14 is a flow diagram of an example method for selecting a cell for transmission of a DCI based on whether cross-carrier scheduling is enabled for the UE, which can be implemented in the base station of FIG. 1A.

FIG. 14 illustrates an example method 1400 for selecting a cell for transmission of a DCI based on whether cross-carrier scheduling is enabled for the UE, which can be implemented in the base station 106A. More specifically, the base station 106A can implement this method when the UE 102 supports multi-cell scheduling that does not necessarily include cross-carrier scheduling.

The method 1400 begins at block 1402, where the base station 106A communicates with the UE 102 in a first cell and a second cell. At block 1404, the base station 106A enables multi-cell scheduling with a single DCI. Next, at block 1406, the base station 106A transmits a first DCI command to the UE 102 on the first cell. At block 1408, the base station transmits multiple information units on the first and second cells, using a HARQ scheme and in accordance with the first DCI command.

At block 1410, the base station 106A receives a negative acknowledgement from the UE 102 for a HARQ transmission that occurred on the second cell. The base station 106A then can generate a second DCI command in response to the HARQ negative acknowledgement (block 1412).

At block 1414, the base station 106A determines whether cross-carrier scheduling is enabled for the UE. When cross-carrier scheduling is enabled, the flow proceeds to block 1416, where the base station 106A transmits the second DCI command to the UE 102 on the first cell. When cross-carrier scheduling is not enabled, the flow proceeds to block 1418, where the base station 106A transmits the second DCI command to the UE 102 on the second cell. In either case, the second DCI command schedules the HARQ retransmission on the second cell. Accordingly, at block 1420, the base station 106A performs the HARQ retransmission on the second cell in accordance with the second DCI command.

Figure 15:
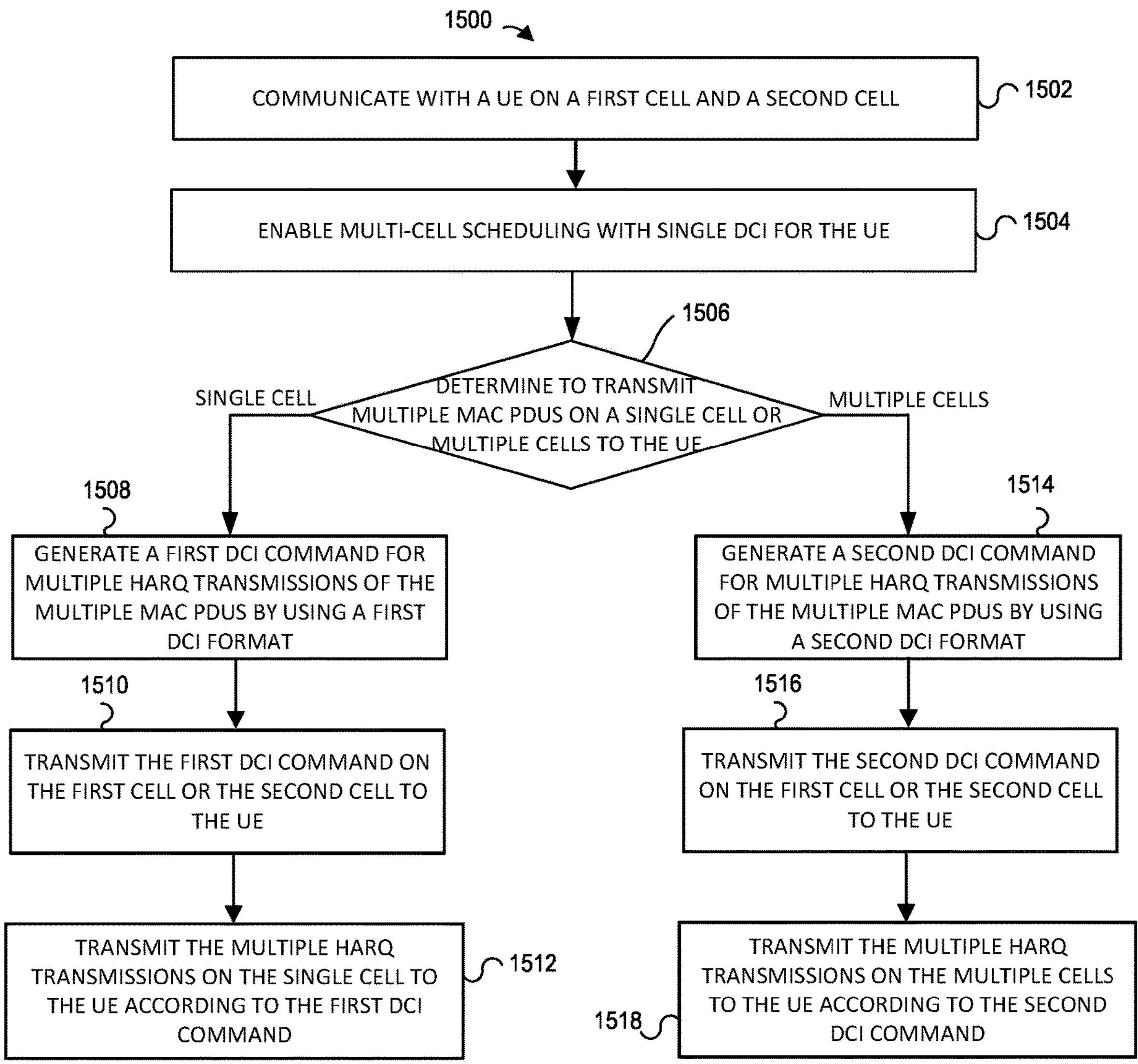
FIG. 15 is a flow diagram of an example method for selecting a format of DCI based on whether the base station can transmit multiple PDUs over the same cell using MIMO, or different cells using the same DCI, which can be implemented in the base station of FIG. 1A.

FIG. 15 is a flow diagram of an example method 1500, which the base station 106A can implement to select a format of DCI based on whether the base station 106A can transmit multiple PDUs over the same cell using MIMO, or different cells using the same DCI.

The method 1500 begins at block 1502, where the base station 106A communicates with the UE 102 in a first cell and a second cell. At block 1504, the base station 106A enables multi-cell scheduling with a single DCI. At block 1506, the base station 106A determines whether it should transmit multiple PDUs on a single or multiple cells to the UE. The base station 106A can determine for example whether the transmission should occur on the same cell using MIMO techniques or in multiple cells using multi-cell scheduling with a single DCI.

When the base station 106A chooses to use a single cell, the flow proceeds to block 1508, where the base station 106A generates a first DCI command for multiple HARQ transmissions of the multiple PDUs using a certain (first) DCI format. More specifically, the first DCI format can specify that the base station 106A will transmit multiple PDUs using MIMO. At block 1510, the base station 106A transmits the first DCI command on the first cell or the second cell. At block 1512, the base station 106A performs the multiple HARQ transmissions to the UE on the single cell, according to the first DCI command.

On the other hand, when the base station 106A at block 1506 chooses to use multiple cell, the flow proceeds to block 1514, where the base station 106A generates a second DCI command for multiple HARQ transmissions of the multiple PDUs using another (second) DCI format. More specifically, the second DCI format can specify that the base station 106A will transmit multiple PDUs on multiple cells. At block 1516, the base station 106A transmits the second DCI command on the first cell or the second cell. At block 1518, the base station 106A performs the multiple HARQ transmissions to the UE on multiple cells, according to the second DCI command.

Figure 16:
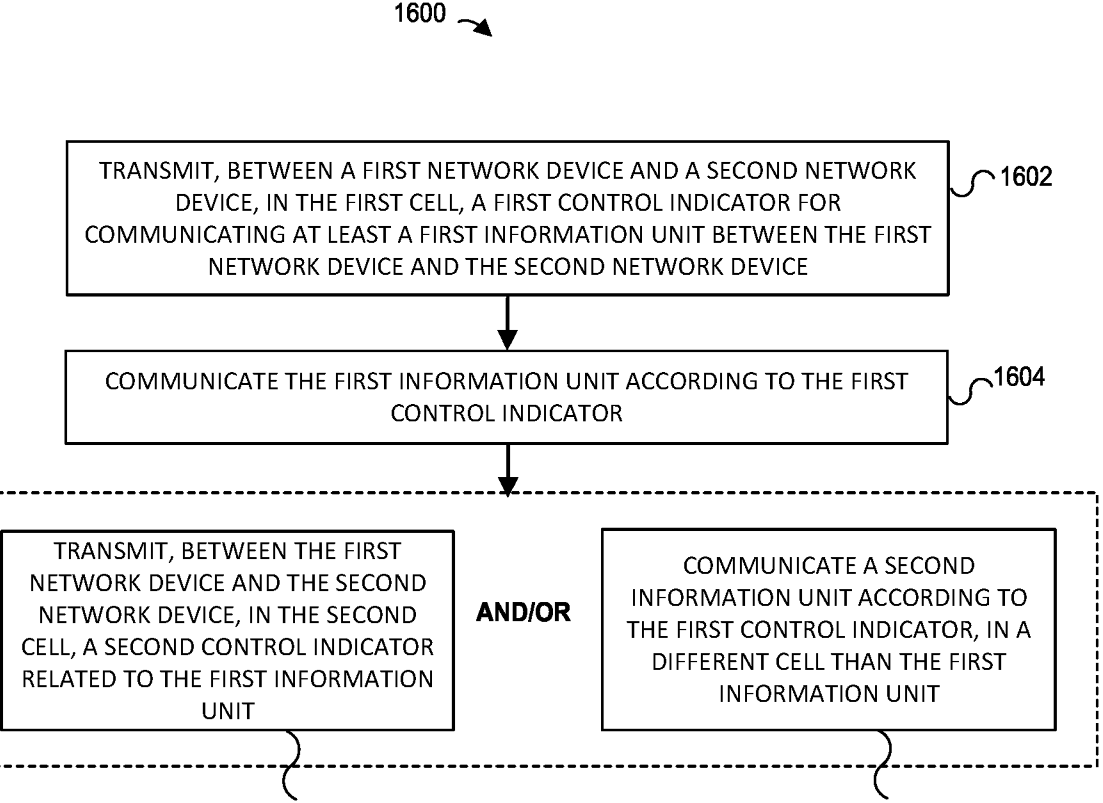
FIG. 16 is a flow diagram of an example method for communicating with another network device via multiple cells, which can be implemented in the UE or the base station of FIG. 1A.

For further clarity, FIG. 16 illustrates an example method 1600 for communicating with another network device via multiple cells, which can be implemented in the UE 102 or the base station 106A of FIG. 1A or, more generally, in a suitable UE or a suitable base station. At block 1602, the network device transmits, between the first network device and the second network device in the first cell, a first control indicator such as a DCI for communicating at least a first information unit (e.g., a PDU or signaling) between the first network device and the second network device. See for example DCI1, DCI3, DCI5, or DCI7 of FIGS. 3A and 3B; DCI1, DCI3, DCI5, or DCI7 of FIGS. 4A-D; DCI1 or DCI 3 of FIGS. 5A-D; block 606 of FIG. 6; block 706 of FIG. 7; block 806 of FIG. 8; block 906 of FIG. 9; block 1006 of FIG. 10.

At block 1604, the network device communicates the first information unit according to the first control indicator (for example, events 318A, 326A, 334A, and 342A of FIG. 3A; events 418A, 426A, 434A, and 442A of FIG. 4A; event 516A or 530A of FIG. 5A).

The network device then performs at least one of blocks 1606 and 1608.

At block 1606, the network device transmits, between the first network device and the second network device in the second cell, a second control indicator related to the first information unit. The second control indicator can be for retransmission of the first information unit (for example, DCI 2, DCI4, DCI6, or DCI8 of FIGS. 3A and 3B; DCI 2, DCI4, DCI6, or DCI8 of FIGS. 4A-D); or to stop periodic transmissions (for example, block 808 of FIG. 8), for example.

At block 1608, the network device or communicates a second information unit according to the first control indicator, and in a different cell than the first information unit (for example, event 520A or 532A of FIG. 5A).

The following description may be applied to the description above.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for handling mobility between base stations through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

The following list of examples reflects a variety of the embodiments explicitly contemplated by the present disclosure.

Example 1. A method in a base station for communicating via a user equipment (UE) via a first cell and a second cell, the method comprising: transmitting, by processing hardware to the UE in the first cell, a first control indicator indicating resources for communicating at least a first information unit between the UE and the base station; communicating, by the processing hardware, the first information unit according to the first control indicator; and performing, by the processing hardware, at least one of: (i) transmitting, to the UE in the second cell, a second control indicator related to the first information unit, or (ii) communicating, by the processing hardware, a second information unit according to the first control indicator, and in a different cell than the first information unit.

Example 2. The method of example 1, wherein the first control indicator schedules the communicating of the first information unit in the second cell.

Example 3. The method of example 1, wherein the first control indicator schedules the communicating of the first information unit in the first cell.

Example 4. The method of any of the preceding examples, wherein the performing comprises option (i); the method further comprising: in response to determining, by the processing hardware, that the communicating of the first information unit failed, communicating the first information unit again, according to the second control indicator.

Example 5. The method of example 4, wherein the communicating of the first information unit includes transmitting the first information unit to the UE; and the determining includes receiving, from the UE, a negative acknowledgement for the transmitting.

Example 6. The method of example 4, wherein: the communicating of the first information unit includes receiving a transmission of the first information unit from the UE; and the determining includes failing to obtain the first information unit from the transmission.

Example 7. The method any of the preceding examples, wherein the communicating of the first information unit conforms to a hybrid automatic repeat request (HARM) protocol.

Example 8. The method of any of the preceding examples, wherein the base station operates as a secondary node (SN) to support dual connectivity at the UE.

Example 9. The method of example 8, further comprising transmitting to the UE, prior to transmitting the first control indicator, cross-carrier scheduling configuration and/or multi-cell configuration directly via a radio interface.

Example 10. The method of example 8, further comprising: transmitting to the UE, prior to transmitting the first control indicator, cross-carrier scheduling configuration and/or multi-cell configuration via a master node (MN).

Example 11. The method of example 1, wherein communicating the first information unit includes periodically transmitting information in the second cell.

Example 12. The method of example 11, wherein the first control indicator includes a configured grant.

Example 13. The method of example 12, wherein the second control indicator includes a command to release the configured grant.

Example 14. The method of example 1, wherein the first cell is a primary cell; the second cell is a secondary cell; and the first control indicator schedules the communicating of the first information unit in the primary cell and the communicating of the second information unit in the secondary cell.

Example 15. The method of example 14, further comprising: determining, by the processing hardware, that the communicating of the second information unit failed; transmitting, by processing hardware to the UE in the second cell, a new control indicator for communicating the second information unit again in the secondary cell.

Example 16. The method of example 1, wherein: the first cell is a secondary cell; the second cell is a primary cell; and the first control indicator schedules the communicating of the first information unit in the primary cell and the communicating of the second information unit in the secondary cell.

Example 17. The method of example 16, further comprising: determining, by the processing hardware, that the communicating of the first information unit failed; transmitting, by processing hardware to the UE in the second cell, a new control indicator for communicating the first information unit again in the primary cell.

Example 18. The method of any of the preceding examples, further comprising: transmitting to the UE in a primary cell, prior to transmitting the first control indicator, (i) cross-carrier scheduling configuration and/or multi-cell configuration and (ii) a secondary cell configuration, wherein one of the first cell and the second cell is the primary cell, and the other one of the first cell and the second cell is the secondary cell.

Example 19. The method of any of examples 1-17, further comprising transmitting to the UE in a secondary cell, prior to transmitting the first control indicator, cross-carrier scheduling configuration and/or multi-cell configuration, wherein one of the first cell and the second cell is a primary cell, and the other one of the first cell and the second cell is the secondary cell.

Example 20. The method of any of the preceding examples, wherein the information unit includes a Protocol Data Unit (PDU).

Example 21. The method of any of examples 1-19, wherein the information unit includes signaling data.

Example 22. The method of example 21, wherein the signaling data includes Channel State Information (CSI) or Sounding Reference Signal (SRS).

Example 23. The method of any of the preceding examples, wherein the control indicator conforms to a Downlink Control Indicator (DCI) format.

Example 24. The method of any examples 1-19, further comprising: determining whether the first control indicator and the first unit should be transmitted in a same or different cells based on whether the first information unit includes data or signaling.

Example 25. The method of any the preceding examples, wherein the first control indicator indicates that the UE is to switch from a first bandwidth part (BWP) to a second BWP of the second cell for communicating the first information.

Example 26. The method of example 1, further comprising:communicating a third information unit in a same cell as the first information unit, at a same time, according to the control indicator.

Example 27. The method of example 25, wherein communicating the first information unit and the third information unit includes using a multiple-input, multiple output (MIMO) scheme.

Example 28. The method of example 1, further comprising: in a first instance, selecting a first format of the control indicator in response to determining that the control indicator schedules transmission of only the first information unit in the first cell or in the second cell; and in a second instance, selecting a second format of the control indicator in response to determining that the control indicator schedules transmission of the first information unit and a third information unit in the first cell or in the second cell.

Example 29. A base station comprising processing hardware and configured to implement of any of the preceding examples.

Example 30. A method in a user equipment for communicating via a base station via a first cell and a second cell, the method comprising: receiving, by processing hardware from the base station in the first cell, a first control indicator for communicating at least a first information unit between the UE and the base station; communicating, by the processing hardware, the first information unit according to the first control indicator; and performing, by the processing hardware, at least one of: (i) receiving, from the base station in the second cell, a second control indicator related to the first information unit, or (ii) communicating, by the processing hardware, a second information unit according to the first control indicator, and in a different cell than the first information unit.

Example 31. The method of example 30, wherein the first control indicator schedules the communicating of the first information unit in the second cell.

Example 32. The method of example 30, wherein the first control indicator schedules the communicating of the first information unit in the first cell.

Example 33. The method of any examples 30-32, further comprising in response to determining, by the processing hardware, that the communicating of the first information unit failed, communicating the first information unit again, according to the second control indicator.

Example 34. The method of example 33, wherein the communicating of the first information unit includes transmitting the first information unit to the base station; and the determining includes receiving, from the base station, the second control indicator.

Example 35. The method of example 33, wherein the communicating of the first information unit includes receiving a transmission of the first information unit from the base station; the determining includes failing to obtain the first information unit from the transmission; the method further comprising transmitting, to the base station, a negative acknowledgement for the first information unit.

Example 36. The method any of examples 30-35, wherein the communicating of the first information unit conforms to a hybrid automatic repeat request (HARQ) protocol.

Example 37. The method of example 30, further comprising: receiving from the base station operating as a secondary node (SN), prior to receiving the first control indicator, cross-carrier scheduling configuration and/or multi-cell configuration directly via a radio interface.

Example 38. The method of example 30, further comprising receiving from the base station operating as an SN, prior to receiving the first control indicator, cross-carrier scheduling configuration and/or multi-cell configuration via a master node (MN).

Example 39. The method of example 30, wherein communicating the first information unit includes periodically receiving the first information unit in the second cell.

Example 40. The method of example 39, wherein the first control indicator includes a configured grant.

Example 41. The method of example 39, wherein the second control indicator includes a command to release the configured grant.

Example 42. The method of example 30, wherein:the first cell is a primary cell; the second cell is a secondary cell; and the first control indicator schedules the communicating of the first information unit in the primary cell and the communicating of the second information unit in the secondary cell.

Example 43. The method of example 42, further comprising: determining, by the processing hardware, that the communicating of the second information unit failed; receiving, by processing hardware from the base station in the second cell, a new control indicator for communicating the second information unit again in the secondary cell.

Example 44. The method of example 30, wherein the first cell is a secondary cell; the second cell is a primary cell; and the first control indicator schedules the communicating of the first information unit in the primary cell and the communicating of the second information unit in the secondary cell.

Example 45. The method of example 44, further comprising: determining, by the processing hardware, that the communicating of the first information unit failed; receiving, by processing hardware from the base station in the second cell, a new control indicator for communicating the first information unit again in the primary cell.

Example 46. The method of any of examples 30-44, further comprising: receiving from the base station, prior to receiving the first control indicator, (i) cross-carrier scheduling configuration and/or multi-cell configuration and (ii) a secondary cell configuration, in a primary cell, wherein: one of the first cell and the second cell is the primary cell, and the other one of the first cell and the second cell is the secondary cell.

Example 47. The method of any of examples 30-44, further comprising: receiving from the base station, prior to receiving the first control indicator, cross-carrier scheduling configuration and/or multi-cell configuration, in a secondary cell, wherein one of the first cell and the second cell is a primary cell, and the other one of the first cell and the second cell is the secondary cell.

Example 49. The method of any examples 30-47, wherein the information unit includes a PDU.

Example 50. The method of any of examples 30-47, wherein the information unit includes signaling data.

Example 51. The method of any of example 50, wherein the signaling data includes CSI or SRS.

Example 52. The method of any of examples 30-50, wherein the control indicator conforms to a DCI format.

Example 53. The method of any examples 30-51, wherein the first control indicator indicates that the UE is to switch from a first bandwidth part (BWP) to a second BWP of the second cell for communicating the first information.

Example 54. The method of example 30, further comprising communicating a third information unit in a same cell as the first information unit, at a same time, according to the control indicator.

Example 55. The method of example 53, wherein communicating the first information unit and the third information unit includes using a MIMO scheme.

Example 56. A UE comprising processing hardware and configured to implement of any of examples 30-54.

What is claimed is:

1. A method in a base station for communicating with a user equipment (UE) via a primary cell (PCell) and a secondary cell (SCell), the method comprising:

transmitting, by the base station to the UE and in the SCell, a control indicator indicating resources for communicating a protocol data unit (PDU) from the UE and to the base station on a Physical Uplink Shared Channel (PUSCH) in the PCell; and receiving by the base station and in the PCell, the PDU according to the control indicator.

2. The method of claim 1, wherein the transmitting includes using a physical downlink control channel (PDCCH) of the SCell.

3. The method of claim 1, the method further comprising:

determining, by the base station, that the communicating of the PDU failed; and in response to the determining, transmitting, to the UE in the PCell, a new control indicator for communicating the PDU again in the PCell.

4. The method of claim 1, wherein the communicating of the PDU conforms to a hybrid automatic repeat request (HARQ) protocol.

5. The method of claim 1, further comprising:

communicating, by the base station and in the SCell, a second PDU, according to the control indicator.

6. The method of claim 1, further comprising:

transmitting to the UE, prior to transmitting the control indicator, cross-carrier scheduling configuration and/or multi-cell configuration, in the PCell.

7. The method of claim 1, wherein:

the base station operates as a secondary node (SN) to support dual connectivity at the UE;

the method further comprising:

transmitting to the UE, prior to transmitting the control indicator, cross-carrier scheduling configuration and/or multi-cell configuration, directly via a radio interface or via a master node (MN).

8. The method of claim 1, further comprising:

determining that the control indicator and the PDU should be transmitted in different cells based in response to determining that the PDU includes data.

9. The method of claim 1, wherein the control indicator indicates that the UE is to switch from a first bandwidth part (BWP) to a second BWP of the PCell for communicating the PDU.

10. A method in a user equipment (UE) for communicating with a base station via a primary cell (PCell) and a secondary cell (SCell), the method comprising:

receiving, by the UE from the base station in the SCell, a control indicator indicating resources for transmitting a protocol data unit (PDU) from the UE and to the base station on a Physical Uplink Shared Channel (PUSCH) in the PCell;

communicating, by the UE and in the PCell, the PDU according to the control indicator.

11. The method of claim 10, further comprising:

receiving, by the UE and in the PCell, a new control indicator indicating resources for communicating the PDU; and in response to determining, by the UE, that the communicating of the PDU according to the control indicator failed, communicating the PDU again in the PCell according to the new control indicator.

12. The method of claim 10, further comprising:

communicating, by the UE and in the SCell, a second PDU, according to the control indicator.

13. The method of claim 10, further comprising:

receiving from the base station, prior to receiving the control indicator, cross-carrier scheduling configuration and/or multi-cell configuration, in the PCell.

14. The method of claim 10, wherein the control indicator indicates that the UE is to switch from a first bandwidth part (BWP) to a second BWP of the PCell for communicating the PDU.

15. A base station comprising:

a first component configured to support a radio interface for communicating with a user equipment (UE) via a primary cell (PCell) and a secondary cell (SCell); and a second component configured to:

transmit to the UE and in the SCell, a control indicator indicating resources for communicating a protocol data unit (PDU) between the UE and the base station on a Physical Uplink Shared Channel in the PCell (PUSCH); and receive, in the PCell, the PDU according to the control indicator.

16. The base station of claim 15, further configured to:

schedule, on a physical downlink control channel (PDCCH) of the SCell, the communicating of the PDU on the PUSCH.

17. The base station of claim 15, further configured to:

determine that the communicating of the PDU failed; and in response to the determining, transmit, to the UE in the PCell, a new control indicator for communicating the PDU again in the PCell.

18. The base station of claim 15, wherein the communicating of the PDU conforms to a hybrid automatic repeat request (HARQ) protocol.

19. The base station of claim 15, further configured to:

communicate, in the SCell, a second PDU, according to the control indicator.

20. The base station of claim 15, further configured to:

transmit to the UE, prior to transmitting the control indicator, cross-carrier scheduling configuration and/or multi-cell configuration, in the PCell.

* * * * *